(12) United States Patent
Nakamura

(10) Patent No.: US 8,117,295 B2
(45) Date of Patent: Feb. 14, 2012

(54) REMOTE APPARATUS MANAGEMENT SYSTEM, REMOTE APPARATUS MANAGEMENT METHOD AND REMOTE APPARATUS MANAGEMENT PROGRAM

(75) Inventor: Nobutatsu Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 204 days.

(21) Appl. No.: 12/443,613

(22) PCT Filed: Dec. 10, 2007

(86) PCT No.: PCT/JP2007/073809
§ 371 (c)(1),
(2), (4) Date: Mar. 30, 2009

(87) PCT Pub. No.: WO2008/072606
PCT Pub. Date: Jun. 19, 2008

(65) Prior Publication Data
US 2010/0094928 A1 Apr. 15, 2010

(30) Foreign Application Priority Data
Dec. 15, 2006 (JP) ................................. 2006-338964

(51) Int. Cl.
*G06F 15/173* (2006.01)
(52) U.S. Cl. ...................................................... 709/223
(58) Field of Classification Search .......... 709/202–207, 709/217–239, 244–247
See application file for complete search history.

(56) References Cited

U.S. PATENT DOCUMENTS
7,809,845 B2 * 10/2010 Fujii et al. ..................... 709/230

FOREIGN PATENT DOCUMENTS

| JP | 1996274835 A | 10/1996 |
| JP | 2000013435 A | 1/2000 |
| JP | 2001290720 A | 10/2001 |
| JP | 2002536914 A | 10/2002 |
| JP | 2003169056 A | 6/2003 |
| JP | 2004120609 A | 4/2004 |
| JP | 2005085238 A | 3/2005 |
| JP | 2005136742 A | 5/2005 |
| JP | 2005142735 A | 6/2005 |
| JP | 2005309617 A | 11/2005 |

\* cited by examiner

*Primary Examiner* — Asad Nawaz

(57) ABSTRACT

In an environment such as the Internet where a wide variety of electronic apparatuses should be managed and which includes many electronic apparatuses, connection must be modified smoothly according to a status change. An apparatus status collection unit collects apparatus status such as types, loads and positions of electronic apparatuses. A communication status collection unit collects communication status such as a type, path and load of communication. A connection rule retention unit retains beforehand a connection rule indicating a communication connection method being relevant to certain apparatus status, communication status and terminal status. A connection method decision unit compares apparatus status, communication status and terminal status with connection rules to extract a connection rule indicating an appropriate connection method. Then, the connection method decision unit causes an apparatus driver unit, the protocol conversion unit and a network communication unit to set the units to the decided connection method.

45 Claims, 21 Drawing Sheets

F I G. 6
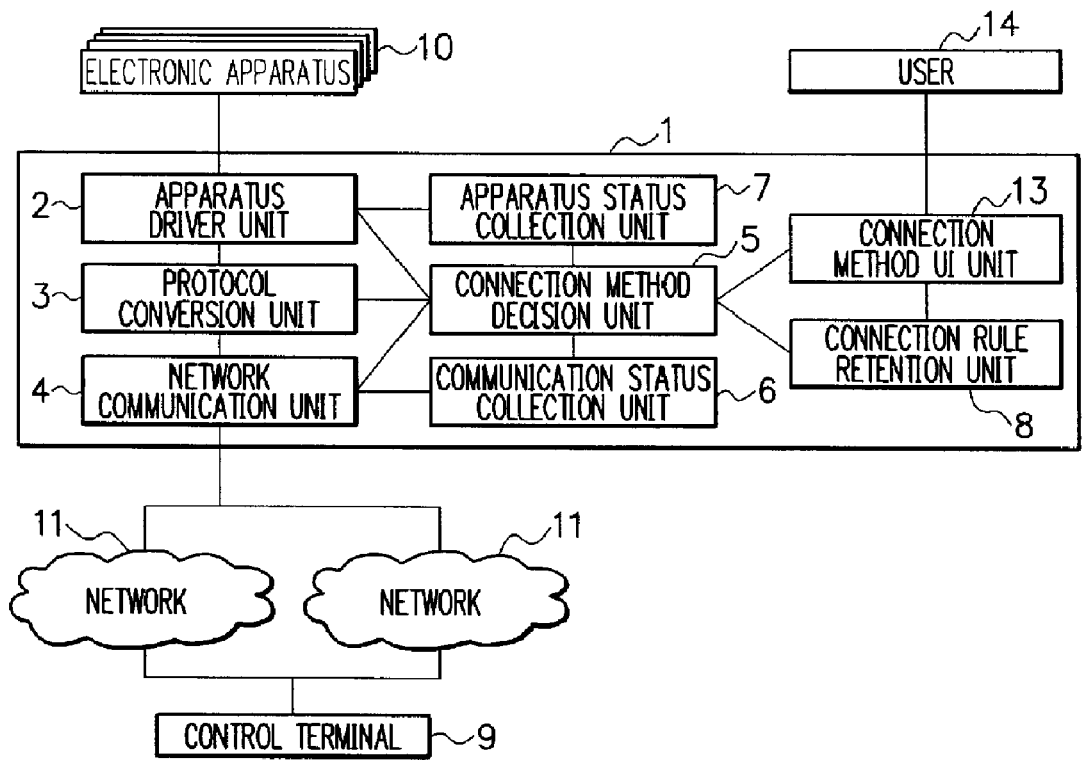

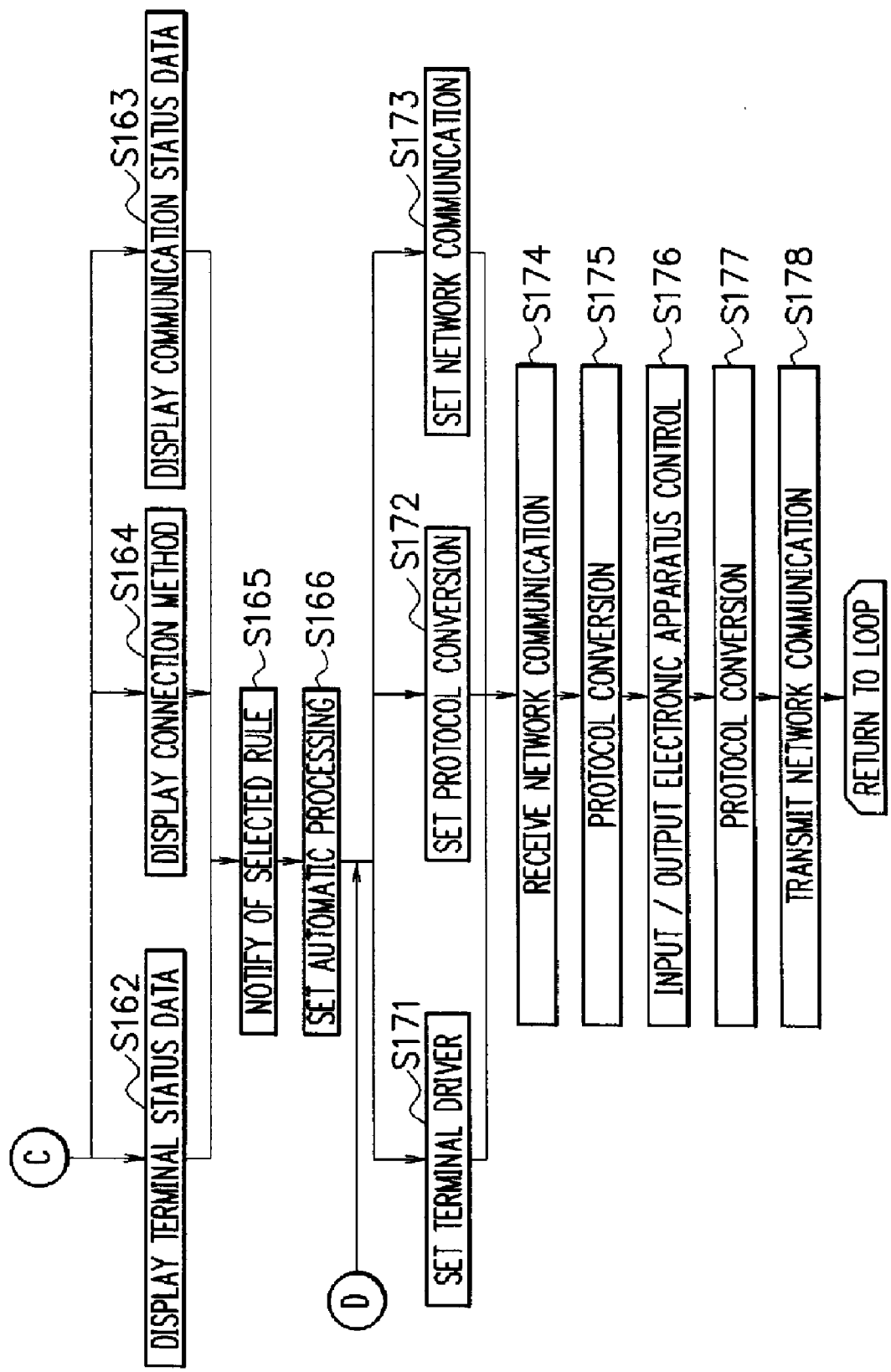

F I G. 14
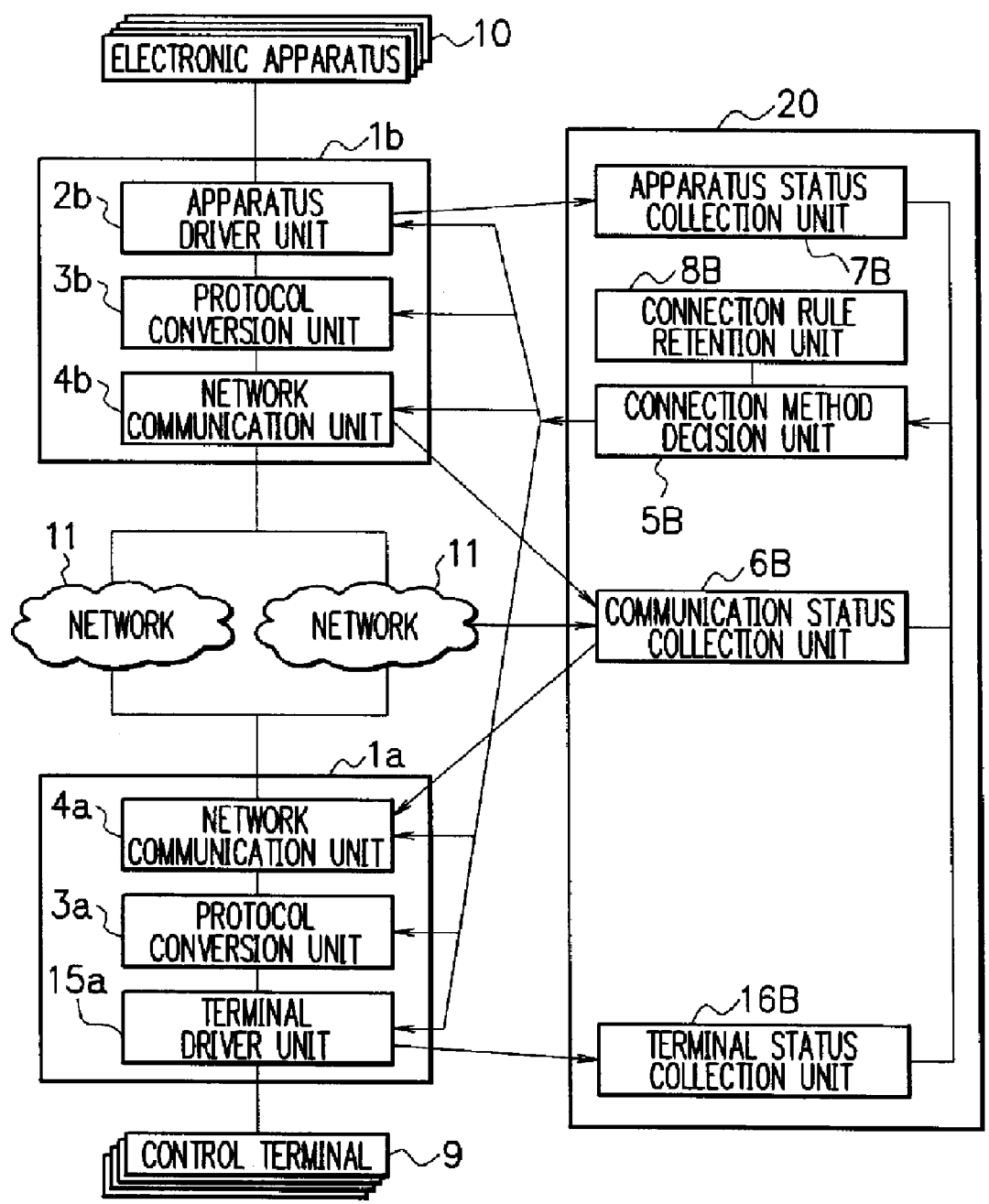

F I G. 16
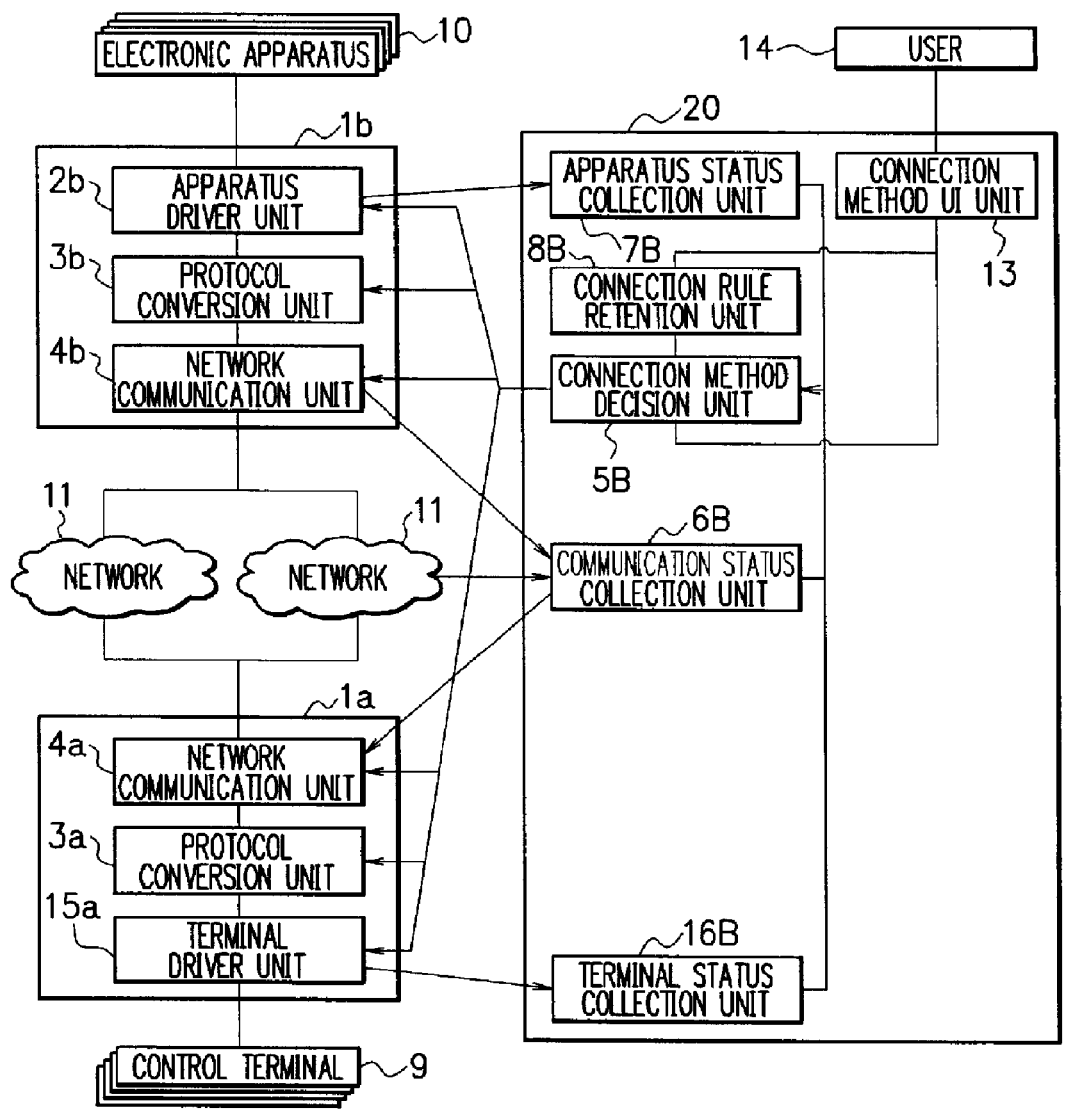

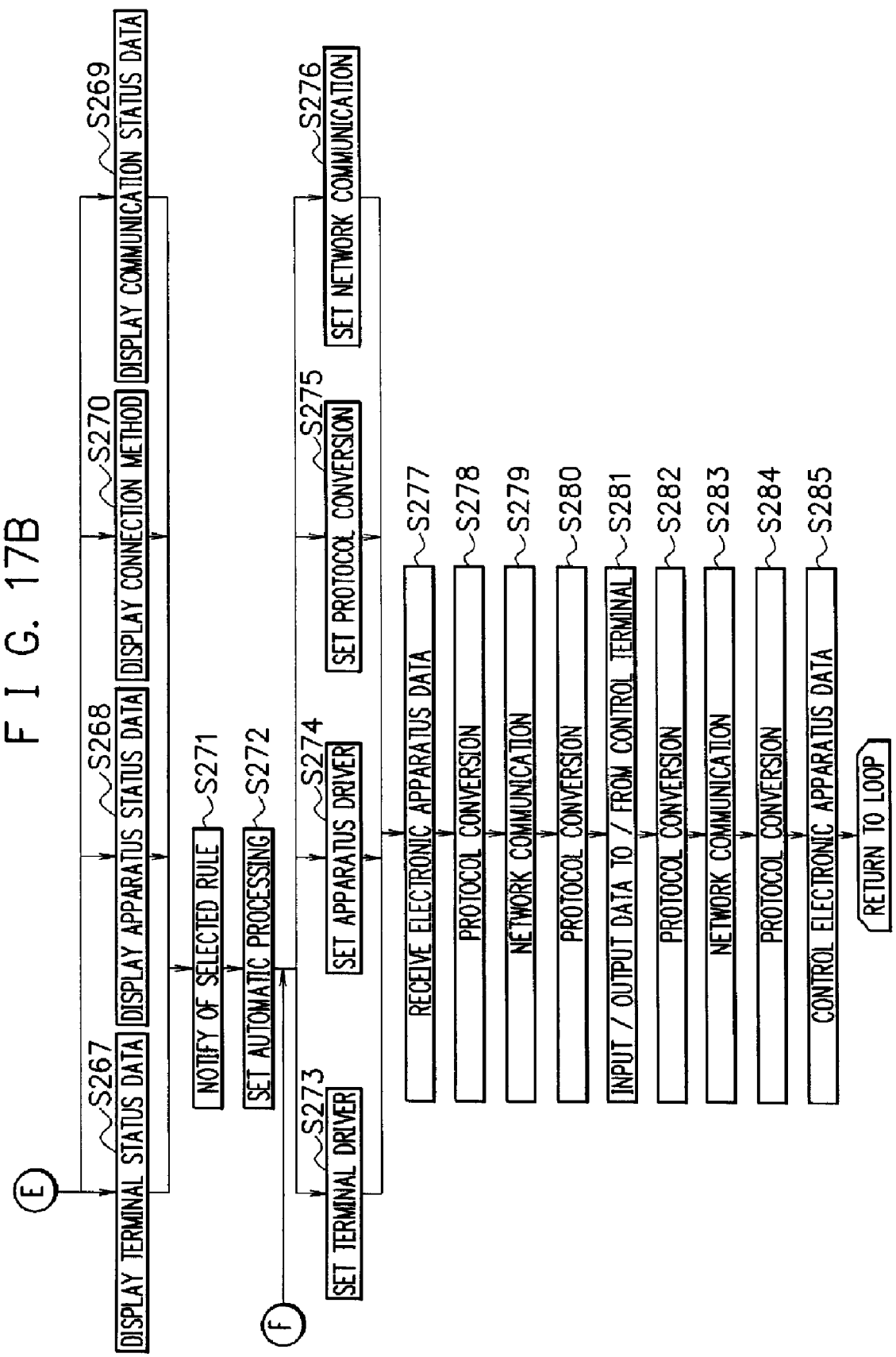

FIG. 20

| AGENT LIST | | |
|---|---|---|
| ○ AGENT MACHINE INFORMATION (HOST NAME, IP ADDRESS) | | ○ ACTION |
| ○ xxx-server | ○ 192.168.1.xx | ○ DISPLAY CONNECTED USB APPARATUSES |
| AGENT, RETURN TO HOME | | |

FIG. 21

| USB APPARATUS OF xxx-server (192.168.1.xx) | | |
|---|---|---|
| ○ APPARATUS INFORMATION | ○ STATE | ○ ACTION |
| ○ BusID 5-1 ID 0ea0:6828 xxx Technology,Inc.OTI-6828 Flash Disk | ○ BEING MOUNTED ON /mnt/usb-ip/ at 192.168.1.xx | ○ DISCONNECT |
| ○ BusID 4-2 ID 0ea0:6828 xxx Technology,Inc.OTI-6828 Flash Disk | ○ AVAILABLE | ○ USE |
| ○ BusID 1-4 ID 0ea0:2168 xxx Technology,Inc.Transcend JetFlash 2.0 / USB Drive | ○ AVAILABLE | ○ USE |
| RETURN TO Agent LIST | | |

REMOTE APPARATUS MANAGEMENT SYSTEM, REMOTE APPARATUS MANAGEMENT METHOD AND REMOTE APPARATUS MANAGEMENT PROGRAM

This application is the National Phase of PCT/JP2007/073809, filed Dec. 10, 2007, which is based upon and claims the benefit of priority from Japanese patent application No. 2006-338964, filed on Dec. 15, 2006, the disclosure of which is incorporated herein in its entirety by reference.

TECHNICAL FIELD

The present invention relates to a remote apparatus management system, a remote apparatus management method and a remote apparatus management program, and particularly relates to a remote apparatus management system, a remote apparatus management method and a remote apparatus management program that can remotely manage a wide variety of electronic apparatuses or devices including network inadaptive apparatuses via a communication network such as the Internet.

BACKGROUND ART

As a related remote apparatus management method, Patent Document 1 discloses one example of a remote apparatus management method of making electronic apparatuses available via a LAN, for example. According to the related method of using electronic apparatuses via a LAN described in Patent Document 1, electronic apparatuses to be managed and a control terminal (which controls the electronic apparatus) are connected according to a specific protocol such that they can communicate with one another. Information outlets for conversion to a standard communication protocol are provided on connection paths between the electronic apparatuses and the control terminal, and the information outlets are connected through network communication being standard for communication among the information outlets. With such configuration, according to the remote apparatus management method described in Patent Document 1, an electronic apparatus having only an interface such as RS-232C or SCSI can be used from a remote place via a standard network such as Ethernet (TCP/IP). The "Ethernet" is a registered trademark.

As a related device using a remote apparatus management method, Patent Document 2 discloses one example of a device for mutually converting protocol data units in incompatible networks, for example. The related device for mutually converting the protocol data units in incompatible networks described in Patent Document 2 includes communication terminals, a communication network connecting to the communication terminals, a local area network connected to the communication network, and electronic apparatuses in the local area network. In such an environment, the device described in Patent Document 2, which is between the communication network and the local area network, bi-directionally converts and transmits apparatus identifiers, control instructions and valid control information, and allows the communication terminals to remotely control the electronic apparatuses in the local area network.

Patent Document 3 discloses one example of the related method allowing for an apparatus network of electronic apparatuses having different apparatus control protocols, for example. FIG. 1 is a block diagram showing a configuration example of an apparatus network configured by electronic apparatuses with different apparatus control protocols according to the related art. As shown in FIG. 1, according to the related method allowing for an apparatus network of the electronic apparatuses having different apparatus control protocols, an apparatus control device for each electronic apparatus has a virtual protocol providing unit 502, a virtual protocol execution unit 503, a virtual protocol transfer unit 504, and a virtual protocol conversion unit. The virtual protocol providing unit 502 receives generalized control information transmitted from a certain apparatus control application 501. The virtual protocol execution unit 503 interprets a virtual protocol for the received control information. The virtual protocol conversion unit 505 converts the received control information into a protocol that is actually used to control an electronic apparatus.

The operation of the related apparatus control device with the above configuration will be described. In case that the network includes a plurality of electronic apparatuses, the certain apparatus control application 501 sequentially executes different types of apparatus control protocols in parallel or serially. The apparatus control application 501 also extracts electronic apparatuses that are found as a result of executing processing according to the apparatus control protocols, and recognizes apparatus information such as IDs, model names and model numbers of the electronic apparatuses and network addresses. The apparatus control device shown in FIG. 1 uses information such as the apparatus information and network addresses to convert a virtual protocol including generalized control information into a control protocol specific to each electronic apparatus.

Patent Document 4 discloses one example of a related method of managing and controlling a network Plug and Play inadaptive device, for example. The related method of managing and controlling a network Plug and Play inadaptive device described in Patent Document 4 can be applied to a system including a network Plug and Play inadaptive electronic apparatus connected to a network, a control terminal and a proxy server. In such a system, the proxy server retains network information and apparatus information of the electronic apparatus. When a client (specifically, a personal computer (PC)) requests to control/manage network Plug and Play, the proxy server processes and responds to the control/management request in lieu of the electronic apparatus. The proxy server also uses a protocol specific to the electronic apparatus to control the electronic apparatus, as necessary. The proxy server can also search for network information and apparatus information of the electronic apparatus and collect the information by means such as an SNMP protocol.

Patent Document 1: Japanese Patent Laid Open Publication No. 8-274835
Patent Document 2: National Publication of International Patent Application No. 2002-536914
Patent Document 3: Japanese Patent Laid Open Publication No. 2005-85238
Patent Document 4: Japanese Patent Laid Open Publication No. 2005-309617

DISCLOSURE OF THE INVENTION

Problems to be Solved by the Invention

In an environment of the Internet where a wide variety of electronic apparatuses should be managed and which includes many electronic apparatuses, even the device and methods described in Patent Document 1 to Patent Document 4 cannot smoothly modify the connection depending on a load of computation processing, a network load, and status changes such as movement of the electronic apparatuses and control terminal.

Specifically, the device or methods described in Patent Document 1 to Patent Document 4 can provide a scheme for converting a communication protocol depending on an electronic apparatus or a control terminal, or provide a scheme for searching for an electronic apparatus to be connected, collecting apparatus information, and connecting an appropriate electronic apparatus and a control terminal. However, if a used network environment is the Internet, for example, a wide variety of electronic apparatuses can be connected to the network so that a wide variety of services are provided, and the electronic apparatuses or services can change momentarily. That is, connection between the electronic apparatuses and control terminal might not be stable. Additionally, if the electronic apparatuses and control terminal are mobile electronic apparatuses and control terminal, the electronic apparatuses and control terminal can move so that wireless connection status might not be stable.

For a status change as in the above, it is desired to modify connection between the electronic apparatuses and the control terminal or to modify a protocol used for communication between the electronic apparatuses and the control terminal. However, the device and methods described in Patent Document 1 to Patent Document 4 do not provide means for monitoring a status change of the electronic apparatuses and the control terminal, or do not provide means for securely modifying connection between and a protocol for the electronic apparatuses and the control terminal. It is difficult for the device and methods described in Patent Document 1 to Patent Document 4 to address movement of the electronic apparatuses and the control terminal, since the device and methods do not have means for monitoring positions of the electronic apparatuses to be managed and the control terminal for executing management. Moreover, in a network environment such as the Internet which includes a wide variety of electronic apparatuses and where many electronic apparatuses are on the network, for example, it is difficult to judge the next best connection method (indicating which electronic apparatus should be connected, or which protocol should be used) and modify the connection at once if the best connection method cannot be used to connect the electronic apparatuses and the control terminal.

In view of the above, it is an object of the present invention to provide a remote apparatus management system, a remote apparatus management method and a remote apparatus management program that can modify connection smoothly according to a status change due to a load of computation processing, a load of communication, or movement of electronic apparatuses and a control terminal in an environment such as the Internet where a wide variety of electronic apparatuses should be managed and which includes many electronic apparatuses.

Means for Solving the Problems

To achieve the above object, the present invention has the following features.

A remote apparatus management system according to the present invention is a remote apparatus management system for remotely managing an electronic apparatus, being characterized by including: apparatus status collecting means (e.g., implemented in an apparatus status collection unit 7) for collecting apparatus status information indicating status of the electronic apparatus; communication status collecting means (e.g., implemented in a communication status collection unit 6) for collecting communication status information indicating status of communication between the electronic apparatus and a control terminal for controlling the electronic apparatus; connection method decision means (e.g., implemented in a connection method decision unit 5) for deciding a method of connection between the electronic apparatus and the control terminal based on the apparatus status information collected by the apparatus status collecting means and the communication status information collected by the communication status collecting means; and connection method setting means (e.g., implemented in the connection method decision unit 5) for setting the method of connection between the electronic apparatus and the control terminal based on a result of the decision by the connection method decision means.

The remote apparatus management system can also include: connection rule storing means (e.g., implemented in a connection rule retention unit 8) for storing connection rules indicating methods of connection between the electronic apparatus and the control terminal beforehand, wherein the connection method decision means can extract a connection rule matching the apparatus status information collected by the apparatus status collecting means and the communication status information collected by the communication status collecting means from the connection rules stored in the connection rule storing means.

The remote apparatus management system can also include: terminal status collecting means (e.g., implemented in a terminal status collection unit 16) for collecting terminal status information indicating status of the control terminal, wherein the connection method setting means can decide a method of connection between the electronic apparatus and the control terminal based on the apparatus status information and the communication status information, as well as the terminal status information collected by the terminal status collecting means.

A remote apparatus management system according to another aspect of the present invention is characterized by including: electronic apparatus control means (e.g., implemented in an apparatus driver unit 2) for controlling an electronic apparatus; data transmission/reception means (e.g., implemented in a network communication unit 4) for transmitting/receiving data to/from a control terminal connected to a network; protocol conversion means (e.g., implemented in a protocol conversion unit 3) for performing protocol conversion between control data inputted/outputted by the electronic apparatus and network communication data transmitted/received by the control terminal; apparatus status collecting means (e.g., implemented in the apparatus status collection unit 7) for collecting apparatus status information indicating apparatus status including a type, a load or a position of the electronic apparatus; communication status collecting means (e.g., implemented in the communication status collection unit 6) for collecting communication status information indicating communication status including a type, a path or a load of network communication; connection rule retention means (e.g., implemented in the connection rule retention unit 8) for retaining a connection rule indicating a communication connection method matching the apparatus status and the communication status; and connection method setting means (e.g., implemented in the connection method decision unit 5) for extracting an appropriate connection method by comparing the apparatus status and the communication status with the connection rule, and setting a control scheme, a protocol conversion scheme and a network communication scheme for the electronic apparatus.

Still another aspect of the remote apparatus management system according to the present invention is characterized by including: control data transmission/reception means (e.g., implemented in a network communication unit 4A) for transmitting/receiving control data to/from an electronic apparatus connected to a network; interface means (e.g., implemented in a terminal driver unit 15) for providing an interface with a control terminal; protocol conversion means (e.g., implemented in a protocol conversion unit 3A) for performing protocol conversion between the network control data transmitted/received by the electronic apparatus and an input/output interface for input/output by the control terminal; communication status collecting means (e.g., implemented in a communication status collection unit 6A) for collecting communication status information indicating communication status including a type, a load, a network path or a position of the network electronic apparatus; terminal status collecting means (e.g., implemented in the terminal status collection unit 16) for collecting terminal status information indicating terminal status including a type, a load or a position of the control terminal; connection rule retention means (e.g., implemented in a connection rule retention unit 8A) for retaining a connection rule indicating a communication connection method matching the terminal status and the communication status; and connection method setting means (e.g., implemented in a connection method decision unit 5A) for extracting an appropriate connection method by comparing the terminal status and the communication status with the connection rule, and setting a communication control scheme, a protocol conversion scheme and a terminal interface scheme for the network electronic apparatus.

Still another aspect of the remote apparatus management system according to the present invention is characterized by including: a communication adapter (for example, a computer 1b) of an electronic apparatus; and a communication adapter (for example, a computer 1a) of a control terminal, wherein the communication adapter of the electronic apparatus includes: electronic apparatus control means (e.g., implemented in an apparatus driver unit 2b) for controlling the electronic apparatus; communication means (e.g., implemented in a network communication unit 4b) of an apparatus side for performing network communication; protocol conversion means (e.g., implemented in a protocol conversion unit 3b) of the apparatus side for performing protocol conversion between control data transmitted/received by the electronic apparatus and the network communication; terminal status collecting means (e.g., implemented in a terminal status collection unit 16B) for collecting terminal status information indicating terminal status including a type, a load or a position of the control terminal; apparatus status collecting means (e.g., implemented in an apparatus status collection unit 7B) for collecting apparatus status information indicating apparatus status including a type, a load or a position of the electronic apparatus; communication status collecting means (e.g., implemented in a communication status collection unit 6B) for collecting communication status information indicating communication status including a type, a path or a load of the communication; connection rule retention means (e.g., implemented in a connection rule retention unit 8B) for retaining a connection rule indicating a communication connection method matching the apparatus status, the terminal status and the communication status; and connection method setting means (e.g., implemented in the connection method decision unit 5B) for extracting an appropriate connection method by comparing the apparatus status, the terminal status and the communication status with the connection rule, and setting a control scheme, a terminal interface scheme, a network communication scheme and a protocol conversion scheme for the electronic apparatus, and the communication adapter of the control terminal includes: interface means (e.g., implemented in a terminal driver unit 15a) for providing an interface with the control terminal; communication means (e.g., implemented in the network communication unit 4a) of a control side for performing the network communication; and protocol conversion means (e.g., implemented in a protocol conversion unit 3a) of the control side for performing protocol conversion between an input/output interface of the control terminal and the network communication.

Still another aspect of the remote apparatus management system according to the present invention is characterized by including: a communication adapter (e.g., the computer 1b) of an electronic apparatus; and a communication adapter (e.g., the computer 1a) of a control terminal, wherein the communication adapter of the electronic apparatus includes: electronic apparatus control means (e.g., implemented in the apparatus driver unit 2b) for controlling the electronic apparatus; communication means (e.g., implemented in the network communication unit 4b) of an apparatus side, for performing network communication; and protocol conversion means (e.g., implemented in the protocol conversion unit 3b) of the apparatus side, for performing protocol conversion between control data transmitted/received by the electronic apparatus and the network communication, and the communication adapter of the control terminal includes: interface means (e.g., implemented in the terminal driver unit 15a) for providing an interface with the control terminal; communication means (e.g., implemented in a network communication unit 4a) of a control side, for performing the network communication; protocol conversion means (e.g., implemented in the protocol conversion unit 3a) of the control side, for performing protocol conversion between an input/output interface of the control terminal and the network communication; terminal status collecting means (e.g., implemented in the terminal status collection unit 16B) for collecting terminal status information indicating terminal status including a type, a load or a position of the control terminal; apparatus status collecting means (e.g., implemented in the apparatus status collection unit 7B) for collecting apparatus status information indicating apparatus status including a type, a load or a position of the electronic apparatus; communication status collecting means (e.g., implemented in the communication status collection unit 6B) for collecting communication status information indicating communication status including a type, a path or a load of the communication; connection rule retention means (e.g., implemented in the connection rule retention unit 8B) for retaining a connection rule indicating a communication connection method matching the apparatus status, the terminal status and the communication status; and connection method setting means (e.g., implemented in the connection method decision unit 5B) for extracting an appropriate connection method by comparing the apparatus status, the terminal status and the communication status with the connection rule, and setting a control scheme, a terminal interface scheme, a network communication scheme and a protocol conversion scheme for the electronic apparatus.

Still another aspect of the remote apparatus management system according to the present invention is characterized by including: a communication adapter (for example, the computer 1b) of an electronic apparatus; and a communication adapter (for example, the computer 1a) of a control terminal, wherein the communication adapter of the electronic apparatus includes: electronic apparatus control means (e.g., implemented in the apparatus driver unit 2b) for controlling the electronic apparatus; communication means (e.g., implemented in the network communication unit 4b) of an apparatus side, for performing network communication; and protocol conversion means (e.g., implemented in the protocol conversion unit 3b) of the apparatus side, for performing protocol conversion between control data transmitted/received by the electronic apparatus and the network communication, and the communication adapter of the control terminal includes: interface means (e.g., implemented in the terminal driver unit 15a) for providing an interface with the control terminal; communication means (e.g., implemented in the network communication unit 4a) of a control side, for performing the network communication; and protocol conversion means (e.g., implemented in the protocol conversion unit 3a) of the control side, for performing protocol conversion between an input/output interface of the control terminal and the network communication, and the system further including a program module (e.g., implemented in a connection management module 20) for control via the network, the program module includes: terminal status collecting means (e.g., implemented in the terminal status collection unit 16B) for collecting terminal status information indicating terminal status including a type, a load or a position of the control terminal via the network; apparatus status collecting means (e.g., implemented in the apparatus status collection unit 7B) for collecting apparatus status information indicating apparatus status including a type, a load or a position of the electronic apparatus via the network; communication status collecting means (e.g., implemented in the communication status collection unit 6B) for collecting communication status information indicating communication status including a type, a path or a load of the communication; connection rule retention means (e.g., implemented in the connection rule retention unit 8B) for retaining a connection rule indicating a communication connection method matching the apparatus status, the terminal status and the communication status; and connection method setting means (e.g., implemented in the connection method decision unit 5B) for extracting an appropriate connection method by comparing the apparatus status, the terminal status and the communication status with the connection rule, and setting a control scheme, a terminal interface scheme, a network communication scheme and a protocol conversion scheme for the electronic apparatus via the network.

The remote apparatus management system can also include: rule display means (e.g., implemented in a connection method UI unit 13) for displaying a connection rule indicating a communication connection method matching the apparatus status, the terminal status and the communication status; and rule edit means (e.g., implemented in the connection method UI unit 13) for editing the connection rule according to user manipulation.

The remote apparatus management system can also include: candidate display means (e.g., implemented in the connection method UI unit 13) for displaying candidate connection methods specified by comparing the collected terminal status, apparatus status or communication status with the connection rule indicating a communication connection method matching the apparatus status, the terminal status or the communication status; and connection method selection means (e.g., implemented in the connection method UI unit 13) for selecting a connection method from the candidates displayed by the candidate display means according to user manipulation.

The remote apparatus management system can also include: data saving means (e.g., implemented in the protocol conversion unit 3) for saving data inputted from the electronic apparatus; and operation control means (e.g., implemented in the protocol conversion unit 3) for operating the electronic apparatus and the control terminal asynchronously using the data saved by the data saving means in response to a control request by the control terminal.

The remote apparatus management system can also include: input data saving means (e.g., implemented in the protocol conversion unit 3) for saving input data from the control terminal; and operation control means (e.g., implemented in the protocol conversion unit 3) for allowing the electronic apparatus and the control terminal to operate asynchronously using the data saved by the input data saving means in response to an input request by the electronic apparatus.

The remote apparatus management system can also include selection and edit means (e.g., implemented in the protocol conversion unit 3) for selecting whether saved data is valid or invalid, and for editing the saved data.

The remote apparatus management system can also include: data saving means (e.g., implemented in the protocol conversion unit 3) for saving data inputted from the electronic apparatus; and data retransmission means (e.g., implemented in the protocol conversion unit 3) for retransmitting communication data using the saved data being saved by the data saving means if the communication data is missed in communication from the electronic apparatus to the control terminal.

The remote apparatus management system can also include: input data saving means (e.g., implemented in the protocol conversion unit 3) for saving input data from the control terminal; and data retransmission means (e.g., implemented in the protocol conversion unit 3) for retransmitting communication data using the saved data being saved by the input data saving means if the communication data is missed in communication from the control terminal to the electronic apparatus.

A remote apparatus management method according to the present invention is a remote apparatus management method of remotely managing an electronic apparatus, being characterized by including: an apparatus status collecting step of collecting apparatus status information indicating status of the electronic apparatus; a communication status collecting step of collecting communication status information indicating status of communication between the electronic apparatus and a control terminal for controlling the electronic apparatus; a connection method decision step of deciding a method of connection between the electronic apparatus and the control terminal based on the collected apparatus status information and the communication status information; and a connection method setting step of setting the method of connection between the electronic apparatus and the control terminal based on a result of the decision of the connection method.

The remote apparatus management method can also include: a connection rule storing step of storing connection rules indicating methods of connection between the electronic apparatus and the control terminal beforehand, wherein the connection method decision step can include extracting a connection method matching the collected apparatus status information and the collected communication status information from the stored connection rules.

The remote apparatus management method can also include: a terminal status collecting step of collecting terminal status information indicating status of the control terminal, wherein the connection method setting step can include deciding a method of connection between the electronic apparatus and the control terminal based on the apparatus status information and the communication status information, as well as the collected terminal status information.

Another aspect of the remote apparatus management method according to the present invention is characterized by including: an electronic apparatus control step of controlling an electronic apparatus; a data transmission/reception step of transmitting/receiving data to/from a control terminal connected to a network; a protocol conversion step of performing protocol conversion between control data inputted/outputted by the electronic apparatus and network communication data transmitted/received by the control terminal; an apparatus status collecting step of collecting apparatus status information indicating apparatus status including a type, a load or a position of the electronic apparatus; a communication status collecting step of collecting communication status information indicating communication status including a type, a path or a load of network communication; a connection rule retention step of retaining a connection rule indicating a communication connection methods matching the apparatus status and the communication status; and a connection method setting step of extracting an appropriate connection method by comparing the apparatus status and the communication status with the connection rule, and setting a control scheme, a protocol conversion scheme and a network communication scheme for the electronic apparatus.

Still another aspect of the remote apparatus management method according to the present invention is characterized by including: a control data transmission/reception step of transmitting/receiving control data to/from an electronic apparatus connected to a network; an interface step of providing an interface with a control terminal; a protocol conversion step of performing protocol conversion between the network control data transmitted/received by the electronic apparatus and an input/output interface for input/output by the control terminal; a communication status collecting step of collecting communication status information indicating communication status including a type, a load, a network path or a position of the network electronic apparatus; a terminal status collecting step of collecting terminal status information indicating terminal status including a type, a load or a position of the control terminal; a connection rule retention step of retaining a connection rule indicating a communication connection method matching the terminal status and the communication status; and a connection method setting step of extracting an appropriate connection method by comparing the terminal status and the communication status with the connection rule, and setting a communication control scheme, a protocol conversion scheme and a terminal interface scheme for the network electronic apparatus.

Still another aspect of the remote apparatus management method according to the present invention is characterized by including: an electronic apparatus control step, by a communication adapter of an electronic apparatus, of controlling the electronic apparatus; a communication step of an apparatus side, by the communication adapter of the electronic apparatus, of performing network communication; a protocol conversion step of the apparatus side, by the communication adapter of the electronic apparatus, of performing protocol conversion between control data transmitted/received by the electronic apparatus and the network communication; a terminal status collecting step, by the communication adapter of the electronic apparatus, of collecting terminal status information indicating terminal status including a type, a load or a position of the control terminal; an apparatus status collecting step, by the communication adapter of the electronic apparatus, of collecting apparatus status information indicating apparatus status including a type, a load or a position of the electronic apparatus; a communication status collecting step, by the communication adapter of the electronic apparatus, of collecting communication status information indicating communication status including a type, a path or a load of the communication; a connection rule retention step, by the communication adapter of the electronic apparatus, of retaining a connection rule indicating a communication connection method matching the apparatus status, the terminal status and the communication status; a connection method setting step, by the communication adapter of the electronic apparatus, of extracting an appropriate connection method by comparing the apparatus status, the terminal status and the communication status with the connection rule, and setting a control scheme, a terminal interface scheme, a network communication scheme and a protocol conversion scheme for the electronic apparatus; an interface step, by a communication adapter of the control terminal, of providing an interface with the control terminal; a communication step of a control side, by the communication adapter of the control terminal, of performing the network communication; and a protocol conversion step of the control side, by the communication adapter of the control terminal, of performing protocol conversion between an input/output interface of the control terminal and the network communication.

Still another aspect of the remote apparatus management method according to the present invention is characterized by including: an electronic apparatus control step, by a communication adapter of an electronic apparatus, of controlling the electronic apparatus; a communication step of an apparatus side, by the communication adapter of the electronic apparatus, of performing network communication; a protocol conversion step of the apparatus side, by the communication adapter of the electronic apparatus, of performing protocol conversion between control data transmitted/received by the electronic apparatus and the network communication, and an interface step, by the communication adapter of the control terminal, of providing an interface with the control terminal; a communication step of a control side, by the communication adapter of the control terminal, of performing the network communication; a protocol conversion step of the control side, by the communication adapter of the control terminal, of performing protocol conversion between an input/output interface of the control terminal and the network communication; a terminal status collecting step, by the communication adapter of the control terminal, of collecting terminal status information indicating terminal status including a type, a load or a position of the control terminal; an apparatus status collecting step, by the communication adapter of the control terminal, of collecting apparatus status information indicating apparatus status including a type, a load or a position of the electronic apparatus; a communication status collecting step, by the communication adapter of the control terminal, of collecting communication status information indicating communication status including a type, a path or a load of the communication; a connection rule retention step, by the communication adapter of the control terminal, of retaining a connection rule indicating a communication connection method matching the apparatus status, the terminal status and the communication status; and a connection method setting step, by the communication adapter of the control terminal, of extracting an appropriate connection method by comparing the apparatus status, the terminal status and the communication status with the connection rule, and setting a control scheme, a terminal interface scheme, a network communication scheme and a protocol conversion scheme for the electronic apparatus.

Still another aspect of the remote apparatus management method according to the present invention is characterized by including: an electronic apparatus control step, by a communication adapter of an electronic apparatus, of controlling the electronic apparatus; a communication step of an apparatus side, by the communication adapter of the electronic apparatus, of performing network communication; a protocol conversion step of the apparatus side, by the communication adapter of the electronic apparatus, of performing protocol conversion between control data transmitted/received by the electronic apparatus and the network communication, and an interface step, by a communication adapter of the control terminal, of providing an interface with the control terminal; a communication step of a control side, by the communication adapter of the control terminal, of performing the network communication; a protocol conversion step of the control side, by the communication adapter of the control terminal, of performing protocol conversion between an input/output interface of the control terminal and the network communication; a terminal status collecting step, by a program module for control via the network, of collecting terminal status information indicating terminal status including a type, a load or a position of the control terminal via the network; an apparatus status collecting step, by the program module, of collecting apparatus status information indicating apparatus status including a type, a load or a position of the electronic apparatus via the network; a communication status collecting step, by the program module, of collecting communication status information indicating communication status including a type, a path or a load of the communication; a connection rule retention step, by the program module, of retaining a connection rule indicating a communication connection method matching the apparatus status, the terminal status and the communication status; and a connection method setting step, by the program module, of extracting an appropriate connection method by comparing the apparatus status, the terminal status and the communication status with the connection rule, and setting a control scheme, a terminal interface scheme, a network communication scheme and a protocol conversion scheme for the electronic apparatus via the network.

The remote apparatus management method can also include: a rule display step of displaying a connection rule indicating a communication connection method matching the apparatus status, the terminal status and the communication status; and a rule edit step of editing the connection rule according to user manipulation.

The remote apparatus management method can also include: a candidate display step of displaying candidate connection methods specified by comparing the collected terminal status, apparatus status or communication status with the connection rule indicating a communication connection method matching the apparatus status, the terminal status or the communication status; and a connection method selection step of selecting a connection method from the displayed candidates according to user manipulation.

The remote apparatus management method can also include: a data saving step of saving data inputted from the electronic apparatus; and an operation control step of operating the electronic apparatus and the control terminal asynchronously using the saved data in response to a control request by the control terminal.

The remote apparatus management method can also include: an input data saving step of saving input data from the control terminal; and an operation control step of allowing the electronic apparatus and the control terminal to operate asynchronously using the saved data in response to an input request by the electronic apparatus.

The remote apparatus management method can also include a selection and edit step of selecting whether saved data is valid or invalid, and of editing the saved data.

The remote apparatus management method can also include: a data saving step of saving data inputted from the electronic apparatus; and a data retransmission step of retransmitting communication data using the saved data being saved if the communication data is missed in communication from the electronic apparatus to the control terminal.

The remote apparatus management method can also include: an input data saving step of saving input data from the control terminal; and a data retransmission step of retransmitting communication data using the saved data being saved if the communication data is missed in communication from the control terminal to the electronic apparatus.

A program for managing a remote apparatus according to the present invention is a remote apparatus management program for remotely managing an electronic apparatus, causing a computer to execute: apparatus status collecting processing to collect apparatus status information indicating status of the electronic apparatus; communication status collecting processing to collect communication status information indicating status of communication between the electronic apparatus and a control terminal for controlling the electronic apparatus; connection method decision processing to decide a method of connection between the electronic apparatus and the control terminal based on the collected apparatus status information and the communication status information; and connection method setting processing to set the method of connection between the electronic apparatus and the control terminal based on a result of the decision of the connection method.

With the above configuration, the remote apparatus management system, the remote apparatus management method and the program for managing a remote apparatus according to the present invention can address a change in apparatus status, terminal status and communication status in an environment of the Internet and an environment of a mobile network, achieving the object of the present invention.

Advantages of the Invention

According to the present invention, apparatus status information and communication status information are collected, and a connection method between the electronic apparatuses and the control terminal is decided based on the collected apparatus status information and communication status information. Then, based on the decision result, a method is set of connecting the electronic apparatuses and the control terminal. Therefore, in an environment where a wide variety of electronic apparatuses should be managed and which includes many electronic apparatuses, the connection can be smoothly modified depending on a status change such as of a load of computation processing, a load of communication, and movement of the electronic apparatuses and the control terminal. Additionally, a method can be smoothly modified of connecting the electronic apparatuses and the control terminal depending on both of a status change of the electronic apparatuses and a change of communication status.

According to the present invention, a connection rule indicating a method of connecting the electronic apparatuses and the control terminal can be stored beforehand, and a connection rule can be extracted which matches the collected apparatus status information and communication status information. With this configuration, the connection rule being arranged beforehand can be used to easily set the method of connecting the electronic apparatuses and the control terminal.

According to the present invention, terminal status information can be collected, and a connection method can be decided based on the terminal status information in addition to apparatus status information and communication status information. With this configuration, a method can be smoothly modified of connecting the electronic apparatuses and the control terminal depending on a status change of the control terminal in addition to a status change of the electronic apparatuses and a change of communication status.

BEST MODE FOR CARRYING OUT THE INVENTION

First Exemplary Embodiment

The following will describe a first exemplary embodiment of the present invention with reference to the drawings. FIG. 2 is a block diagram showing one example of configuration of a remote apparatus management system according to the present invention. As shown in FIG. 2, the remote apparatus management system includes a plurality of electronic apparatuses 10, a control terminal 9 for controlling the electronic apparatuses 10 and a computer 1. Also as shown in FIG. 2, the computer 1 and the control terminal 9 are connected to each other via one or more networks 11 (for example, the Internet or LAN).

The electronic apparatuses 10 are apparatuses that are used by wide variety of applications and have a wide variety of functions, and apparatuses that input/output and transmit/receive data using a wide variety of protocols. Specifically, can include digital cameras, mobile phones, RFID readers/writers, in-vehicle sensors (such as position sensors or velocity sensors), weather observation devices, GPS receivers, or the like. The electronic apparatuses 10 can also be servers on a network.

The control terminal 9, which remotely control the plurality of electronic apparatuses 10, is specifically implemented in a data processing device such as a personal computer. The control terminal 9 can also be implemented in a home electric appliance such as a TV receiver containing the CPU or a processor.

The computer 1, which is a device for connecting the electronic apparatuses 10 and the networks 11, is specifically implemented in a data processing device such as a personal computer operating through program control. The computer 1 can also be implemented in a central processing unit, processor, or the like. The computer 1 can also be implemented in a network apparatus (for example, a rooter) with data processing capacity. In case that the electronic apparatuses 10 are digital cameras or mobile phones, for example, the computer 1 can also be implemented in a battery charger containing a processor or the like.

The computer 1 includes an apparatus driver unit 2, a protocol conversion unit 3, a network communication unit 4, a connection method decision unit 5, a communication status collection unit 6, an apparatus status collection unit 7, and a connection rule retention unit 8.

The apparatus driver unit 2 has a function of outputting a control signal to control the electronic apparatuses 10. The network communication unit 4 has a function of transmitting/receiving data (including a control signal), via the networks 11, to/from the control terminal 9 being connected to the networks 11. The protocol conversion unit 3 has a function of protocol conversion between control information outputted by the apparatus driver unit 2 and input/output data transmitted/received by the network communication unit 4.

The apparatus status collection unit 7 has a function of collecting apparatus status including types, loads or positions of the electronic apparatuses 10. The communication status collection unit 6 has a function of collecting communication status including a type, path or load of communication with the control terminal 9 via the networks 11.

The connection rule retention unit 8 has a function of retaining a connection rule indicating a communication connection method between the electronic apparatuses 10 and the control terminal 9 being relevant to certain apparatus status or communication status. Specifically, the connection rule retention unit 8 stores the connection rule in a storage device such as a hard disk device or memory in association with apparatus status data indicating apparatus status or communication status data indicating communication status.

The connection method decision unit 5 has a function of comparing the apparatus status collected by the apparatus status collection unit 7 or the communication status collected by the communication status collection unit 6 with connection rules retained by the connection rule retention unit 8 and extracting a connection rule indicating an appropriate connection method from the connection rule retention unit 8. The connection method decision unit 5 also has a function of outputting the extracted connection rule to notify the apparatus driver unit 2, the protocol conversion unit 3 and the network communication unit 4 of an appropriate connection scheme and allow the units to set an appropriate connection method.

The storage device of the data processing device to implement the computer 1 stores various programs for remote management of the electronic apparatuses 10. For example, the storage device of the data processing device to implement the computer 1 stores a program for managing a remote apparatus causing the computer to execute: apparatus status collecting processing to collect apparatus status information indicating status of electronic apparatuses; communication status collecting processing to collect communication status information indicating status of communication between the electronic apparatuses and a control terminal for controlling the electronic apparatuses; connection method decision processing to decide a method of connection between the electronic apparatuses and the control terminal based on the collected apparatus status information and communication status information; and connection method setting processing to set a method of connecting the electronic apparatuses and the control terminal based on a result of deciding a connection method.

Next, the operation will be described. FIG. 3 is a flowchart showing one example of processing to modify connection of the electronic apparatuses 10 and the control terminal 9 in the remote apparatus management system. First, when a user wishes to control the electronic apparatuses 10, the user manipulates the control terminal 9 to order connection to the computer 1. According to the user manipulation, the control terminal 9 establishes network connection to the computer 1 by any means (for example, via the networks 11 such as the Internet or LAN) (step S1).

Next, when the connection is established by the control terminal 9, the apparatus status collection unit 7 of the computer 1 searches for, through the apparatus driver unit 2, the electronic apparatuses 10 connected to the computer 1. For example, the apparatus status collection unit 7 can retrieve the electronic apparatuses 10 using a known technique such as Plug and Play as a scheme for searching for an apparatus connected to the computer 1. In this case, the apparatus status collection unit 7 collects, for the electronic apparatuses 10 being searched for, data indicating apparatus status of the electronic apparatuses 10 (apparatus status data) (step S2). For example, the apparatus status collection unit 7 inputs, from the electronic apparatuses 10, apparatus status data including an identifier, protocol and connection address of each electronic apparatus 10, as well as the maximum computing amount, a current computing amount, an available memory amount, a current used memory amount, the maximum I/O (input/output) amount, a current I/O (input/output) amount, the maximum number of connections, and the current number of connections of each electronic apparatus 10, and a position, owner, owner group, and access control information of each electronic apparatus 10.

The apparatus status collection unit 7 can acquire the apparatus status data using a standard management protocol such as the SNMP. A storage unit can be provided for retaining the apparatus status data in the computer 1, for example, so that the apparatus status collection unit 7 can read out the apparatus status data from the storage unit.

The communication status collection unit 6 searches for the networks 11 being available to the computer 1 (networks that can be used for connection between the electronic apparatuses 10 and the control terminal 9) via the network communication unit 4. For example, the communication status collection unit 6 can retrieve the networks 11 that can be used for connection between the electronic apparatuses 10 and the control terminal 9 using a known technique including a wireless LAN standard such as IEEE 802.11b, BOOTP or DHCP as a scheme for searching for networks being available to the computer. In this case, the communication status collection unit 6 collects data indicating communication status of the networks 11 (communication status data) for the networks 11 being searched for (step S3). For example, the communication status collection unit 6 receives communication status data including identifiers, protocols and connection addresses of the networks 11, as well as the current time, the connectable control terminal 9, the maximum communication band, a current used band, a communication delay, the packet loss rate and access control information via the networks 11.

The communication status collection unit 6 can acquire the communication status data using a standard management protocol such as the SNMP. A storage unit can be provided for retaining the communication status data in the computer 1, for example, so that the communication status collection unit 6 can read out the communication status data from the storage unit.

In this embodiment, the communication status collection unit 6 also receives communication status data including the information indicating communication status as the above, as well as information indicating terminal status of the control terminal 9 (for example, an identifier, protocol and connection address of the control terminal 9) at step S3.

The processes at step S2 and step S3 can be executed sequentially or in parallel. For example, the computer 1 can perform sequential processing by completing the process at step S2 first and then executing the process at step S3. For example, the computer 1 can execute the process at step S2 while executing the process at step S3 in parallel.

Next, the connection method decision unit 5 uses the collected apparatus status data and communication status data as retrieval keys to extract a connection rule indicating a connection method relevant to current apparatus status and communication status from the connection rule retention unit 8 (step S4).

For example, the connection rule retention unit 8 stores connection rules beforehand in a storage device such as a hard disk device or memory in association with the apparatus status data or communication status data. In this case, at step S4, the connection method decision unit 5 specifies data matching the collected apparatus status data and communication status data, among apparatus status data and communication status data stored in the storage device. Then, the connection method decision unit 5 extracts a connection rule corresponding to the specified apparatus status data and communication status data from the connection rule retention unit 8 (specifically, the storage device).

For example, apparatus status data can include a plurality of elements such as an identifier, a protocol and a connection address, the maximum computing amount, a current computing amount, an available memory amount, a current used memory amount, the maximum I/O (input/output) amount, a current I/O (input/output) amount, the maximum number of connections and the current number of connections of each electronic apparatus 10, a position, an owner, an owner group and access control information of each electronic apparatus 10. In this case, the connection rule retention unit 8 can also store a connection rule beforehand in the storage device in association with each element of the apparatus status data. The connection method decision unit 5 can specify all of elements matching elements of the collected apparatus status data among the respective elements of the apparatus status data stored in the storage device, and calculate the number of matching elements as a score value. Then, the connection method decision unit 5 can extract a connection rule having the maximum calculated score value from the connection rule retention unit 8.

For example, communication status data can include a plurality of elements such as identifiers, protocols and connection addresses of the networks 11, the current time, the control terminal 9 being connectable, the maximum communication band, a current used band, a communication delay, a packet loss rate, and access control information. In this case, the connection rule retention unit 8 can also store a connection rule beforehand in the storage device in association with each element of the communication status data. The connection method decision unit 5 can specify all of elements matching elements of the collected communication status data among the respective elements of the communication status data stored in the storage device, and calculate the number of matching elements as a score value. Then, the connection method decision unit 5 can extract a connection rule having the maximum calculated score value from the connection rule retention unit 8.

For example, the communication status data can include information indicating terminal status such as an identifier, protocol and connection address of the control terminal 9. In this case, the connection rule retention unit 8 can store a connection rule beforehand in the storage device in association with the communication status data including the terminal status. The connection method decision unit 5 can specify data matching communication status data including the collected terminal status among the communication status data including the terminal status stored in the storage device. Then, the connection method decision unit 5 can extract a connection rule corresponding to communication status data including the specified terminal status from the connection rule retention unit 8 (specifically, the storage device).

Next, the connection method decision unit 5 checks whether or not the extracted connection rule indicates disconnection (step S5). If an action in the extracted connection rule indicates end processing, then the connection method decision unit 5 outputs a notification signal to disconnect the electronic apparatuses 10 from the control terminal 9 to the apparatus driver unit 2, the protocol conversion unit 3 and the network communication unit 4. Then, the electronic apparatuses 10 are disconnected from the control terminal 9, stopping the operation. For example, if the operation is timed out without communication between the electronic apparatuses 10 and the control terminal 9 or without connection switch processing, then the connection method decision unit 5 extracts a connection rule indicating disconnection and finishes the processing.

Next, according to the extracted connection rule, the connection method decision unit 5 outputs a notification signal to designate a connection method to the apparatus driver unit 2, the protocol conversion unit 3 and the network communication unit 4 to allow the units to set them to a connection method in the connection rule.

For example, the apparatus driver unit 2, which has multiple pieces of setting information to connect to the electronic apparatuses 10, selects setting information according to the connection method in the notification signal inputted from the connection method decision unit 5. Then, the apparatus driver unit 2 sets the selected setting information as setting information used for protocol conversion of input/output to/from the electronic apparatuses 10 (step S6).

For example, the protocol conversion unit 3, which has multiple pieces of setting information used for protocol conversion of data for communication between the electronic apparatuses 10 and the control terminal 9, selects setting information according to the connection method in the notification signal inputted from the connection method decision unit 5. Then, the protocol conversion unit 3 sets the selected setting information as setting information used for protocol conversion of data for communication between the electronic apparatuses 10 and the control terminal 9 (step S7).

For example, the network communication unit 4, which has multiple pieces of setting information to connect to the networks 11, selects setting information according to the connection method in the notification signal inputted from the connection method decision unit 5. Then, the network communication unit 4 sets the selected setting information as setting information used for protocol conversion for data transmission/reception via the networks 11 (step S8).

Next, the control terminal 9 starts transmission of control information to control the electronic apparatuses 10. Then, the network communication unit 4 of the computer 1 receives a control signal from the control terminal 9 via the networks 11 (step S9). Then, the network communication unit 4 passes (outputs) the received control signal to the protocol conversion unit 3.

The protocol conversion unit 3 performs protocol conversion for control information based on the setting information (step S10). Then, the protocol conversion unit 3 passes (outputs) the control information subjected to the protocol conversion to the apparatus driver unit 2. The apparatus driver unit 2 outputs a control signal and controls the electronic apparatuses 10 based on the inputted control information. The apparatus driver unit 2 also receives input of information of a response to the outputted control signal from the electronic apparatuses 10 (step S11).

When the protocol conversion unit 3 receives (input of) the response information from the apparatus driver unit 2, it performs protocol conversion on the response information based on the setting information (step S12). Then, the protocol conversion unit 3 passes (outputs) the response information subjected to the protocol conversion to the network communication unit 4.

The control terminal 9 receives the response information from the network communication unit 4 of the computer 1 via the networks 11. Then, the control terminal 9 further outputs information of a response to the electronic apparatuses 10 based on the received response information (step S13).

Next, the computer 1 returns to the processes at steps S2 and S3 to repetitively monitor whether or not there is the next status change of apparatus status and communication status. Then, the computer 1 repetitively executes processes at steps S2 to S13 until a time-out at step S5.

Next, the operation of the protocol conversion will be described. FIG. 4 is a flowchart showing one example of processing for the protocol conversion (protocol conversion process at step S12) on data from the electronic apparatuses 10. FIG. 5 is a flowchart showing one example of processing for the protocol conversion (protocol conversion process at step S10) on data from the control terminal 9.

In this embodiment, protocol conversion is basically conversion processing into control protocols used in the electronic apparatuses 10 or communication protocols used in the networks 11 for data transmitted/received between the electronic apparatuses 10 and the control terminal 9. The electronic apparatuses 10 use, for example, protocols such as USB, IEEE 1394, Bluetooth, ZigBee, a serial scheme, a parallel scheme, PS/2, or IrDA as a control protocol.

First, protocol conversion processing on data transmitted in a direction from the electronic apparatuses 10 to the control terminal 9 (i.e., a protocol conversion process at step S12) will be described.

When the apparatus driver unit 2 inputs data (for example, response information) from the electronic apparatuses 10, the protocol conversion unit 3 acquires (input of) a certain size of data from the apparatus driver unit 2 according to an apparatus control protocol (step S221).

When the protocol conversion unit 3 inputs the data, it identifies (determines) whether or not the inputted data should be saved (step S222). For example, if the inputted data is used at another time (asynchronously), or the data is retransmitted because communication includes missing data due to connection modification or connection failure, then the protocol conversion unit 3 determines to save the input data. Then, the protocol conversion unit 3 saves the input data in a storage device such as a hard disk device or memory (step S223).

In other words, if the inputted data is used at another time (asynchronously), the protocol conversion unit 3 functions as data saving means for saving data inputted from the electronic apparatuses 10 and as operation control means for allowing the electronic apparatuses 10 and the control terminal 9 to operate asynchronously for a control request from the control terminal 9 using the data saved in the data saving means. Alternatively, the protocol conversion unit 3 functions as input data saving means for saving input data from the control terminal 9 and as operation control means for allowing the electronic apparatuses 10 and the control terminal 9 to operate asynchronously for an input request by the electronic apparatuses 10 using the data saved in the input data saving means. In this case, the protocol conversion unit 3 can also function as selection and edit means for choosing whether the saved data is valid or invalid and for editing the saved data.

The protocol conversion unit 3 also functions as data saving means for saving data inputted from the electronic apparatuses 10 in retransmitting the data when the data is missed in communication because of connection modification or connection failure. The unit 3 functions as data retransmission means for retransmitting the communication data using saved data being saved in the data saving means if communication data is missed in communication from the electronic apparatuses 10 to the control terminal 9. Alternatively, the protocol conversion unit 3 functions as input data saving means for saving input data from the control terminal 9, and as data retransmission means for retransmitting communication data using saved data being saved in the input data saving means if the communication data is missed in communication from the control terminal 9 to the electronic apparatuses 10.

The protocol conversion unit 3 also identifies (determines) whether or not the input data should be transmitted to the control terminal 9 (step S224). For data communicated between the electronic apparatuses 10 and the control terminal 9 is video or audio data which can be partly missed, for example, it is possible to control a sampling interval to sample the data. In this case, if the apparatus driver 2 acquires (input of) video at a sampling frequency of 30 Hz, for example, the protocol conversion unit 3 can reduce sampling accuracy by conversion to a sampling frequency of 15 Hz. The protocol conversion unit 3 can also improve sampling accuracy by conversion to merge or interpolate a plurality of data.

If the protocol conversion unit 3 determines at step S224 that the data does not need to be transmitted, it simply ends the protocol conversion processing. If the protocol conversion unit 3 determines that the data needs to be transmitted, it proceeds to processing after step S225.

The protocol conversion unit 3 can also operate as if the protocol conversion unit 3 itself is the electronic apparatus 10 to respond to the control terminal 9 without inputting/outputting data to/from the electronic apparatuses 10. In this case, the protocol conversion unit 3 determines whether or not it has already acquired data to be transmitted (step S225). For example, the protocol conversion unit 3 determines whether or not the data to be transmitted has been stored in a storage device such as a hard disk device or memory. If there remains data to be transmitted, the protocol conversion unit 3 reads out the data to be transmitted from the storage device (step S226). In this way, smooth manipulation is possible in the control terminal 9 without being affected by computation processing and communication processing for the electronic apparatuses 10. In this case, the protocol conversion unit 3 can also use data being saved previously at step S223 (for example, read out the data saved at step S223 as data to be transmitted).

Next, if the protocol conversion unit 3 determines at step S224 that the data should be transmitted, or reads out at steps S225 and S226 the data to be transmitted, then it identifies (determines) whether or not the pre-determined data conversion is necessary on the transmitted data (step S227). If the transmitted data is video or an image, for example, the protocol conversion unit 3 determines that it is necessary to convert the resolution, the number of colors or an image size. Then, the protocol conversion unit 3 performs the pre-determined data conversion (for example, conversion of the resolution, the number of colors or an image size) on the transmitted data (for example, video or an image) (step S228).

Next, the protocol conversion unit 3 identifies (determines) whether or not compression and encryption processing is necessary on the transmitted data (step S229). If the protocol conversion unit 3 determines that the compression processing and encryption processing are necessary, it performs the compression processing and encryption processing on input data (step S230). For example, the protocol conversion unit 3 executes the compression processing and encryption processing using a compression scheme, a compression rate, a window size for the compression processing, an encryption scheme, or a window size for the encryption processing as parameters of CODEC conversion including compression and encryption.

Next, the protocol conversion unit 3 creates communication data by setting a communication header and attaching the communication header to the transmitted data (step S231). Then, the unit 3 communicates the created communication data via the networks. Herein, the communication header includes an originating address of the computer 1, and a destination address of the control terminal 9. The communication header is also given a communication path and TTL as protocol options, as necessary.

Next, the protocol conversion unit 3 sets network parameters of the network communication unit 4 (step S232). Herein, the network parameters include RWIN, MTU, a communication channel, power management and the like. If the parameters are not modified, the protocol conversion unit 3 does not need to set the network parameters at step S232.

Then, the protocol conversion unit 3 allows the network communication unit 4 to send out (transmit) the communication data generated at step S231 (step S233).

Next, protocol conversion processing (i.e., protocol conversion process at step S10) will be described on data being transmitted in the direction from the control terminal 9 to the electronic apparatuses 10.

First, the protocol conversion unit 3 sets the network parameters of the network communication unit 4 according to processing similar to step S232 shown in FIG. 4 (step S301). If the parameters are not modified, the protocol conversion unit 3 does not need to set the network parameters at step S301.

Next, the protocol conversion unit 3 determines whether or not any data has been received from the control terminal 9 (step S302). If no data has been received, the protocol conversion unit 3 simply ends the protocol conversion processing. If any data has been received, the protocol conversion unit 3 proceeds to processing after step S303. If the network communication unit 4 has received communication data from the control terminal 9 but there is no received data because the communication is set to non-blocking, the protocol conversion unit 3 determines that no data has been received and simply ends the processing.

Next, the protocol conversion unit 3 extracts a data body of the received data excluding the communication header, and identifies (determines) whether or not the received data has been compressed and encrypted (step S303). If the data has been compressed and encrypted, the protocol conversion unit 3 decrypts the received data (step S304).

Next, the protocol conversion unit 3 identifies (determines) whether or not the received data needs to be saved (step S305). If received control information indicates a control instruction to set a state of the electronic apparatuses 10, for example, the received control information can be used at another time. In such a case, the protocol conversion unit 3 determines to save the received control information. Then, the protocol conversion unit 3 saves the received data in a storage device such as a hard disk device or memory (step S306). The received data can be missed when a connection method is modified, for example. In such a case, the protocol conversion unit 3 can use the saved data to retransmit data or restore the data.

The protocol conversion unit 3 can also operate as if the protocol conversion unit 3 itself is the control terminal 9 to pass (output) control information to the apparatus driver unit 2 without actually communicating with the control terminal 9. In this case, the protocol conversion unit 3 determines whether or not control information to be outputted has been already acquired (step S307). For example, the protocol conversion unit 3 determines whether or not the control information to be outputted has been stored in a storage device such as a hard disk device or memory. If there is the control information to be outputted, the protocol conversion unit 3 reads out the control information from an arbitrary storage unit (step S308). In this way, it is possible to control the electronic apparatuses 10 without being affected by a delay in communication with the control terminal 9. In this case, the protocol conversion unit 3 can also use the data being saved previously at step S306 (for example, read out the data saved at step S306 as control information).

Then, the protocol conversion unit 3 controls the electronic apparatuses 10 via the apparatus driver unit 2 based on the extracted control information (step S309).

As described in the above, according to this embodiment, apparatus status information and communication status information are collected and monitored, and a connection rule indicating a connection method is decided which is relevant to the collected apparatus status and communication status. Then, the connection method is modified according to the decided connection rule. Therefore, connection can be modified smoothly according to a status change due to a load of computation processing, a load of communication, or movement of the electronic apparatuses 10 and the control terminal 9 in an environment such as the Internet where a wide variety of electronic apparatuses 10 should be managed and which includes many electronic apparatuses 10. Moreover, a method of connection between the electronic apparatuses 10 and the control terminal 9 can be smoothly modified depending on both status changes of the electronic apparatuses 10 and a change of communication status.

Second Exemplary Embodiment

Next, a second exemplary embodiment of the present invention will be described with reference to the drawings. FIG. 6 is a block diagram showing a configuration example of a remote apparatus management system according to the second exemplary embodiment. As shown in FIG. 6, according to this embodiment, the computer 1 includes means 13 for setting and checking a connection method (a connection method UI unit) in addition to the components illustrated in the first exemplary embodiment. In this embodiment, the computer 1 can be operated by a user 14.

The connection method UI unit 13 has a function of displaying connection rules retained by the connection rule retention unit 8 on a display device such as a display for presentation to the user 14. The connection method UI unit 13 also has a function of editing the connection rules stored in the connection rule retention unit 8 according to manipulation by the user 14. This allows the user 14 to edit the connection rules. The connection method UI unit 13 also has a function of displaying candidate connection methods to be set on the display device according to a connection rule selected by the connection method decision unit 5 by comparison to collected apparatus status data and communication status data. The connection method UI unit 13 also has a function of deciding a connection method to be set according to manipulation by the user 14. This allows the user 14 to select a connection method to be set from the plurality of candidate connection methods.

Next, the operation will be described. FIG. 7 is a flowchart showing a processing example to modify connection between the electronic apparatuses 10 and the control terminal 9 in the remote apparatus management system according to the second exemplary embodiment. In relation to this embodiment, differences from the first exemplary embodiment will be mainly described.

First, the connection method UI unit 13 of the computer 1 gets ready to accept manipulation from the user 14 (step S51). For example, the connection method UI unit 13 displays various display screens of a user login screen on the display device to prompt the user 14 to input a user ID and a password. The connection method UI unit 13 displays the various display screens using any user interface scheme such as a daemon program of a Web server or serial console I/O, for example.

Next, if the connection method UI unit 13 performs login processing of the user 14 by inputting the user ID and the password according to manipulation by the user 14 for access limitation for the user 14 (step S52). Then, the computer 1 proceeds to loop processing after step S53, where it executes the processing by branching to various processes of the loop processing depending on event occurrence due to manipulation by the user 14, or event occurrence of apparatus status or communication status.

If the user 14 edits the connection rules, for example, the connection method UI unit 13 extracts apparatus status data and communication status data from the connection rule retention unit 8, and extracts a plurality of connection rules (hereinafter, also referred to as a rule set) indicating a method of connection between the electronic apparatuses 10 and the control terminal 9 corresponding to the apparatus status data and communication status data (step S53).

Next, the connection method UI unit 13 executes sort and refinement processing on respective display items of the extracted apparatus status data, communication status data and connection rules indicating a connection method (step S54). Then, the connection method UI unit 13 displays the apparatus status data, communication status data and connection rules subjected to the sort and refinement processing on the display device for presentation to the user 14. In this case, each connection rule can include history information being previously applied by the connection method decision unit 5. Then, the connection method UI unit 13 can execute the sort and refinement processing based on the history information included in each connection rule.

The connection method UI unit 13 selects a connection rule from the presented connection rules according to manipulation by the user 14, and edits the apparatus status, communication status and connection method. Alternatively, the connection method UI unit 13 inputs new apparatus status, communication status or connection methods, creates new connection rules and additionally stores the rules in the connection rule retention unit 8 according to manipulation by the user 14 (step S55).

If the user 14 performs manipulation to save or view the connection rules, for example, the connection method UI unit 13 can also save a connection rule set (a set of apparatus status data, communication status data and a connection rule) in the connection rule retention unit 8, or read a connection rule set being previously saved from the connection rule retention unit 8 according to the manipulation by the user 14 (step S56).

If the computer 1 receives a connection request from the control terminal 9, for example, it executes processing after step S57 to start connection between the electronic apparatuses 10 and the control terminal 9. In FIG. 7, the processes at steps S57 to S60 are similar to processing at steps S1 to S4 illustrated in the first exemplary embodiment (see FIG. 3). If automatic setting is not set for setting of a method of connection between the electronic apparatuses 10 and the control terminal 9, the connection method decision unit 5 can extract a plurality of connection rules to be presented to the user 14 as candidate connection rules at step S60.

Although it has been described in relation to this embodiment that to start the processing to connect the electronic apparatuses 10 and the control terminal 9, the flow returns to the beginning of the loop processing after executing the process at step S57 and then proceeds to the processes at steps S58 and S59 in the loop processing, the flow can also simply proceed to steps S58 and S59 after executing the process at step S57.

Next, the computer 1 checks whether or not automatic setting has been set for the connection rule extracted by the connection method decision unit 5 (step S61). Specifically, the computer 1 checks whether or not a flag designating automatic processing on the connection rule (also referred to as an automatic processing flag) is set (see step S66 discussed later). If the automatic setting has been set, the flow simply proceeds to processes at steps S71 to S73. If the automatic setting has not been set, the flow proceeds to processes at steps S62 to S63.

If the automatic setting has not been set, the connection method UI unit 13 displays apparatus status data collected by the apparatus status collection unit 7 on the display device according to manipulation by the user 14 (step S62). For example, the connection method UI unit 13 displays data about the electronic apparatuses 10 including identifiers, a protocol and connection addresses of the apparatuses, the maximum computing amount, a current computing amount, an available memory amount, a current used memory amount, the maximum I/O amount, a current I/O amount, the maximum number of connections, and the current number of connections of each apparatus, an position, owner, owner group, and access control information of each electronic apparatus.

The connection method UI unit 13 also displays the communication status data collected by the communication status collection unit 6 on the display device according to manipulation by the user 14 (step S63). For example, the connection method UI unit 13 displays data including identifiers, protocols and connection addresses of the networks 11, the control terminal 9 being connectable, the maximum communication band, a current used band, a communication delay, a packet loss rate, and access control information.

The connection method UI unit 13 also displays a connection method relevant to the collected apparatus status data and communication status data, or an applicable connection method on the display device according to manipulation by the user 14 (step S64). In this case, the connection method UI unit 13 displays a connection method (or a plurality of candidate connection methods) according to the connection rule extracted by the connection method decision unit 5 at step S60. For example, the connection method UI unit 13 displays history information indicating a method of setting the apparatus driver unit 2, a method of setting the protocol conversion unit 3, a method of setting the network communication unit 4, or a previously applied connection method as a connection method.

If the user 14 judges that the electronic apparatuses 10 and the control terminal 9 may be connected using a connection method in the extracted connection rule, the user manipulates the computer 1 to direct that connection should be executed using the presented connection method. Alternatively, the user 14 manipulates the computer 1 to direct that a connection method to be applied should be selected from the plurality of presented candidate connection methods. Then, the connection method UI unit 13 outputs a notification signal to apply the connection rule extracted by the connection method decision unit 5 to the apparatus driver unit 2, the protocol conversion unit 3 and the network communication unit 4 according to check manipulation by the user 14, and allows the units to set them to a connection method in the connection rule. Alternatively, the connection method UI unit 13 outputs a notification signal to apply a connection rule selected by the user 14, and allows the units to set them to a connection method in the connection rule (step S65).

Next, if the user 14 no more needs to perform check manipulation on the selected connection rule, the computer 1 sets an automatic processing flag on the connection rule (step S66). If the user 14 makes manipulation to direct that automatic processing should be performed, for example, the computer 1 sets an automatic processing flag on the connection rule. Then, if a connection rule is extracted which has the automatic processing flag being set at step S60 in the following loop processing, then the computer 1 determines at step S61 to be "Y" and simply proceeds to steps S71 to S73 (by skipping processes at steps S62 to S66) to automatically set a connection method.

For the automatic processing, the computer 1 can calculate a value indicating the pre-determined accuracy of a result of comparing apparatus status and communication status with the connection rules, proceed to steps S71 to S73 only if a value is obtained which indicates a certain accuracy or more, and automatically set a connection method. If apparatus status data or communication status data includes a plurality of elements, for example, the computer 1 can specify all of elements matching elements of collected apparatus status data and communication status data among the respective elements of apparatus status data and communication status data stored in the connection rule retention unit 8, and calculate the number of the matching elements as a score value. Then, the computer 1 can simply proceed to processes at steps S71 to S73 under condition that the score value is a pre-determined threshold or more.

The apparatus status data and communication status data include multiple parameters, so that they cause ambiguity in comparison with connection rules. To compare the apparatus status and communication status with the connection rules, pre-determined threshold processing is necessary. Several approaches are known for calculation of a value indicating an accuracy of a retrieval result with an ambiguous data set, which will not be described herein in detail since it is not a purpose of the present invention.

Processes at steps S71 to S78 are similar to the processes at steps S6 to S13 illustrated in relation to the first exemplary embodiment (see FIG. 3), respectively.

Then, the computer 1 returns to the first processing in the loop processing to process the next user manipulation. If the next user manipulation is logout manipulation, the computer 1 executes the logout processing and ends the processing (step S99).

As described in the above, according to this embodiment, apparatus status information and communication status information are collected and monitored, and a connection rule indicating a connection method is decided which is relevant to the collected apparatus status and communication status. Then, the connection method is modified according to the decided connection rule. The connection rules can be managed (for example, viewed or edited) according to user manipulation. Therefore, connection can be modified smoothly according to a status change due to a load of computation processing, a load of communication, or movement of the electronic apparatuses 10 and the control terminal 9 in an environment such as the Internet where a wide variety of electronic apparatuses 10 should be managed and which includes many electronic apparatuses 10. The connection rules can be managed easily according to user manipulation. Moreover, a method of connection between the electronic apparatuses 10 and the control terminal 9 can be smoothly modified depending on both status changes of the electronic apparatuses 10 and a change of communication status.

Third Exemplary Embodiment

Next, a third exemplary embodiment of the present invention will be described with reference to the drawings. FIG. 8 is a block diagram showing a configuration example of a remote apparatus management system according to the third exemplary embodiment. As shown in FIG. 8, the remote apparatus management system includes an electronic apparatus 10, a plurality of control terminals 9 for controlling the electronic apparatus 10, and a computer 1A. Also as shown in FIG. 8, the computer 1A and the electronic apparatus 10 are connected to each other via the one or more networks 11 (for example, the Internet or LAN).

The computer 1A, which is a device for connecting the control terminals 9 and the networks 11, is specifically implemented in a data processing device such as a personal computer operating through program control. The computer 1A can also be implemented in a central processing unit, processor, or the like. The computer 1A can also be implemented in a network apparatus (for example, a rooter) with data processing capacity.

The computer 1A includes a protocol conversion unit 3A, a network communication unit 4A, a connection method decision unit 5A, a communication status collection unit 6A, a connection rule retention unit 8A, a terminal driver unit 15 and a terminal status collection unit 16.

The terminal driver unit 15 has a function of transmitting/receiving data to/from the respective control terminals 9. The network communication unit 4A has a function of transmitting/receiving data, via the networks 11, to/from the electronic apparatus 10 being connected to the networks 11. The protocol conversion unit 3A has a function of protocol conversion between input/output data outputted by the terminal driver unit 15 and input/output data transmitted/received by the network communication unit 4A.

The terminal status collection unit 16 has a function of collecting terminal status including types, loads or positions of the control terminals 9. The communication status collection unit 6A has a function of collecting communication status including a type, path or load of communication with the electronic apparatus 10 via the networks 11.

The connection rule retention unit 8A has a function of retaining a connection rule indicating a communication connection method between the electronic apparatus 10 and the control terminals 9 being relevant to certain terminal status or communication status. Specifically, the connection rule retention unit 8A stores the connection rule in a storage device such as a hard disk device or memory in association with terminal status data indicating terminal status or communication status data indicating communication status.

The connection method decision unit 5A has a function of comparing the terminal status collected by the terminal status collection unit 16 or the communication status collected by the communication status collection unit 6A with connection rules retained by the connection rule retention unit 8A and extracting a connection rule indicating an appropriate connection method from the connection rule retention unit 8A. The connection method decision unit 5A also has a function of outputting the extracted connection rule to notify the terminal driver unit 15, the protocol conversion unit 3A and the network communication unit 4A of an appropriate connection scheme and allow the units to set an appropriate connection method.

Next, the operation will be described. FIG. 9 is a flowchart showing a processing example to modify connection of the electronic apparatus 10 and the control terminals 9 in the remote apparatus management system according to the third exemplary embodiment. First, the electronic apparatus 10 establishes network connection to the computer 1A by any means (for example, via the networks 11 such as the Internet or LAN) at a pre-determined time (for example, at each pre-determined time interval) (step S101).

Next, when the connection is established by the electronic apparatus 10, the terminal status collection unit 16 of the computer 1A searches for, through the terminal driver unit 15, the control terminals 9 connected to the computer 1A. For example, the terminal status collection unit 16 can retrieve the control terminals 9 using a known technique such as Plug and Play as a scheme for searching for terminals connected to the computer 1A. In this case, the terminal status collection unit 16 collects data indicating terminal status of the control terminals 9 (terminal status data) for the control terminals 9 being searched for (step S102). For example, the terminal status collection unit 16 inputs, from the control terminals 9, terminal status data including an identifier, protocol and connection address of each control terminal 9, as well as the maximum computing amount, a current computing amount, an available memory amount, a current used memory amount, the maximum I/O (input/output) amount, a current I/O (input/output) amount, the maximum number of connections, and the current number of connections of each control terminal 9, and a position, owner, owner group, and access control information of each control terminal 9.

The terminal status collection unit 16 can acquire the terminal status data using a management protocol such as the SNMP. A storage unit can be provided for retaining the terminal status data in the computer 1A, for example, so that the terminal status collection unit 16 can read out the terminal status data from the storage unit.

The communication status collection unit 6A searches for the networks 11 being available to the computer 1A (networks that can be used for connection between the electronic apparatus 10 and the control terminals 9) via the network communication unit 4A. For example, the communication status collection unit 6A can retrieve the networks 11 that can be used for connection between the electronic apparatus 10 and the control terminals 9 using a known technique including a wireless LAN standard such as IEEE 802.11b, BOOTP or DHCP as a scheme for searching for networks being available to the computer. In this case, the communication status collection unit 6A collects, for the networks 11 being searched for, data indicating communication status of the networks 11 (communication status data) (step S103). For example, the communication status collection unit 6A receives communication status data including identifiers, protocols and connection addresses of the networks 11, as well as the current time, the connectable electronic apparatus 10, the maximum communication band, a current used band, a communication delay, the packet loss rate and access control information via the networks 11.

The communication status collection unit 6A can acquire the communication status data using a management protocol such as the SNMP. A storage unit can be provided for retaining the communication status data in the computer 1A, for example, so that the communication status collection unit 6A can read out the communication status data from the storage unit.

In this embodiment, the communication status collection unit 6A also receives communication status data including the information indicating communication status as the above, as well as information indicating apparatus status of the electronic apparatus 10 (for example, an identifier, protocol and connection address of the electronic apparatus 10) at step S103.

The processes at step S102 and step S103 can be executed sequentially or in parallel. For example, the computer 1A can perform sequential processing by completing the process at step S102 first and then executing the process at step S103. For example, the computer 1A can execute the process at step S102 while executing the process at step S103 in parallel.

Next, the connection method decision unit 5A uses the collected terminal status data and communication status data as retrieval keys to extract a connection rule indicating a connection method relevant to current terminal status and communication status from the connection rule retention unit 8A (step S104).

For example, the connection rule retention unit 8A stores connection rules beforehand in a storage device such as a hard disk device or memory in association with the terminal status data or communication status data. In this case, at step S104, the connection method decision unit 5A specifies data matching the collected terminal status data and communication status data, among terminal status data and communication status data stored in the storage device. Then, the connection method decision unit 5A extracts a connection rule corresponding to the specified terminal status data and communication status data from the connection rule retention unit 8A (specifically, the storage device).

For example, terminal status data can include a plurality of elements such as an identifier, a protocol and a connection address, the maximum computing amount, a current computing amount, an available memory amount, a current used memory amount, the maximum I/O (input/output) amount, a current I/O (input/output) amount, the maximum number of connections and the current number of connections of each control terminal 9, a position, an owner, an owner group and access control information of each control terminal 9. In this case, the connection rule retention unit 8A can also store a connection rule beforehand in the storage device in association with each element of the terminal status data. The connection method decision unit 5A can specify all of elements matching elements of the collected terminal status data among the respective elements of the terminal status data stored in the storage device, and calculate the number of matching elements as a score value. Then, the connection method decision unit 5A can extract a connection rule having the maximum calculated score value from the connection rule retention unit 8A.

For example, communication status data can include a plurality of elements such as identifiers, protocols and connection addresses of the networks 11, the current time, the electronic apparatus 10 being connectable, the maximum communication band, a current used band, a communication delay, a packet loss rate, and access control information. In this case, the connection rule retention unit 8A can also store a connection rule beforehand in the storage device in association with each element of the communication status data. The connection method decision unit 5A can specify all of elements matching elements of the collected communication status data among the respective elements of the communication status data stored in the storage device, and calculate the number of matching elements as a score value. Then, the connection method decision unit 5A can extract a connection rule having the maximum calculated score value from the connection rule retention unit 8A.

For example, the communication status data can include information indicating apparatus status such as an identifier, protocol and connection address of the electronic apparatus 10. In this case, the connection rule retention unit 8A can store a connection rule beforehand in the storage device in association with the communication status data including the apparatus status. The connection method decision unit 5A can specify data matching communication status data including the collected apparatus status among the communication status data including the apparatus status stored in the storage device. Then, the connection method decision unit 5A can extract a connection rule corresponding to communication status data including the specified apparatus status from the connection rule retention unit 8A (specifically, the storage device).

Next, the connection method decision unit 5A checks whether or not the extracted connection rule indicates disconnection (step S105). If an action in the extracted connection rule indicates end processing, then the connection method decision unit 5A outputs a notification signal to disconnect the control terminals 9 from the electronic apparatus 10 to the terminal driver unit 15, the protocol conversion unit 3A and the network communication unit 4A. Then, the control terminals 9 are disconnected from the electronic apparatus 10, stopping the operation. For example, if the operation is timed out without communication between the control terminals 9 and the electronic apparatus 10 or without connection switch processing, then the connection method decision unit 5A extracts a connection rule indicating disconnection and finishes the processing.

Next, according to the extracted connection rule, the connection method decision unit 5A outputs a notification signal to designate a connection method to the terminal driver unit 15, the protocol conversion unit 3A and the network communication unit 4A to allow the units to set them to a connection method in the connection rule.

For example, the terminal driver unit 15, which has multiple pieces of setting information to connect to the control terminals 9, selects setting information according to the connection method in the notification signal inputted from the connection method decision unit 5A. Then, the terminal driver unit 15 sets the selected setting information as setting information used for protocol conversion of input/output to/from the control terminals 9 (step S106).

For example, the protocol conversion unit 3A, which has multiple pieces of setting information used for protocol conversion of data for communication between the electronic apparatus 10 and the control terminals 9, selects setting information according to the connection method in the notification signal inputted from the connection method decision unit 5A. Then, the protocol conversion unit 3A sets the selected setting information as setting information used for protocol conversion of data for communication between the electronic apparatus 10 and the control terminals 9 (step S107).

For example, the network communication unit 4A, which has multiple pieces of setting information to connect to the networks 11, selects setting information according to the connection method in the notification signal inputted from the connection method decision unit 5A. Then, the network communication unit 4A sets the selected setting information as setting information used for protocol conversion for data transmission/reception via the networks 11 (step S108).

Next, the electronic apparatus 10 starts transmission of control information to the control terminals 9. Then, the network communication unit 4A of the computer 1A receives the control information from the electronic apparatus 10 via the networks 11 (step S109). Then, the network communication unit 4A passes (outputs) the received control information to the protocol conversion unit 3A.

The protocol conversion unit 3A performs protocol conversion for control information based on the setting information (step S110). Then, the protocol conversion unit 3A passes (outputs) the control information subjected to the protocol conversion to the terminal driver unit 15. The terminal driver unit 15 transmits/receives input/output data necessary to control the electronic apparatus 10 to/from the control terminals 9 based on the inputted control information (step S111).

When the protocol conversion unit 3A receives (input of) the control information from the terminal driver unit 15, it performs protocol conversion on the control information based on the setting information (step S112). Then, the protocol conversion unit 3A passes (outputs) the control information subjected to the protocol conversion to the network communication unit 4A.

The electronic apparatus 10 receives the control information from the network communication unit 4A of the computer 1A via the networks 11. Then, the electronic apparatus 10 executes various control based on the received control information, and outputs information of a response to the control information (step S113).

Next, the computer 1A returns to the processes at steps S102 and S103 to repetitively monitor whether or not there is the next status change of terminal status and communication status. Then, the computer 1A repetitively executes processes at steps S102 to S113 until a time-out at step S105.

Next, protocol conversion operation will be described. FIG. 10 is a flowchart showing one example of processing for protocol conversion on data from the control terminals 9 (protocol conversion processing at step S112) according to the third exemplary embodiment. FIG. 11 is a flowchart showing one example of processing for protocol conversion on data from the electronic apparatus 10 (protocol conversion processing at step S110) according to the third exemplary embodiment.

In this embodiment, protocol conversion is basically conversion processing into an input/output protocol used in the control terminals 9 or an apparatus control communication protocol used to control the electronic apparatus 10 for data transmitted/received between the electronic apparatus 10 and the control terminals 9. The control terminals 9 use a protocol such as USB, a serial scheme, TCP/IP, HTTP, VNC, or a remote desktop scheme, for example, as an input/output protocol. On the other hand, the computer 1A and the electronic apparatus 10 use a protocol such as UPnP, ECHONET or JINI as an apparatus control communication protocol.

First, protocol conversion processing on data transmitted in a direction from the control terminals 9 to the electronic apparatus 10 (i.e., a protocol conversion process at step 5112) will be described.

When the terminal driver unit 15 inputs data (for example, control information) from the control terminals 9, the protocol conversion unit 3A acquires (input of) a certain size of data from the terminal driver unit 15 according to a terminal control protocol (step S121).

When the protocol conversion unit 3A inputs the data, it identifies (determines) whether or not the inputted data should be saved (step 5122). For example, if the inputted data is used at another time, or the data is retransmitted because communication includes missing data due to connection modification or connection failure, then the protocol conversion unit 3A determines to save the input data. Then, the protocol conversion unit 3A saves the input data in a storage device such as a hard disk device or memory (step S123).

The protocol conversion unit 3A also identifies (determines) whether or not the input data should be transmitted to the electronic apparatus 10 (step S124). For data communicated between the electronic apparatus 10 and the control terminals 9 is video or audio data which can be partly missed, for example, it is possible to control a sampling interval to sample the data. In this case, if the network communication unit 4A acquires (input of) video at a sampling frequency of 30 Hz, for example, the protocol conversion unit 3A can reduce sampling accuracy by conversion to a sampling frequency of 15 Hz. The protocol conversion unit 3A can also improve sampling accuracy by conversion to merge or interpolate a plurality of data.

If the protocol conversion unit 3A determines at step S124 that the data does not need to be transmitted, it simply ends the protocol conversion processing. If the protocol conversion unit 3A determines that the data needs to be transmitted, it proceeds to processing after step S125.

The protocol conversion unit 3A can also operate as if the protocol conversion unit 3A itself is manipulated by the control terminals 9 to respond to the electronic apparatus 10 without inputting/outputting data to/from the control terminals 9. In this case, the protocol conversion unit 3A determines whether or not it has already acquired data to be transmitted (step S125). For example, the protocol conversion unit 3A determines whether or not the data to be transmitted has been stored in a storage device such as a hard disk device or memory. If there remains data to be transmitted, the protocol conversion unit 3A reads out the data to be transmitted from the storage device (step S126). In this way, control is possible in the electronic apparatus 10 without being affected by computation processing and communication processing for the control terminals 9. In this case, the protocol conversion unit 3A can also use data being saved previously at step S123 (for example, read out the data saved at step S123 as data to be transmitted).

Next, the protocol conversion unit 3A identifies (determines) whether or not compression and encryption processing is necessary on the transmitted data (step S127). If the protocol conversion unit 3A determines that the compression processing and encryption processing are necessary, it performs the compression processing and encryption processing on input data (step S128). For example, the protocol conversion unit 3 executes the compression processing and encryption processing using a compression scheme, a compression rate, a window size for the compression processing, an encryption scheme, or a window size for the encryption processing as parameters of CODEC conversion including compression and encryption.

Next, the protocol conversion unit 3A creates communication data by setting a communication header and attaching the communication header to the transmitted data (step S129). Then, the unit 3A communicates the created communication data via the networks. Herein, the communication header includes an originating address of the computer 1A, and a destination address of the electronic apparatus 10. The communication header is also given a communication path and TTL as protocol options, as necessary.

Next, the protocol conversion unit 3A sets network parameters of the network communication unit 4A (step S130). Herein, the network parameters include RWIN, MTU, a communication channel, power management and the like. If the parameters are not modified, the protocol conversion unit 3A does not need to set the network parameters at step S130.

Then, the protocol conversion unit 3A allows the network communication unit 4A to send out (transmit) the communication data generated at step 5129 (step S131).

Next, protocol conversion processing (i.e., protocol conversion process at step 5110) will be described on data being transmitted in the direction from the electronic apparatus 10 to the control terminals 9.

First, the protocol conversion unit 3A sets the network parameters of the network communication unit 4A according to processing similar to step 5130 shown in FIG. 10 (step S331). If the parameters are not modified, the protocol conversion unit 3A does not need to set the network parameters at step S331.

Next, the protocol conversion unit 3A determines whether or not any data has been received from the electronic apparatus 10 (step S332). If no data has been received, the protocol conversion unit 3A simply ends the protocol conversion processing. If any data has been received, the protocol conversion unit 3A proceeds to processing after step S333. If the network communication unit 4A has received communication data from the electronic apparatus 10 but there is no received data because the communication is set to non-blocking, the protocol conversion unit 3A determines that no data has been received and simply ends the processing.

Next, the protocol conversion unit 3A extracts a data body of the received data excluding the communication header, and identifies (determines) whether or not the received data has been compressed and encrypted (step S333). If the data has been compressed and encrypted, the protocol conversion unit 3A decrypts the received data (step S334).

Next, the protocol conversion unit 3A identifies (determines) whether or not it is necessary to perform pre-determined data conversion on the received data (step S335). If the received data is video or image data, for example, the protocol conversion unit 3A determines that it is necessary to convert the resolution, the number of colors, and an image size. Then, the protocol conversion unit 3A performs pre-determined data conversion (for example, converts the resolution, the number of colors, and an image size) on the received data (for example, video or an image) (step S336).

Next, the protocol conversion unit 3A identifies (determines) whether or not the received data needs to be saved (step S337). If the received control information may be used at another time, for example, the protocol conversion unit 3A determines to save the received data. Then, the protocol conversion unit 3A saves the received data in a storage device such as a hard disk device or memory (step S338). The received data can be missed when a connection method is modified, for example. In such a case, the protocol conversion unit 3A can use the saved data to retransmit data or restore the data.

The protocol conversion unit 3A can also operate as if the protocol conversion unit 3A itself is the electronic apparatus 10 to pass (output) control information to the terminal driver unit 15 without actually communicating with the electronic apparatus 10. In this case, the protocol conversion unit 3A determines whether or not control information to be outputted has been already acquired (step S339). For example, the protocol conversion unit 3A determines whether or not the control information to be outputted has been stored in a storage device such as a hard disk device or memory. If there is the control information to be outputted, the protocol conversion unit 3A reads out the control information from an arbitrary storage unit (step S340). In this way, control is possible in the control terminals 9 without being affected by a delay in communication with the electronic apparatus 10. In this case, the protocol conversion unit 3A can also use the data being saved previously at step S338 (for example, read out the data saved at step S338 as control information).

Then, the protocol conversion unit 3A inputs/outputs information necessary to control the electronic apparatus 10 to/from the control terminals 9 via the terminal driver unit 15 based on the extracted control information (step S341).

As described in the above, according to this embodiment, communication status information and terminal status information are collected and monitored, and a connection rule indicating a connection method is decided which is relevant to the collected terminal status and communication status. Then, the connection method is modified according to the decided connection rule. Therefore, connection can be modified smoothly according to a status change due to a load of computation processing, a load of communication, or movement of the electronic apparatus 10 and the control terminals 9 in an Internet environment where a wide variety of electronic apparatuses 10 should be managed and which includes many electronic apparatuses 10. Moreover, a method of connection between the electronic apparatus 10 and the control terminals 9 can be smoothly modified depending on both a status change of the electronic apparatus 10 and a change of communication status. Further, a connection method between the electronic apparatus 10 and the control terminals 9 can be smoothly modified depending on not only a status change of the electronic apparatus 10 and a communication status change, but also a status change of the control terminals 9.

Fourth Exemplary Embodiment

Next, a fourth exemplary embodiment of the present invention will be described with reference to the drawings. FIG. 12 is a block diagram showing a configuration example of a remote apparatus management system according to the fourth exemplary embodiment. As shown in FIG. 12, according to this embodiment, the computer 1A includes means for setting and checking a connection method (a connection method UI unit) 13 in addition to the components illustrated in the third exemplary embodiment. In this embodiment, the computer 1A can be operated by a user 14.

The connection method UI unit 13 has a function of displaying connection rules retained by the connection rule retention unit 8A on a display device such as a display for presentation to the user 14. The connection method UI unit 13 also has a function of editing the connection rules stored in the connection rule retention unit 8A according to manipulation by the user 14. This allows the user 14 to edit the connection rules. The connection method UI unit 13 also has a function of displaying candidate connection methods to be set on the display device according to a connection rule selected by the connection method decision unit 5A by comparison to collected terminal status data and communication status data. The connection method UI unit 13 also has a function of deciding a connection method to be set according to manipulation by the user 14. This allows the user 14 to select a connection method to be set from the plurality of candidate connection methods.

Next, the operation will be described. FIG. 13 is a flowchart showing a processing example to modify connection between the electronic apparatus 10 and the control terminals 9 in the remote apparatus management system according to the fourth exemplary embodiment. In relation to this embodiment, differences from the third exemplary embodiment will be mainly described.

First, in this embodiment, processing at initial steps S151 to S156 executed by the connection method UI unit 13 of the computer 1A is similar to the processing at steps S51 to S56 illustrated in the second exemplary embodiment (see FIG. 7).

If the computer 1A receives a connection request from the electronic apparatus 10, for example, it executes processing after step S157 to start connection between the electronic apparatus 10 and the control terminals 9. In FIG. 13, the processes at steps S157 to S160 are similar to processes at steps S101 to S104 illustrated in the third exemplary embodiment (see FIG. 9). If automatic setting is not set for setting of a method of connection between the electronic apparatus 10 and the control terminals 9, the connection method decision unit 5A can extract a plurality of connection rules to be presented to the user 14 as candidate connection rules at step 5160.

Although it has been described in relation to this embodiment that to start the processing to connect the electronic apparatus 10 and the control terminals 9, the flow returns to the beginning of the loop processing after executing the process at step S157 and then proceeds to the processes at steps 5158 and 5159 in the loop processing, the flow can also simply proceed to steps 5158 and 5159 after executing the process at step S157.

Next, the computer 1A checks whether or not automatic setting has been set for the connection rule extracted by the connection method decision unit 5A (step S161). Specifically, the computer 1A checks whether or not a flag designating automatic processing on the connection rule (also referred to as an automatic processing flag) is set (see step S166 discussed later). If the automatic setting has been set, the flow simply proceeds to processes at steps S171 to S173. If the automatic setting has not been set, the flow proceeds to processes at steps S162 to S163.

Next, if the automatic setting has not been set, the connection method UI unit 13 displays terminal status data collected by the terminal status collection unit 16 on the display device according to manipulation by the user 14 (step S162). For example, the connection method UI unit 13 displays data about the control terminals 9 including identifiers, a protocol and connection addresses of the terminals, identifiers, a protocol and connection addresses of the terminals, as well as the maximum computing amount, a current computing amount, an available memory amount, a current used memory amount, the maximum I/O amount, a current I/O amount, the maximum number of connections, and the current number of connections of each terminal, the maximum resolution/number of colors, the current resolution/number of colors, a screen size, position, owner, owner group, and access control information of each control terminal.

The connection method UI unit 13 also displays the communication status data collected by the communication status collection unit 6A on the display device according to manipulation by the user 14 (step S163). For example, the connection method UI unit 13 displays data including identifiers, protocols and connection addresses of the networks 11, the electronic apparatus 10 being connectable, the maximum communication band, a current used band, a communication delay, a packet loss rate, and access control information.

The connection method UI unit 13 also displays a connection method relevant to the collected terminal status data and communication status data, or an applicable connection method on the display device according to manipulation by the user 14 (step S164). In this case, the connection method UI unit 13 displays a connection method (or a plurality of candidate connection methods) according to the connection rule extracted by the connection method decision unit 5A at step S160. For example, the connection method UI unit 13 displays history information indicating a method of setting the terminal driver unit 15, a method of setting the protocol conversion unit 3A, a method of setting the network communication unit 4A, or a previously applied connection method as a connection method.

If the user 14 judges that the electronic apparatus 10 and the control terminals 9 may be connected using a connection method in the extracted connection rule, the user manipulates the computer 1A to direct that connection should be executed using the presented connection method. Alternatively, the user 14 manipulates the computer 1A to direct that a connection method to be applied should be selected from the plurality of presented candidate connection methods. Then, the connection method UI unit 13 outputs a notification signal to apply the connection rule extracted by the connection method decision unit 5A to the terminal driver unit 15, the protocol conversion unit 3A and the network communication unit 4A according to check manipulation by the user 14, and allows the units to set them to a connection method in the connection rule. Alternatively, the connection method UI unit 13 outputs a notification signal to apply a connection rule selected by the user 14, and allows the units to set them to a connection method in the connection rule (step S165).

Next, if the user 14 no more needs to perform check manipulation on the selected connection rule, the computer 1A sets an automatic processing flag on the connection rule (step S166). If the user 14 makes manipulation to direct that automatic processing should be performed, for example, the computer 1A sets an automatic processing flag on the connection rule. Then, if a connection rule is extracted which has the automatic processing flag being set at step S160 in the following loop processing, then the computer 1A determines at step S161 to be "Y" and simply proceeds to steps S171 to S173 (by skipping processes at steps S162 to S166) to automatically set a connection method.

For the automatic processing, the computer 1A can calculate a value indicating the pre-determined accuracy of a result of comparing terminal status and communication status with the connection rules, proceed to steps S171 to S173 only if a value is obtained which indicates a certain accuracy or more, and automatically set a connection method. If terminal status data or communication status data includes a plurality of elements, for example, the computer 1A can specify all of elements matching elements of collected terminal status data and communication status data among the respective elements of terminal status data and communication status data stored in the connection rule retention unit 8A, and calculate the number of the matching elements as a score value. Then, the computer 1A can simply proceed to processes at steps S171 to S173 under condition that the score value is a pre-determined threshold or more.

The terminal status data and communication status data include multiple parameters, so that they cause ambiguity in comparison with connection rules. To compare the terminal status and communication status with the connection rules, pre-determined threshold processing is necessary. Several approaches are known for calculation of a value indicating an accuracy of a retrieval result with an ambiguous data set, which will not be described herein in detail since it is not a purpose of the present invention.

Processes at steps S171 to S178 are similar to the processes at steps S106 to S113 illustrated in relation to the third exemplary embodiment (see FIG. 9), respectively.

Then, the computer 1A returns to the first processing in the loop processing to process the next user manipulation. If the next user manipulation is logout manipulation, the computer 1A executes the logout processing and ends the processing (step S199).

As described in the above, according to this embodiment, terminal status information and communication status information are collected and monitored, and a connection rule indicating a connection method is decided which is relevant to the collected terminal status and communication status. Then, the connection method is modified according to the decided connection rule. The connection rules can be managed (for example, viewed or edited) according to user manipulation. Therefore, connection can be modified smoothly according to a status change due to a load of computation processing, a load of communication, or movement of the electronic apparatus 10 and the control terminals 9 in an environment such as the Internet where a wide variety of electronic apparatuses 10 should be managed and which includes many electronic apparatuses 10. The connection rules can be managed easily according to user manipulation. Moreover, a method of connection between the electronic apparatus 10 and the control terminals 9 can be smoothly modified depending on both a status change of the electronic apparatus 10 and a change of communication status. Further, a connection method between the electronic apparatus 10 and the control terminals 9 can be smoothly modified depending on not only a status change of the electronic apparatus 10 and a communication status change, but also a status change of the control terminals 9.

Fifth Exemplary Embodiment

Next, a fifth exemplary embodiment of the present invention will be described with reference to the drawings. FIG. 14 is a block diagram showing a configuration example of a remote apparatus management system according to the fifth exemplary embodiment. As shown in FIG. 14, the remote apparatus management system includes the plurality of electronic apparatuses 10, the plurality of control terminals 9 for controlling the electronic apparatuses 10, a computer 1a connected to the control terminals 9, a computer 1b connected to the electronic apparatuses 10, and a connection management module 20. Also as shown in FIG. 14, the computer 1a and the computer 1b are connected to each other via the one or more networks 11 (for example, the Internet or LAN).

The computer 1a, which is a device for connecting the control terminals 9 and the networks 11 (a communication adapter of the control terminals 9), is specifically implemented in a data processing device such as a personal computer operating through program control. The computer 1a can also be implemented in a central processing unit, processor, or the like. The computer 1a can also be implemented in a network apparatus (for example, a rooter) with data processing capacity.

The computer 1a includes a protocol conversion unit 3a, a network communication unit 4a, and a terminal driver unit 15a.

The terminal driver unit 15a has a function of transmitting/receiving data to/from the control terminals 9. The network communication unit 4a has a function of transmitting/receiving data, via the networks 11, to/from the computer 1b being connected to the networks 11. The protocol conversion unit 3a has a function of protocol conversion between input/output data inputted/outputted by the terminal driver unit 15a and input/output data transmitted/received by the network communication unit 4a.

The computer 1b, which is a device for connecting the electronic apparatuses 10 and the networks 11 (a communication adapter of the electronic apparatuses 10), is specifically implemented in a data processing device such as a personal computer operating through program control. The computer 1b can also be implemented in a central processing unit, processor, or the like. The computer 1b can also be implemented in a network apparatus (for example, a rooter) with data processing capacity.

The computer 1b includes an apparatus driver unit 2b, a protocol conversion unit 3b, and a network communication unit 4b.

The apparatus driver unit 2b has a function of transmitting/receiving a control signal to/from the electronic apparatuses 10. The network communication unit 4b has a function of transmitting/receiving data, via the networks 11, to/from the computer 1a being connected to the networks 11. The protocol conversion unit 3b has a function of protocol conversion between input/output data inputted/outputted by the apparatus driver unit 2b and input/output data transmitted/received by the network communication unit 4b.

Specifically, the connection management module 20 can be contained in either of the computer 1a or the computer 1b as means implemented in software. The connection management module 20 can also be implemented in a computer different from the computer 1a and the computer 1b.

The connection management module 20 includes the connection method decision unit 5B, the communication status collection unit 6B, the apparatus status collection unit 7B, the connection rule retention unit 8B, and the terminal status collection unit 16B.

The terminal status collection unit 16B has a function of collecting terminal status including types, loads or positions of the control terminals 9. The apparatus status collection unit 7B has a function of collecting apparatus status including types, loads or positions of the electronic apparatuses 10. The communication status collection unit 6B has a function of collecting communication status including a type, path or load of communication with the control terminals 9 via the networks 11.

The connection rule retention unit 8B has a function of retaining a connection rule indicating a communication connection method between the electronic apparatuses 10 and the control terminals 9 being relevant to certain apparatus status, terminal status or communication status. Specifically, the connection rule retention unit 8B stores the connection rule in a storage device such as a hard disk device or memory in association with apparatus status data indicating apparatus status, terminal status data indicating terminal status or communication status data indicating communication status.

The connection method decision unit 5B has a function of comparing the apparatus status collected by the apparatus status collection unit 7B, the terminal status collected by the terminal status collection unit 16B or the communication status collected by the communication status collection unit 6B with connection rules retained by the connection rule retention unit 8B and extracting a connection rule indicating an appropriate connection method from the connection rule retention unit 8B. The connection method decision unit 5B also has a function of outputting the extracted connection rule to notify the apparatus driver unit 2b, the terminal driver unit 15a, the protocol conversion units 3a, 3b and the network communication units 4a, 4b of an appropriate connection scheme and allow the units to set an appropriate connection method.

Next, the operation will be described. FIG. 15 is a flowchart showing a processing example to modify connection of the electronic apparatuses 10 and the control terminals 9 in the remote apparatus management system according to the fifth exemplary embodiment.

First, the control terminals 9 and the electronic apparatuses 10 connect to the computers 1a and 1b by arbitrary means (for example, via the networks 11 such as the Internet or LAN) at a pre-determined time (for example, at each predetermined time interval, or according to user manipulation) (step S201).

Next, when the connection is established by the electronic apparatuses 10 or the control terminals 9, the terminal status collection unit 16B of the connection management module 20 searches for, through the terminal driver unit 15a, the control terminals 9 connected to the computer 1a. In this case, the terminal status collection unit 16B collects, for the control terminals 9 being searched for, data indicating terminal status of the control terminals 9 (terminal status data) (step S202).

For example, the terminal status collection unit 16B inputs, from the control terminals 9, terminal status data including identifiers, protocols and connection addresses of the control terminals 9, as well as the maximum computing amount, a current computing amount, an available memory amount, a current used memory amount, the maximum I/O (input/output) amount, a current I/O (input/output) amount, the maximum number of connections, the current number of connections, the maximum resolution/number of colors, the current resolution/number of colors, and a screen size of the control terminals 9, and data of terminal status such as positions, owners, owner groups, and access control information of the control terminals.

The apparatus status collection unit 7B also searches for the electronic apparatuses 10 connected to the computer 1b via the apparatus driver unit 2b. In this case, the apparatus status collection unit 7B collects, for the electronic apparatuses 10 being searched for, data indicating apparatus status of the electronic apparatuses 10 (apparatus status data) (step S203). For example, the apparatus status collection unit 7B inputs, from the electronic apparatuses 10, identifiers, a protocol and connection addresses of the electronic apparatuses 10, as well as apparatus status data including data of apparatus status such as the maximum computing amount, a current computing amount, an available memory amount, a current used memory amount, the maximum I/O (input/output) amount, a current I/O (input/output) amount, the maximum number of connections, and the current number of connections of each electronic apparatus 10, positions, owners, owner groups, and access control information of the electronic apparatuses.

The communication status collection unit 6B also examines the networks 11 via the network communication units 4a and 4b, or directly, to search for the networks 11. For example, the communication status collection unit 6B can retrieve the networks 11 that can be used for connection between the electronic apparatuses 10 and the control terminals 9 using a widely used known technique including a wireless LAN standard such as IEEE 802.11b, BOOTP or DHCP as a scheme for searching for networks being available to the computer. In this case, the communication status collection unit 6B collects, for the networks 11 being searched for, data indicating communication status of the networks 11 (communication status data) (step S204). For example, the communication status collection unit 6B receives communication status data including identifiers, protocols and connection addresses of the networks 11, as well as the current time, the maximum communication band, a current used band, a communication delay, the packet loss rate and access control information via the networks 11.

Next, the connection method decision unit 5B uses the collected terminal status, apparatus status and communication status data as retrieval keys to extract a connection rule indicating a connection method relevant to current terminal status, apparatus status and communication status from the connection rule retention unit 8B (step S206).

Next, the connection method decision unit 5B checks whether or not the extracted connection rule indicates disconnection (step S206). If an action in the extracted connection rule indicates end processing, then the connection method decision unit 5B outputs a notification signal to disconnect the control terminals 9 from the electronic apparatuses 10 to the terminal driver unit 15a, the apparatus driver unit 2b, the protocol conversion units 3a and 3b, and the network communication units 4a and 4b. Then, the control terminals 9 are disconnected from the electronic apparatuses 10, stopping the operation.

Next, according to the extracted connection rule, the connection method decision unit 5B outputs a notification signal to designate a connection method to the terminal driver unit 15a, the apparatus driver unit 2b, the protocol conversion units 3a and 3b, and the network communication units 4a and 4b to allow the units to set them to a connection method in the connection rule (steps S207 to S210).

Next, the electronic apparatus 10 starts transmission of control information. Then, the apparatus driver unit 2b of the computer 1b receives the control information from the electronic apparatuses 10 (step S211). Then, the apparatus driver unit 2b passes (outputs) the received control information to the protocol conversion unit 3b.

When the protocol conversion unit 3b receives (input of) the control information, it performs protocol conversion on the control information based on the setting information (step S212). Then, the protocol conversion unit 3b passes (outputs) the control information subjected to the protocol conversion to the network communication unit 4b. The network communication unit 4b transmits the control information to the network communication unit 4a of the computer 1a via either of the networks 11 (step S213).

When the network communication unit 4a receives the control information, the protocol conversion unit 3a of the computer 1a performs protocol conversion on the control information based on setting information (step S214). Then, the protocol conversion unit 3a passes (outputs) the control information subjected to the protocol conversion to the terminal driver unit 15a. In turn, the terminal driver unit 15a inputs/outputs data to/from the control terminals 9 (step S215), and inputs the control information for the electronic apparatuses 10 from the control terminals 9.

When the terminal driver unit 15a receives the control information from the control terminal 9, the protocol conversion unit 3a performs protocol conversion on the control information based on setting information (step S216). Then, the protocol conversion unit 3a passes (outputs) the control information subjected to the protocol conversion to the network communication unit 4a. The network communication unit 4a transmits the control information to the network communication unit 4b of the computer 1b via either of the networks 11 (step S217).

When the network communication unit 4b receives the control information, the protocol conversion unit 3b performs protocol conversion on the control information based on setting information (step S218). Then, the protocol conversion unit 3b passes (outputs) the control information subjected to the protocol conversion to the apparatus driver unit 2b.

The electronic apparatuses 10 receive (input of) the control information from the apparatus driver unit 2b of the computer 1b. Then, the electronic apparatuses 10 execute various control based on the inputted control information, and outputs response information to the control information (step S219).

Next, the computers 1a and 1b and the connection management module 20 return to processing at steps S202 to S204 to repetitively monitor the next status change in terminal status, apparatus status or communication status. Then, the computers 1a and 1b and the connection management module 20 repetitively execute processing at steps S202 to S219 until the processing is timed out at step S206.

As described in the above, according to this embodiment, communication status information, terminal status information and apparatus status information are collected and monitored, and a connection rule indicating a connection method is decided which is relevant to the collected terminal status, apparatus status and communication status. Then, the connection method is modified according to the decided connection rule. Therefore, connection can be modified smoothly according to a status change due to a load of computation processing, a load of communication, or movement of the electronic apparatuses 10 and the control terminals 9 in an environment such as the Internet where a wide variety of electronic apparatuses 10 should be managed and which includes many electronic apparatuses 10. Further, a connection method between the electronic apparatuses 10 and the control terminals 9 can be smoothly modified depending on all of status changes of the electronic apparatuses 10, status changes of the control terminals 9 and communication status changes.

Sixth Exemplary Embodiment

Next, a sixth exemplary embodiment of the present invention will be described with reference to the drawings. FIG. 16 is a block diagram showing a configuration example of a remote apparatus management system according to the sixth exemplary embodiment. As shown in FIG. 16, according to this embodiment, the connection management module 20 includes the means for setting and checking a connection method (connection method UI unit) 13 in addition to the components illustrated in the fifth exemplary embodiment. In this embodiment, the connection management module 20 can be operated by the user 14.

The connection method UI unit 13 has a function of displaying connection rules retained by the connection rule retention unit 8B on a display device such as a display for presentation to the user 14. The connection method UI unit 13 also has a function of editing the connection rules stored in the connection rule retention unit 8B according to manipulation by the user 14. This allows the user 14 to edit the connection rules. The connection method UI unit 13 also has a function of displaying candidate connection methods to be set on the display device according to a connection rule selected by the connection method decision unit 5B by comparison to collected terminal status data, apparatus status data and communication status data. The connection method UI unit 13 also has a function of deciding a connection method to be set according to manipulation by the user 14. This allows the user 14 to select a connection method to be set from the plurality of candidate connection methods.

Next, the operation will be described. FIG. 17 is a flowchart showing a processing example to modify connection between the electronic apparatuses 10 and the control terminals 9 in the remote apparatus management system according to the sixth exemplary embodiment. In relation to this embodiment, differences from the fifth exemplary embodiment will be mainly described.

First, in this embodiment, processing at initial steps S251 to S256 executed by the connection method UI unit 13 of the connection management module 20 is similar to the processing at steps S51 to S56 illustrated in the second exemplary embodiment (see FIG. 7).

If the connection management module 20 receives a connection request from the electronic apparatuses 10 or the control terminals 9, for example, it executes processing after step S261 to start connection between the electronic apparatuses 10 and the control terminals 9. In FIG. 17, the processes at steps S261 to S265 are similar to processes at steps S201 to S205 illustrated in the fifth exemplary embodiment (see FIG. 15). If automatic setting is not set for setting of a method of connection between the electronic apparatuses 10 and the control terminals 9, the connection method decision unit 5B can extract a plurality of connection rules to be presented to the user 14 as candidate connection rules at step S265.

Although it has been described in relation to this embodiment that to start the processing to connect the electronic apparatuses 10 and the control terminals 9, the flow returns to the beginning of the loop processing after executing the process at step S261 and then proceeds to the processes at steps S262 and S263 in the loop processing, the flow can also simply proceed to steps S262 and S263 after executing the process at step S261.

Next, the connection management module 20 checks whether or not automatic setting has been set for the connection rule extracted by the connection method decision unit 5B (step S266). Specifically, the connection management module 20 checks whether or not a flag designating automatic processing on the connection rule (also referred to as an automatic processing flag) is set (see step S272 discussed later). If the automatic setting has been set, the flow simply proceeds to processes at steps S273 to S276. If the automatic setting has not been set, the flow proceeds to processes at steps S267 to S270.

Next, if the automatic setting has not been set, the connection method UI unit 13 displays terminal status data collected by the terminal status collection unit 16B on the display device according to manipulation by the user 14 (step S267). The connection method UI unit 13 also displays apparatus status data collected by the apparatus status collection unit 7B on the display device according to manipulation by the user 14 (step S268). The connection method UI unit 13 also displays the communication status data collected by the communication status collection unit 6B on the display device according to manipulation by the user 14 (step S269). The connection method UI unit 13 further displays a connection method relevant to the collected terminal status data, apparatus status data and communication status data, or an applicable connection method on the display device according to manipulation by the user 14 (step S270).

If the user 14 judges that the electronic apparatuses 10 and the control terminals 9 may be connected using a connection method in the extracted connection rule, the user manipulates the connection management module 20 to direct that connection should be executed using the presented connection method. Alternatively, the user 14 manipulates the connection management module 20 to direct that a connection method to be applied should be selected from the plurality of presented candidate connection methods. Then, the connection method UI unit 13 outputs a notification signal to apply the connection rule extracted by the connection method decision unit 5B to the terminal driver unit 15a, the apparatus driver unit 2b, the protocol conversion units 3a and 3b, and the network communication units 4a and 4b according to check manipulation by the user 14, and allows the units to set them to a connection method in the connection rule. Alternatively, the connection method UI unit 13 outputs a notification signal to apply a connection rule selected by the user 14, and allows the units to set them to a connection method in the connection rule (step S271).

Next, if the user 14 no more needs to perform check manipulation on the selected connection rule, the connection management module 20 sets an automatic processing flag on the connection rule (step S272). If the user 14 makes manipulation to direct that automatic processing should be performed, for example, the connection management module 20 sets an automatic processing flag on the connection rule. Then, if a connection rule is extracted which has the automatic processing flag being set at step S265 in the following loop processing, then the connection management module 20 determines at step S266 to be "Y" and proceeds to steps S273 to S276 (by skipping processes at steps S267 to S272) to automatically set a connection method.

For the automatic processing, the connection management module 20 can calculate a value indicating the pre-determined accuracy of a result of comparing terminal status, apparatus status and communication status with the connection rules, proceed to steps S273 to S276 only if a value is obtained which indicates a certain accuracy or more, and automatically set a connection method. If terminal status data, apparatus status data or communication status data includes a plurality of elements, for example, the connection management module 20 can specify all of elements matching elements of collected terminal status data, apparatus status data and communication status data among the respective elements of terminal status data, apparatus status data and communication status data stored in the connection rule retention unit 8B, and calculate the number of the matching elements as a score value. Then, the connection management module 20 can simply proceed to processes at steps S273 to S276 under condition that the score value is a pre-determined threshold or more.

The apparatus status data, terminal status data and communication status data include multiple parameters, so that they cause ambiguity in comparison with connection rules. To compare the terminal status, apparatus status and communication status with the connection rules, pre-determined threshold processing is necessary. Several approaches are known for calculation of a value indicating an accuracy of a retrieval result with an ambiguous data set, which will not be described herein in detail since it is not a purpose of the present invention.

Processes at steps S273 to S285 are similar to the processes at steps S207 to S219 illustrated in relation to the fifth exemplary embodiment (see FIG. 15), respectively.

Then, the connection management module 20 returns to the first processing in the loop processing to process the next user manipulation. If the next user manipulation is logout manipulation, the connection management module 20 executes the logout processing and ends the processing (step S299).

As described in the above, according to this embodiment, apparatus status information, terminal status information and communication status information are collected and monitored, and a connection rule indicating a connection method is decided which is relevant to the collected apparatus status, terminal status and communication status. Then, the connection method is modified according to the decided connection rule. The connection rules can be managed (for example, viewed or edited) according to user manipulation. Therefore, connection can be modified smoothly according to a status change due to a load of computation processing, a load of communication, or movement of the electronic apparatus 10 and the control terminals 9 in an environment such as the Internet where a wide variety of electronic apparatuses 10 should be managed and which includes many electronic apparatuses 10. The connection rules can be managed easily according to user manipulation. Moreover, a connection method between the electronic apparatuses 10 and the control terminals 9 can be smoothly modified depending on all of status changes of the electronic apparatuses 10, status changes of the control terminals 9 and communication status changes.

Seventh Exemplary Embodiment

Next, a seventh exemplary embodiment of the present invention will be described with reference to the drawings. FIG. 18 is a block diagram showing a configuration example of a remote apparatus management system according to the seventh exemplary embodiment. As shown in FIG. 18, the remote apparatus management system includes the plurality of electronic apparatuses 10, the plurality of control terminals 9 for controlling the electronic apparatuses 10, the computer 1a connected to the control terminals 9, a plurality of computers 1b connected to the electronic apparatuses 10, and a computer 1c. Also as shown in FIG. 18, the computer 1a, the respective computers 1b and the computer 1c are connected to one another via the one or more networks 11 (for example, the Internet or LAN).

The computer 1a, which is a device for connecting the control terminals 9 and the networks 11, is specifically implemented in a data processing device such as a personal computer operating through program control. The computer 1a can also be implemented in a central processing unit, processor, or the like. The computer 1a can also be implemented in a network apparatus (for example, a rooter) with data processing capacity.

The computer 1a includes a protocol conversion unit 3a, a network communication unit 4a, and a terminal driver unit 15a.

The terminal driver unit 15a has a function of transmitting/receiving data to/from the control terminals 9. The network communication unit 4a has a function of transmitting/receiving data via the networks 11. The protocol conversion unit 3a has a function of protocol conversion between input/output data inputted/outputted by the terminal driver unit 15a and input/output data transmitted/received by the network communication unit 4a.

Each of the computers 1b, which is a device for connecting the electronic apparatuses 10 and the networks 11, is specifically implemented in a data processing device such as a personal computer operating through program control. Each computer 1b can also be implemented in a central processing unit, processor, or the like. Each computer 1b can also be implemented in a network apparatus (for example, a rooter) with data processing capacity.

Each computer 1b includes an apparatus driver unit 2b, a protocol conversion unit 3b, and a network communication unit 4b.

The apparatus driver unit 2b has a function of transmitting/receiving a control signal to/from the electronic apparatuses 10. The network communication unit 4b has a function of transmitting/receiving data via the networks 11. The protocol conversion unit 3b has a function of protocol conversion between input/output data inputted/outputted by the apparatus driver unit 2b and input/output data transmitted/received by the network communication unit 4b.

The computer 1c, which is connected to the networks 11, is specifically implemented in a data processing device such as a personal computer operating through program control. The computer 1c can also be implemented in a central processing unit, processor, or the like. The computer 1c can also be implemented in a network apparatus (for example, a rooter) with data processing capacity.

The computer 1c includes a network communication unit 4c, a connection method decision unit 5c, a connection rule retention unit 8c and a status collection unit 21.

The network communication unit 4c has a function of transmitting/receiving data via the networks 11. The status collection unit 21 has a function of collecting status including types, loads and positions of the control terminals 9, the electronic apparatuses 10 and network communication.

The connection rule retention unit 8c has a function of retaining a connection rule indicating a communication connection method between the electronic apparatuses 10 and the control terminals 9 being relevant to certain apparatus status, terminal status or communication status. Specifically, the connection rule retention unit 8c stores the connection rule in a storage device such as a hard disk device or memory in association with apparatus status data indicating apparatus status, terminal status data indicating terminal status or communication status data indicating communication status.

The connection method decision unit 5c has a function of comparing the apparatus status, terminal status and communication status collected by the status collection unit 21, with connection rules retained by the connection rule retention unit 8c and extracting a connection rule indicating an appropriate connection method from the connection rule retention unit 8c. The connection method decision unit 5c also has a function of distributing (e.g., transmitting a notification signal of) a relevant connection scheme to the computer 1a, the respective computers 1b and the computer 1c via the network communication unit 4c by outputting the extracted connection rule.

Although in relation to this embodiment, it has been described that the computer 1a, the respective computers 1b and the computer 1c are implemented in separate devices, any one or more of the devices can be implemented in an integrated device. For example, the computer 1a and the computer 1c can be implemented in a single integrated device.

As described in the above, according to this embodiment, apparatus status information is collected from the plurality of electronic apparatuses 10 installed in a distributed way via a network, communication status information and terminal status information are collected and monitored, and a connection rule indicating a connection method is decided which is relevant to the collected apparatus status, terminal status and communication status. Then, the connection method is modified according to the decided connection rule. Therefore, connection can be modified smoothly according to a status change due to a load of computation processing, a load of communication, or movement of the electronic apparatus 10 and the control terminals 9 in an environment such as the Internet where a wide variety of electronic apparatuses 10 should be managed and which includes many electronic apparatuses 10. Moreover, a connection method between the plurality of electronic apparatuses 10 and the control terminals 9 can be smoothly modified depending on all of status changes of the electronic apparatuses 10, status changes of the control terminals 9 and communication status changes.

Example

Next, an example of the present invention will be described with reference to the drawings. In the present example, application of a remote apparatus management system is described, as one example, in case that a user shoots an image using a digital camera, places the digital camera on the battery charger in the entrance after the user returns to the home, and then uses a TV receiver in a bed room to view the shot image to the family.

The system illustrated in the present example corresponds to the remote apparatus management system illustrated in the fifth exemplary embodiment of the present invention. In the present example, the digital camera corresponds to the electronic apparatus 10 shown in FIG. 14. The TV receiver corresponds to the control terminal 9. In the present example, the computer 1a is included in the TV receiver (for example, the CPU or a processor contained in the TV receiver). The computer 1b is included in the battery charger (for example, the battery charger can contain the processor, or the battery charger can be connected to a terminal such as a personal computer). The connection management module 20 is contained in a home server in the house.

First, when the digital camera is connected to the battery charger via USB, the operating system (OS) of the computer (for example, the home server) recognizes the camera by a Plug and Play function. Then, the computer reads a USB driver for the digital camera. Additionally, information of the connected electronic apparatus (digital camera) is registered at the home server via a network. A network address of the home server has been set beforehand. For example, the network address of the home server, which is compliant to USB, is recorded as "Bus ID 5-1 ID 0ea0: 6828 XXX Technology, Inc. OTI-6828 Flash Disk".

Next, a procedure will be described to view the image shot by the digital camera using the TV receiver in the bed room. First, the TV receiver activates a Web browser, connects to a local Web server in the TV receiver, and then displays a pre-determined manipulation screen. For example, the TV receiver displays an operational menu screen as shown in FIG. 19.

The third item in the menu screen shown in FIG. 19 is a link to the home server. When the user manipulates to select the third item "Display Machines Registered at Manager" in the menu screen, the TV receiver displays available machines (personal computers (PC) or battery chargers) registered at the home server. For example, the receiver displays a display screen including available machines as shown in FIG. 20.

When the user manipulates to select "Display Connected USB Apparatuses" in the display screen shown in FIG. 20, listing information of apparatuses registered at the machine is transferred to the TV receiver using HTTP. Then, the TV receiver displays a display screen listing USB apparatuses as shown in FIG. 21.

In FIG. 20, the action column in the display screen displays "Use" and "Disconnect". When the user manipulates to select the items, the home server connects a control terminal (for example, the TV receiver) and an electronic apparatus (for example, the digital camera). Alternatively, the home server disconnects the electronic apparatus and the control terminal in connection.

To connect the digital camera (electronic apparatus) designated by the TV receiver (control terminal), the home server requests connection to the battery charger (machine) using the TCP/IP protocol used in a typical network. The machine which has received the connection request packs USB/IP connection information in a TCP/IP protocol according to a connection rule registered beforehand, and transmits the information to the control terminal. In the present example, a connection rule includes a list of protocols for network connection, for example, USB-IP, Echonet, UPnP, . . . ) as control terminal information. On the other hand, the machine also includes a list of protocols for connection (for example, USB-IP, Havi, UPnP, . . . ).

A connection management module of the home server extracts protocols common to the both protocols (for example, USB-IP:2, UPnP:6). In the protocol USB-IP:2 and UPnP:6, a number means the sum of list numbers of the protocols; a smaller value has higher priority. Herein, USB-IP is selected.

In network status with weak performance due to an instable radio wave condition of wireless LAN, the home server sets buffer parameters at the connection to larger values. On the contrary, in good network status, the home server sets a less buffer by considering synchronization.

Next, USB-IP connection will be described. The control terminal notifies the operating system (OS) of received USB connection information as if a USB apparatus has been connected. Accordingly, the TV receiver operates as if the digital camera connected to the battery charger is directly connected to the TV receiver to start typical Plug and Play. If an image viewer program has been registered beforehand with Plug and Play, the TV receiver starts processing according to the viewer program.

For the viewer program to access data in the digital camera, the TV receiver first wraps (packetizes) a request to access the USB apparatus in a TCP/IP packet, and transmits the packet to the machine via the network. The machine unwraps the received packet, and transmits the packet to the digital camera as a typical USB apparatus access request.

To respond to the access, processing is performed in a path being reverse to the above processing. The machine receives response data from the digital camera as an access response from the typical USB apparatus, wraps the response data in a TCP/IP packet, and transmits the packet to the TV receiver. The TV receiver unwraps the received packet, and passes the packet to the viewer program as an access response from the typical USB apparatus.

To disconnect an electronic apparatus in connection, the TV receiver first ends the viewer program and unloads various drivers loaded in Plug and Play to disconnect the communication.

This application is based upon and claims the benefit of priority from Japanese patent application No. 2006-338964, filed on Dec. 15, 2006, the disclosure of which is incorporated herein in its entirety by reference.

Industrial Applicability

The present invention can be applied to a remote apparatus management system for dynamically addressing a change of apparatus status or communication status of an electronic apparatus. It can be also applied to a program to implement the remote apparatus management system in a computer. It can be also applied to various devices or terminals having a remote management function of dynamically addressing a change of apparatus status or communication status of the electronic apparatus. For example, it can be also applied to a terminal emulation device contained in a personal computer or a control terminal, or an embedded network interface contained in the electronic apparatus.

BRIEF DESCRIPTION OF THE DRAWINGS

FIG. 6 is a block diagram showing a configuration example of a remote apparatus management system according to a second exemplary embodiment;

FIG. 14 is a block diagram showing a configuration example of a remote apparatus management system according to a fifth exemplary embodiment;

FIG. 16 is a block diagram showing a configuration example of a remote apparatus management system according to a sixth exemplary embodiment;

FIG. 20 is an illustration diagram showing a display example of a screen displaying available machines; and FIG. 21 is an illustration diagram showing a display example of a screen displaying a listing of USB apparatuses.

DESCRIPTION OF SYMBOLS

Figure 1:
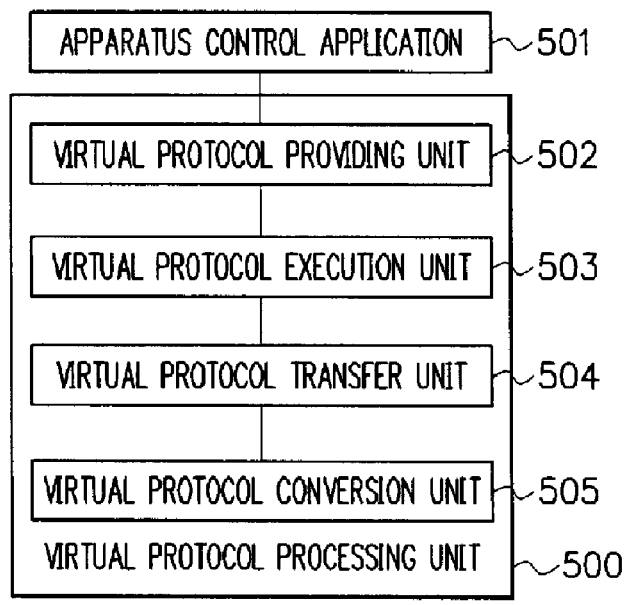
FIG. 1 is a block diagram showing a configuration example of an apparatus network configured by electronic apparatuses with different apparatus control protocols according to a related art.
Figure 2:
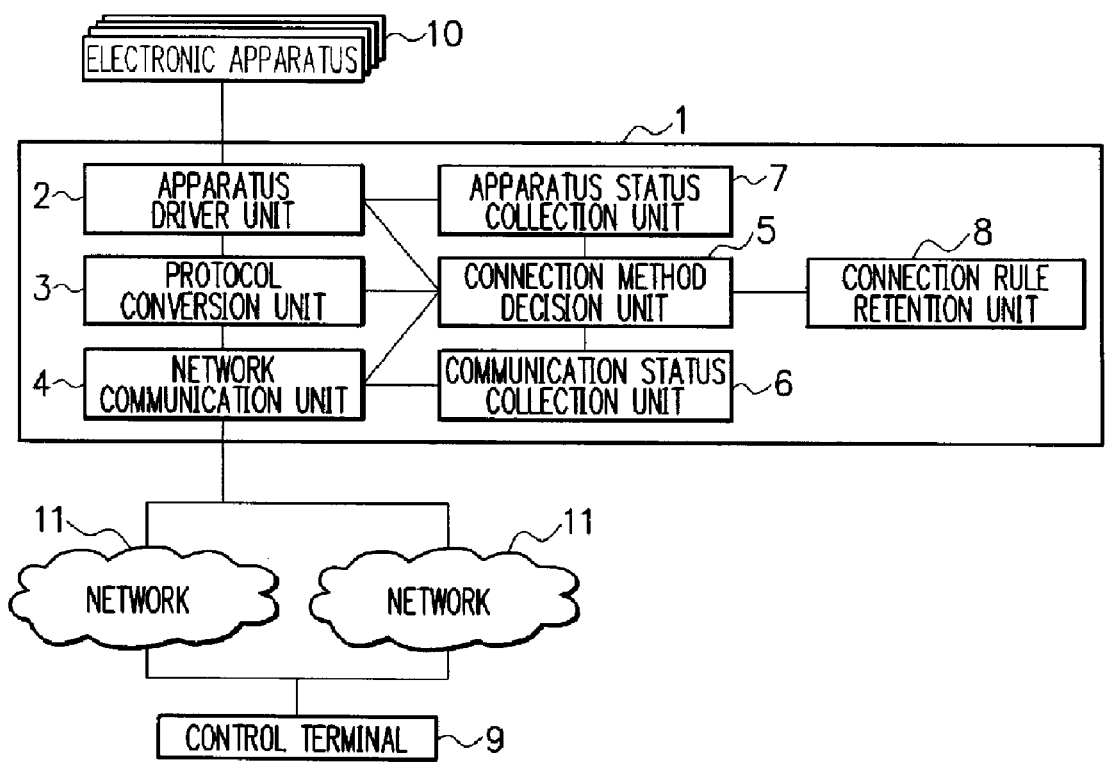
FIG. 2 is a block diagram showing one example of configuration of a remote apparatus management system according to the present invention.
Figure 3:
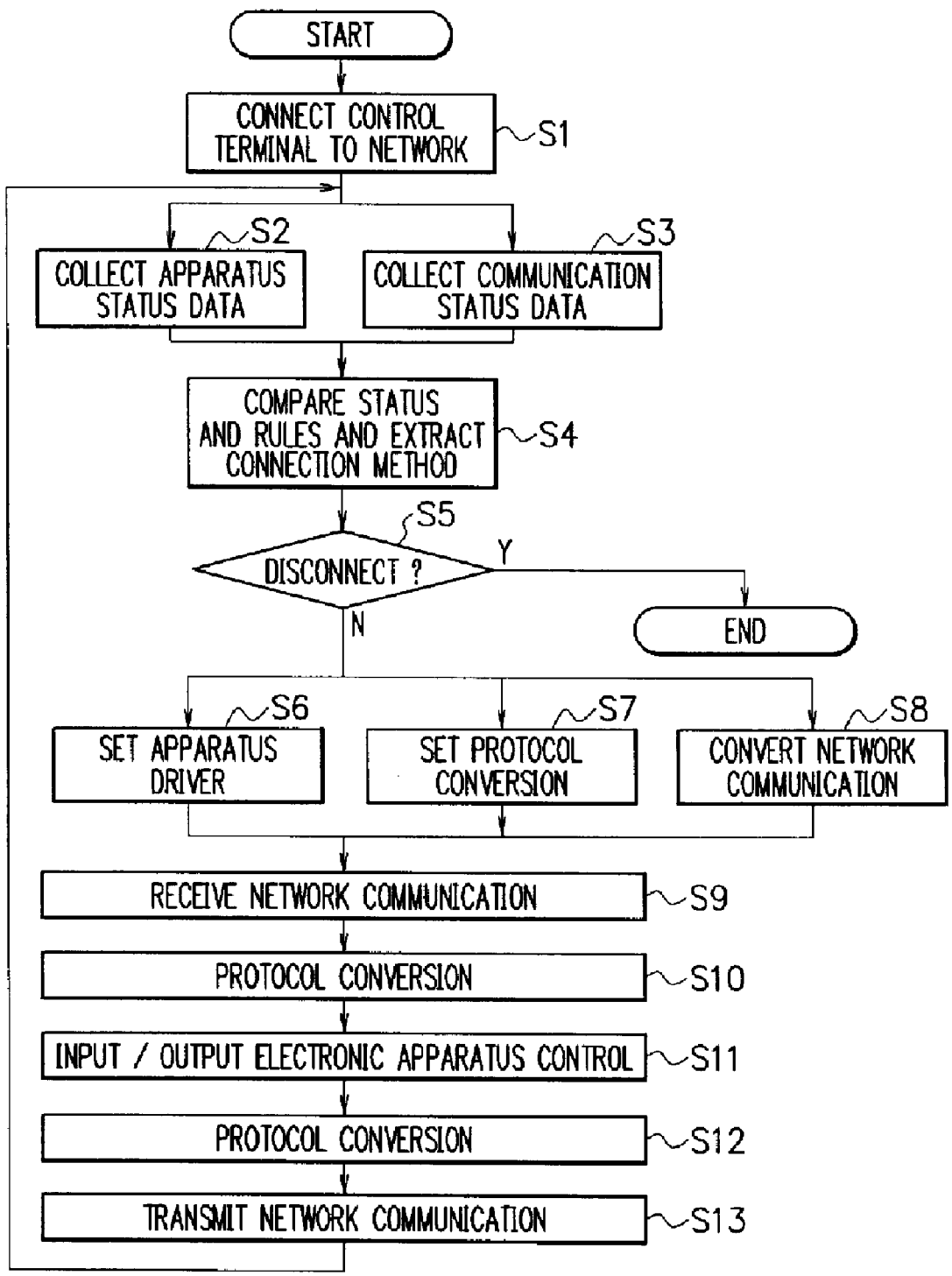
FIG. 3 is a flowchart showing one example of processing to modify connection of electronic apparatuses and a control terminal in the remote apparatus management system.
Figure 4:
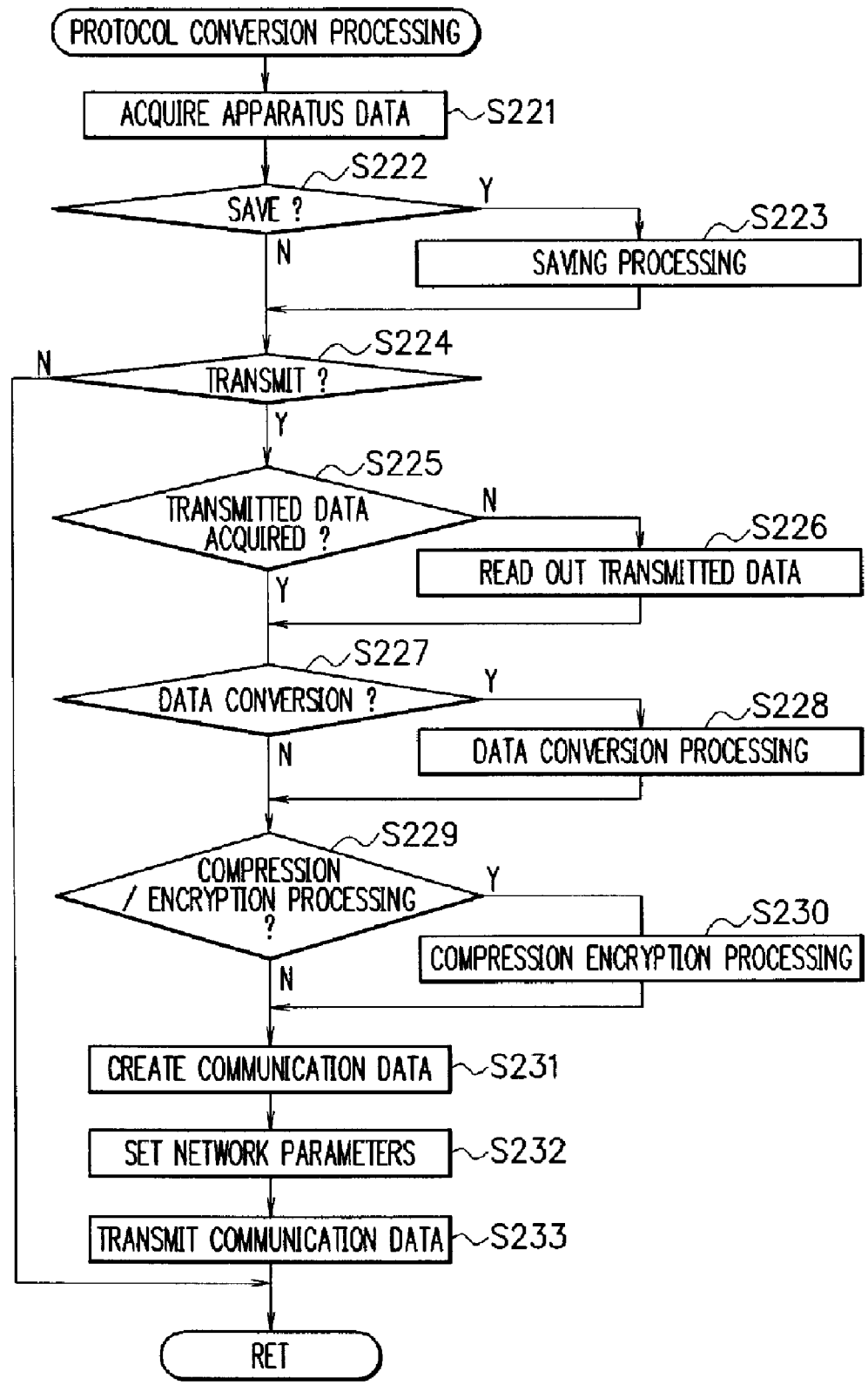
FIG. 4 is a flowchart showing one example of processing for protocol conversion on data from electronic apparatuses.
Figure 5:
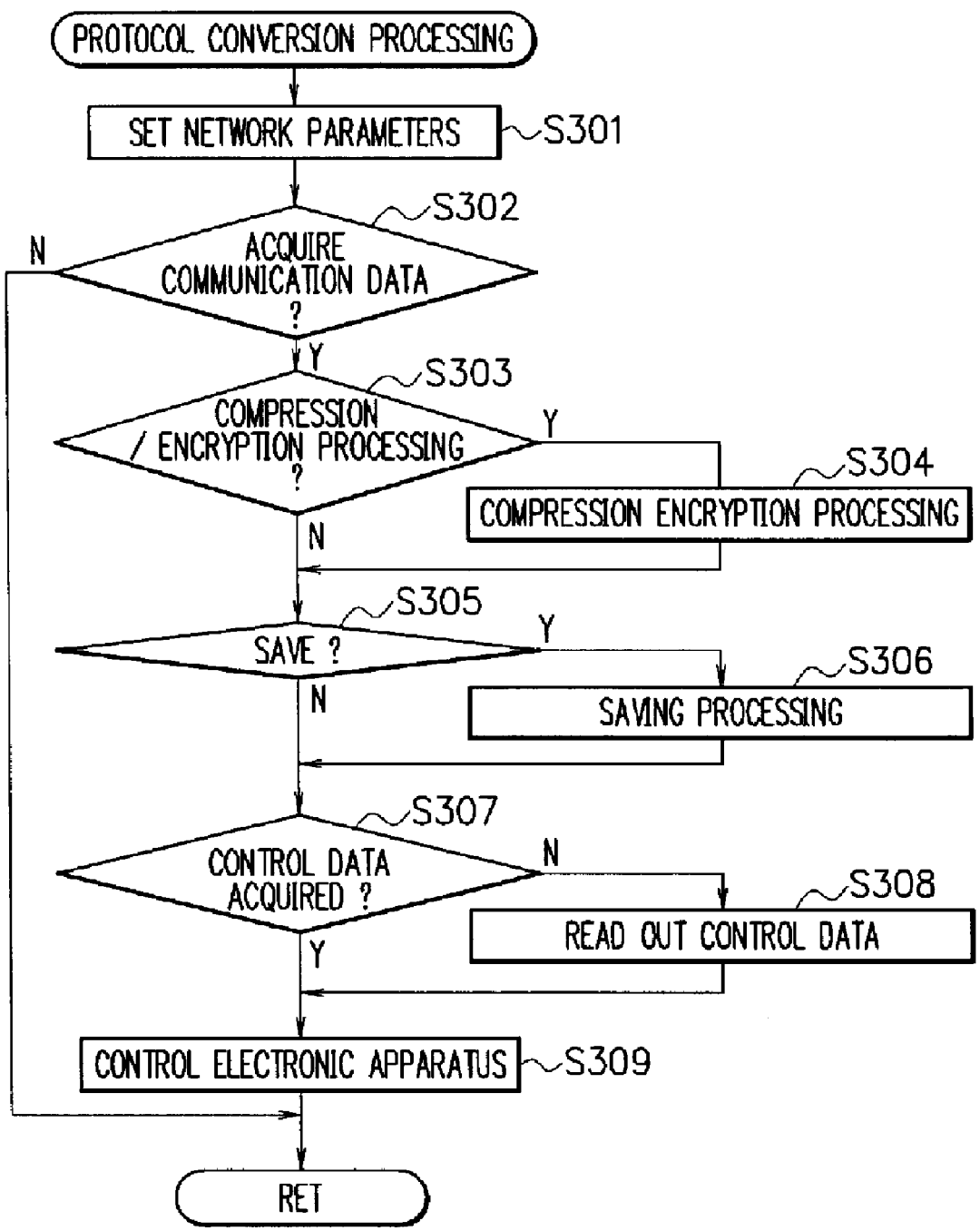
FIG. 5 is a flowchart showing one example of processing for protocol conversion on data from a control terminal.
Figure 7A:
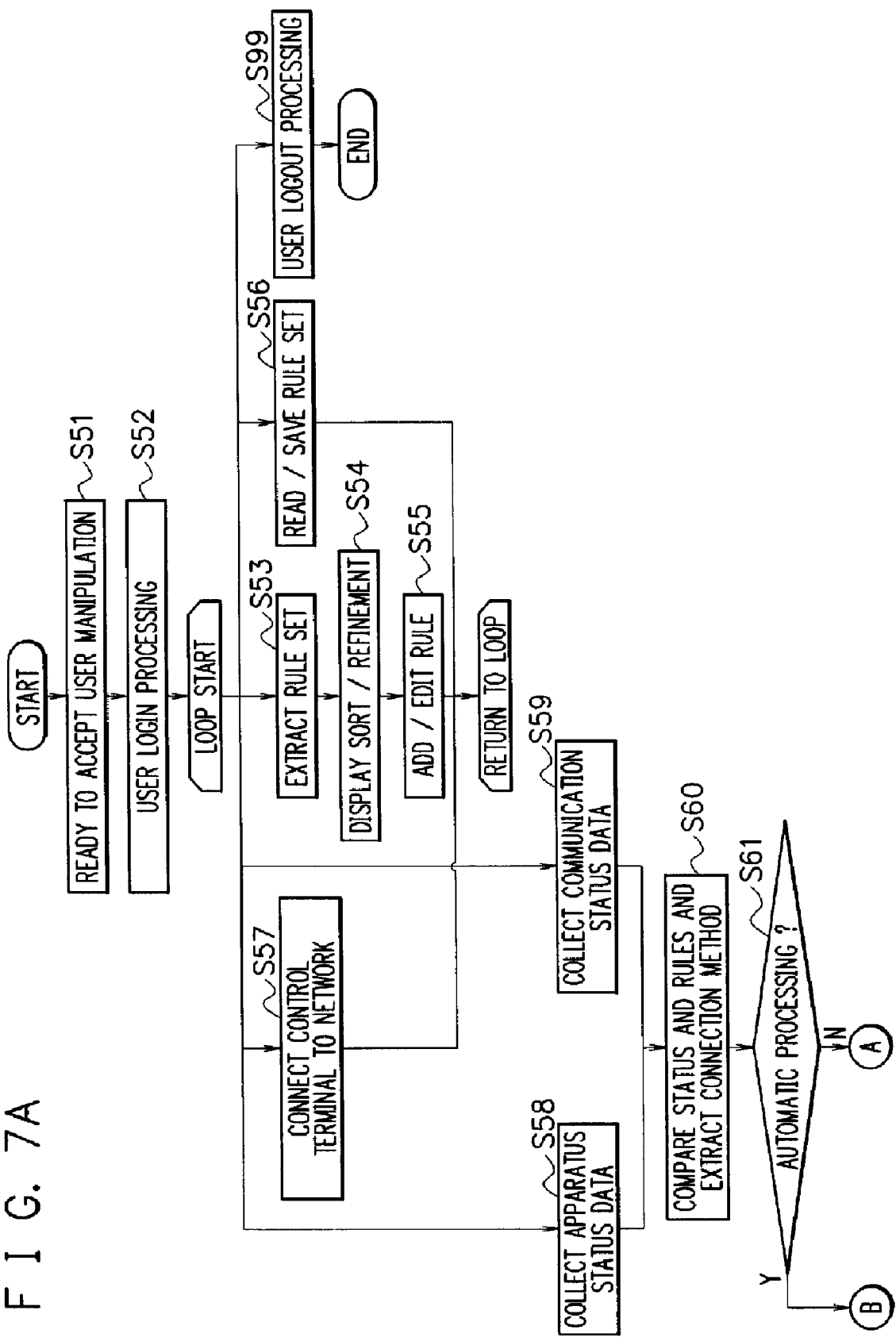
FIG. 7 is a flowchart showing a processing example to modify connection of electronic apparatuses and a control terminal in the remote apparatus management system according to the second exemplary embodiment.
Figure 7B:
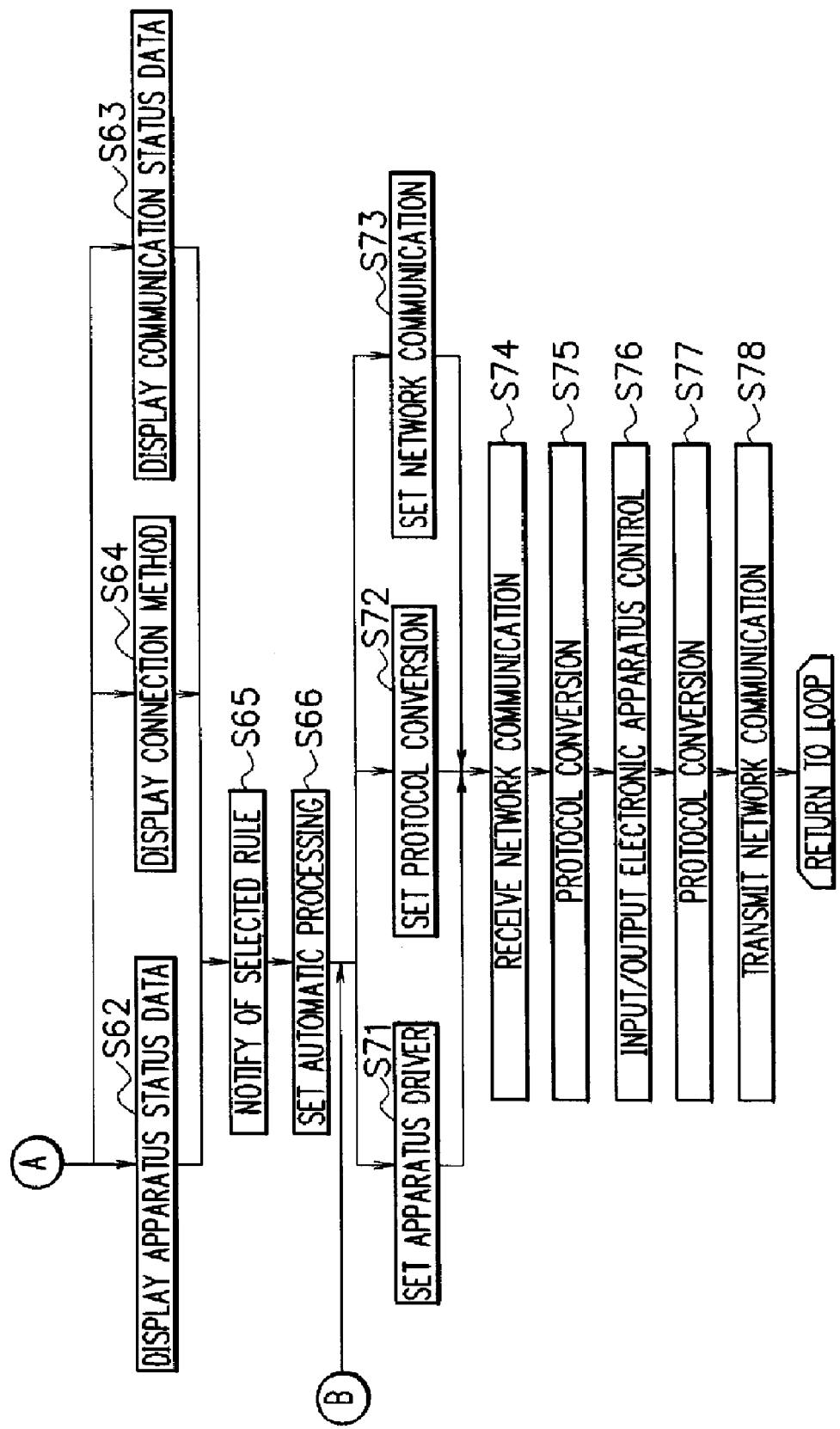
Figure 8:
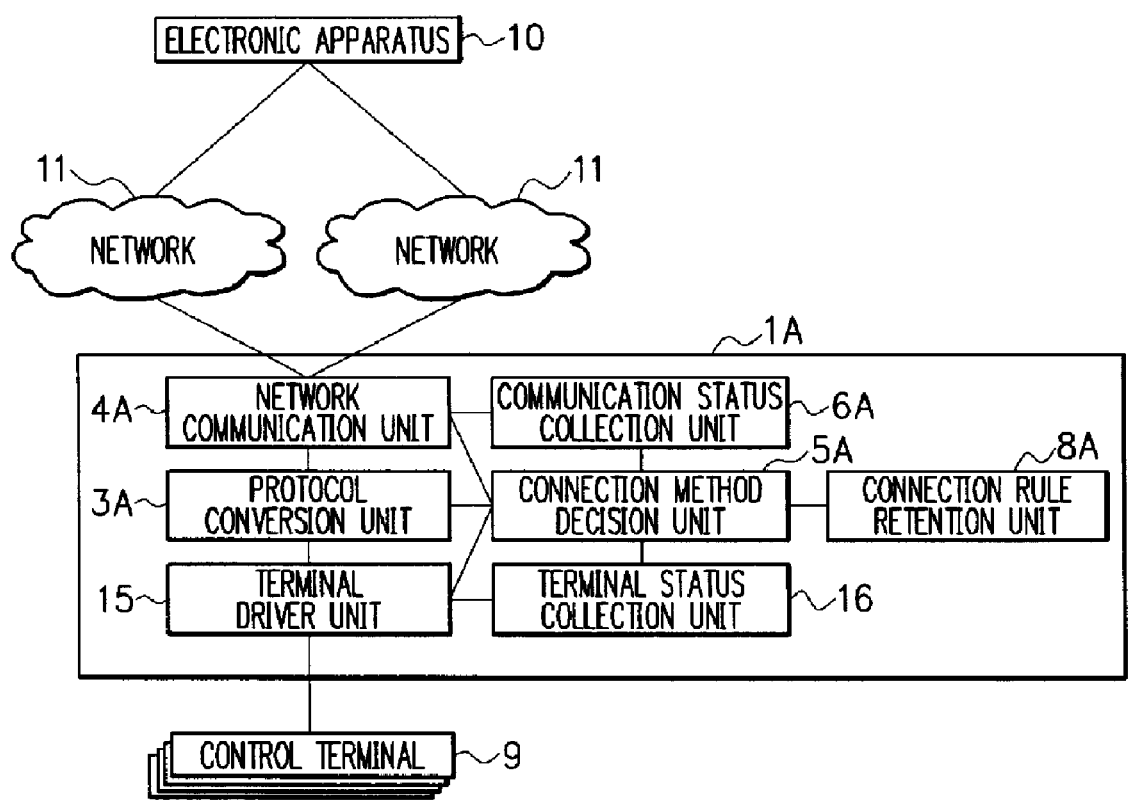
FIG. 8 is a block diagram showing a configuration example of a remote apparatus management system according to a third exemplary embodiment.
Figure 9:
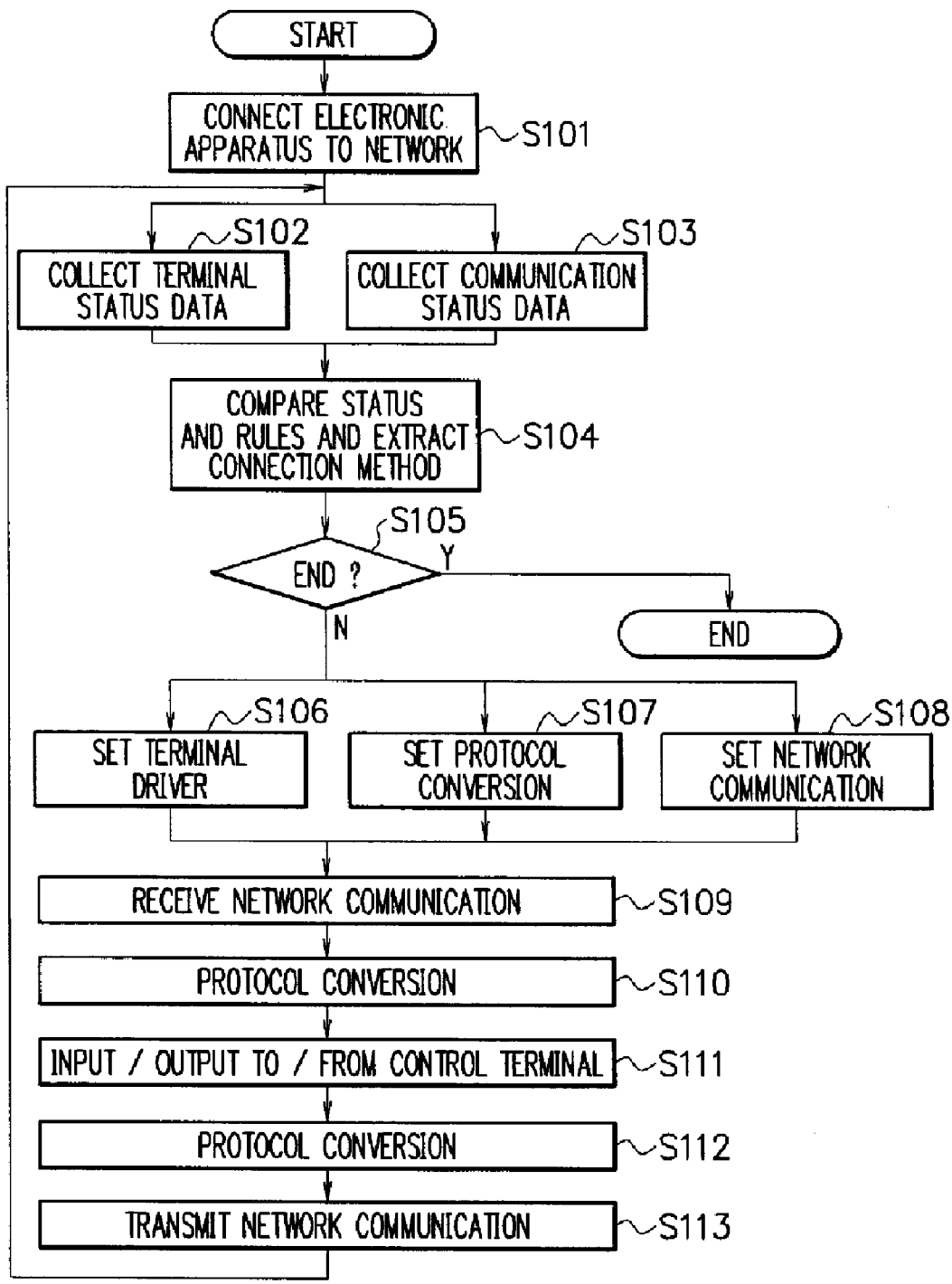
FIG. 9 is a flowchart showing a processing example to modify connection of electronic apparatuses and a control terminal in the remote apparatus management system according to the third exemplary embodiment.
Figure 10:
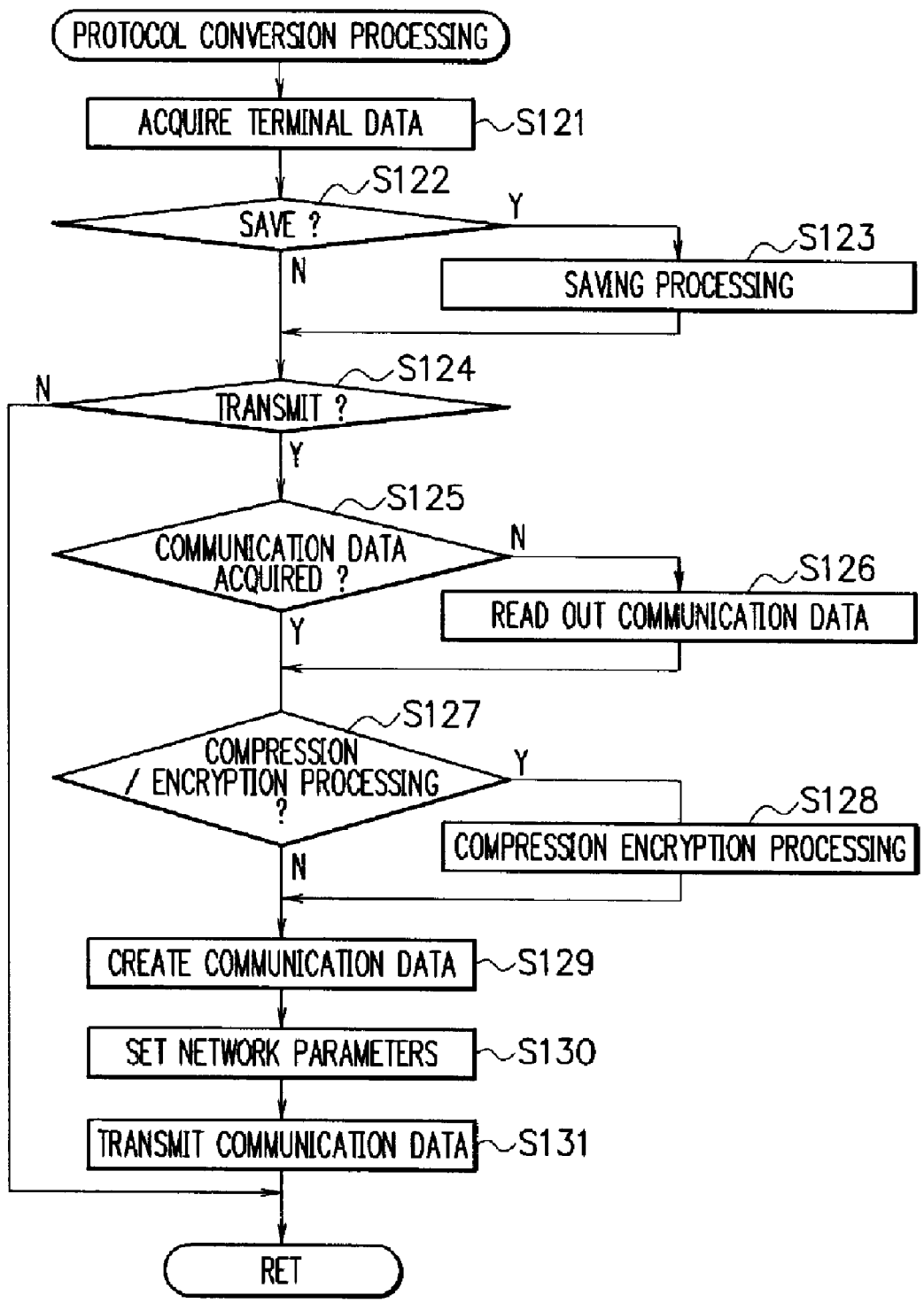
FIG. 10 is a flowchart showing one example of processing for protocol conversion on data from control terminals according to the third exemplary embodiment.
Figure 11:
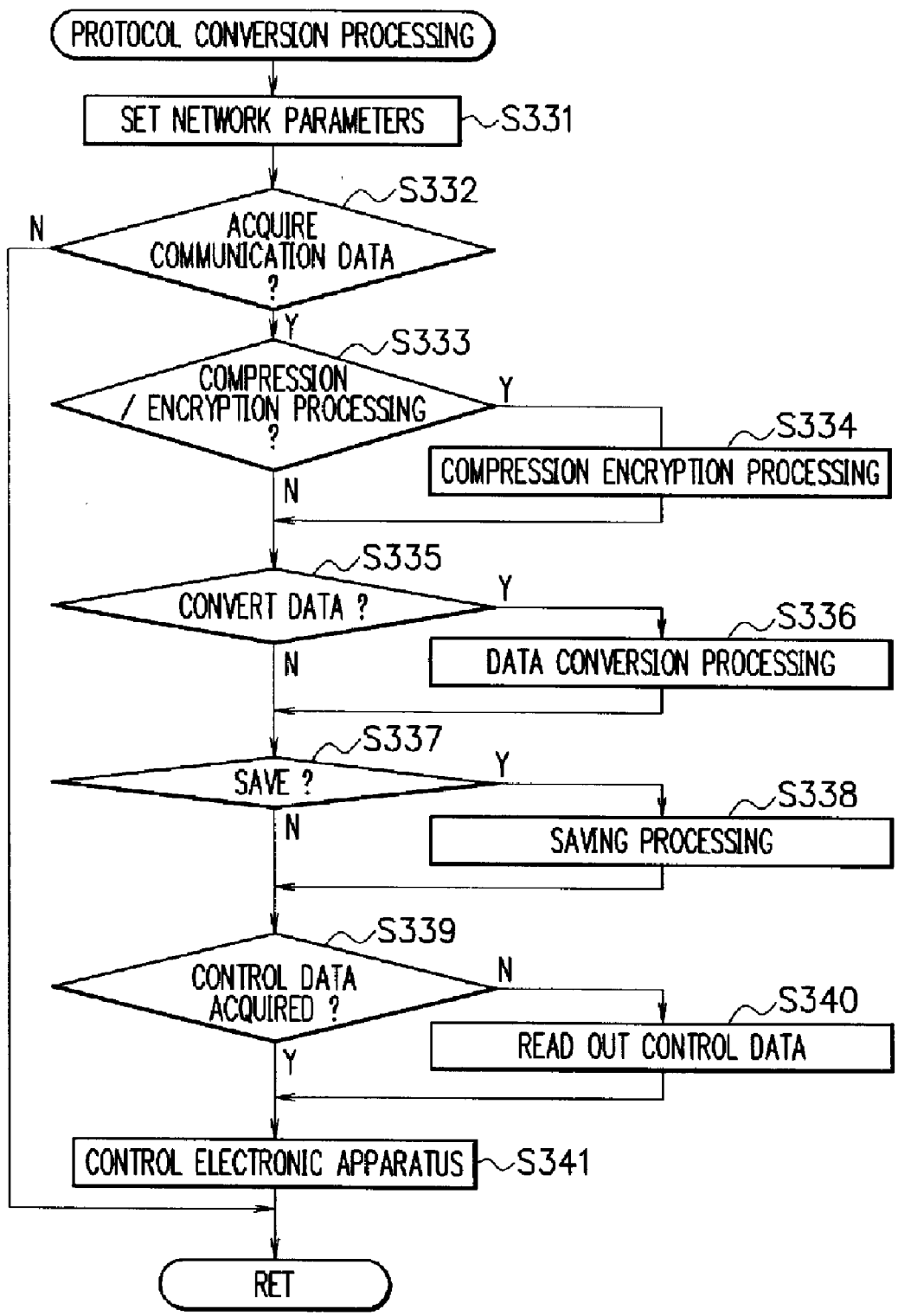
FIG. 11 is a flowchart showing one example of processing for protocol conversion on data from electronic apparatuses according to the third exemplary embodiment.
Figure 12:
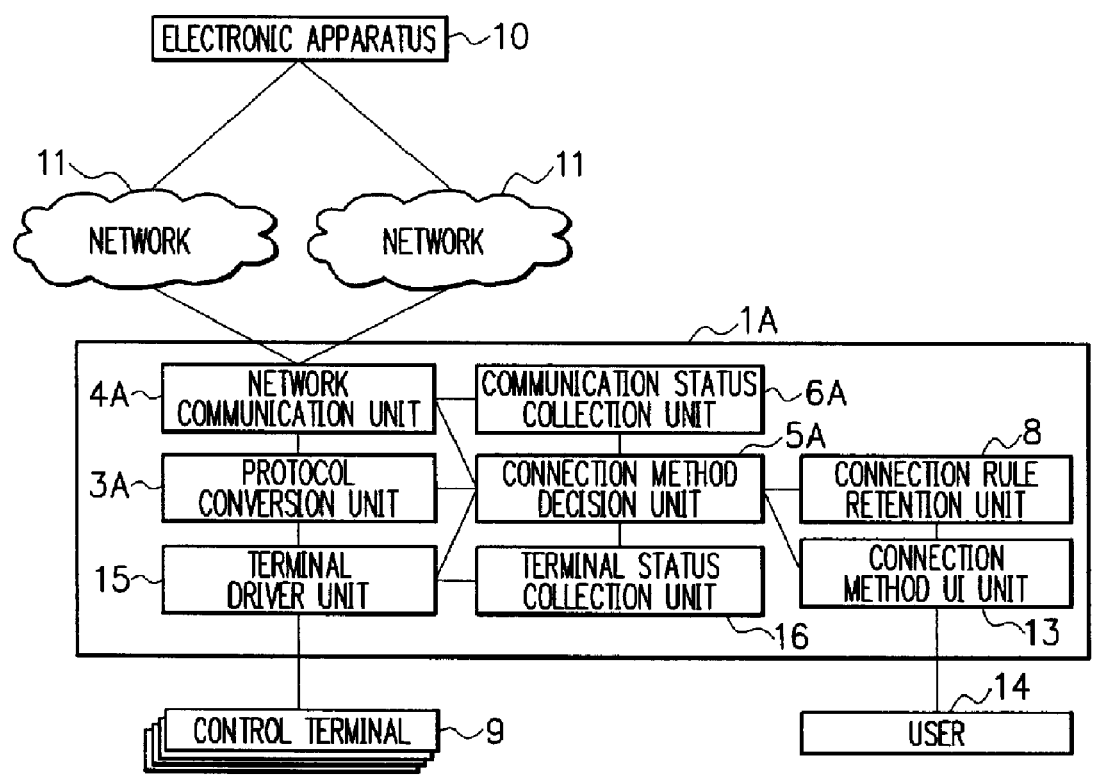
FIG. 12 is a block diagram showing a configuration example of a remote apparatus management system according to a fourth exemplary embodiment.
Figure 13A:
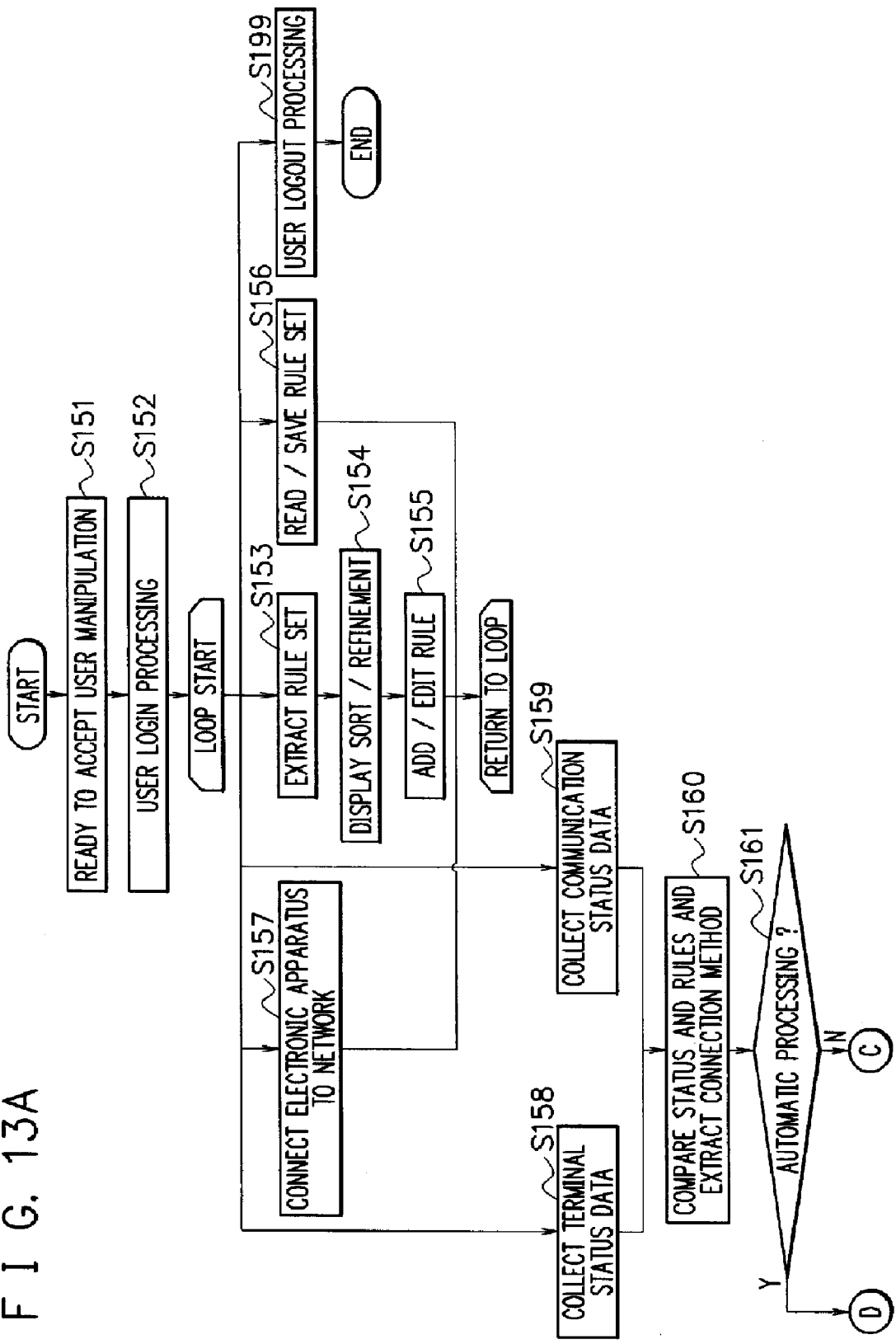
FIG. 13 is a flowchart showing a processing example to modify connection of electronic apparatuses and a control terminal in the remote apparatus management system according to the fourth exemplary embodiment.
Figure 15:
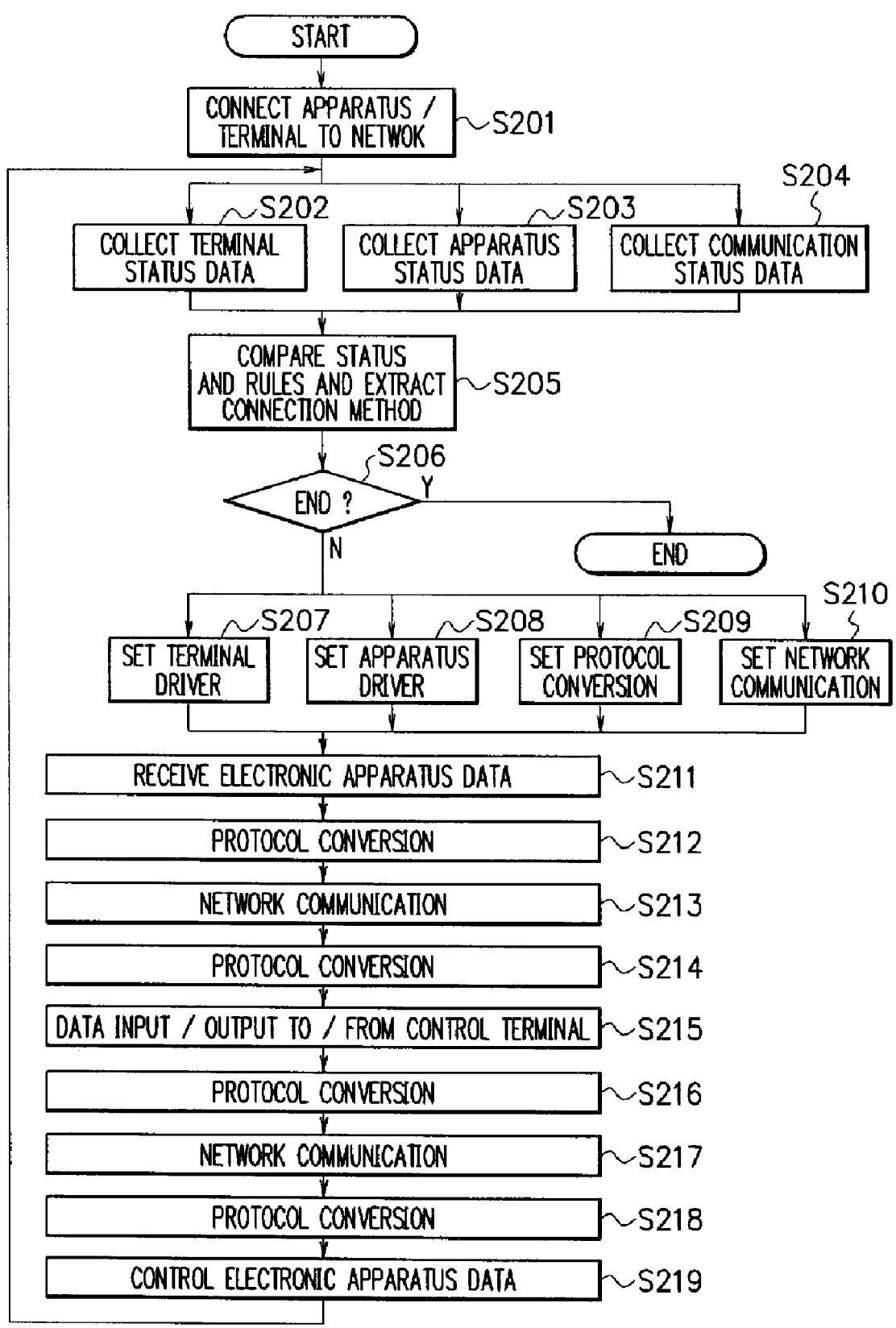
FIG. 15 is a flowchart showing a processing example to modify connection of electronic apparatuses and control terminals in the remote apparatus management system according to the fifth exemplary embodiment.
Figure 17A:
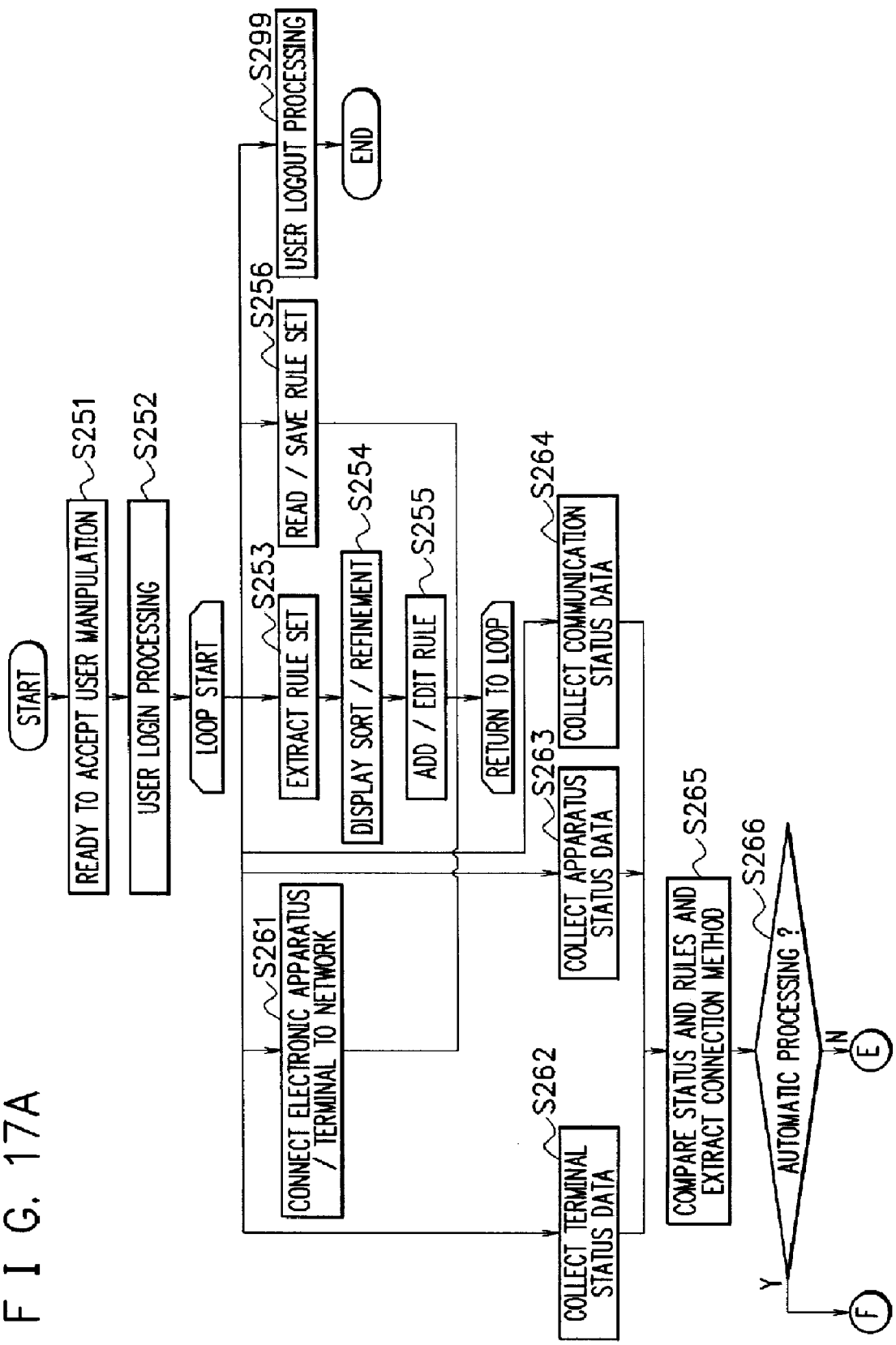
FIG. 17 is a flowchart showing a processing example to modify connection of electronic apparatuses and a control terminal in the remote apparatus management system according to the sixth exemplary embodiment.
Figure 18:
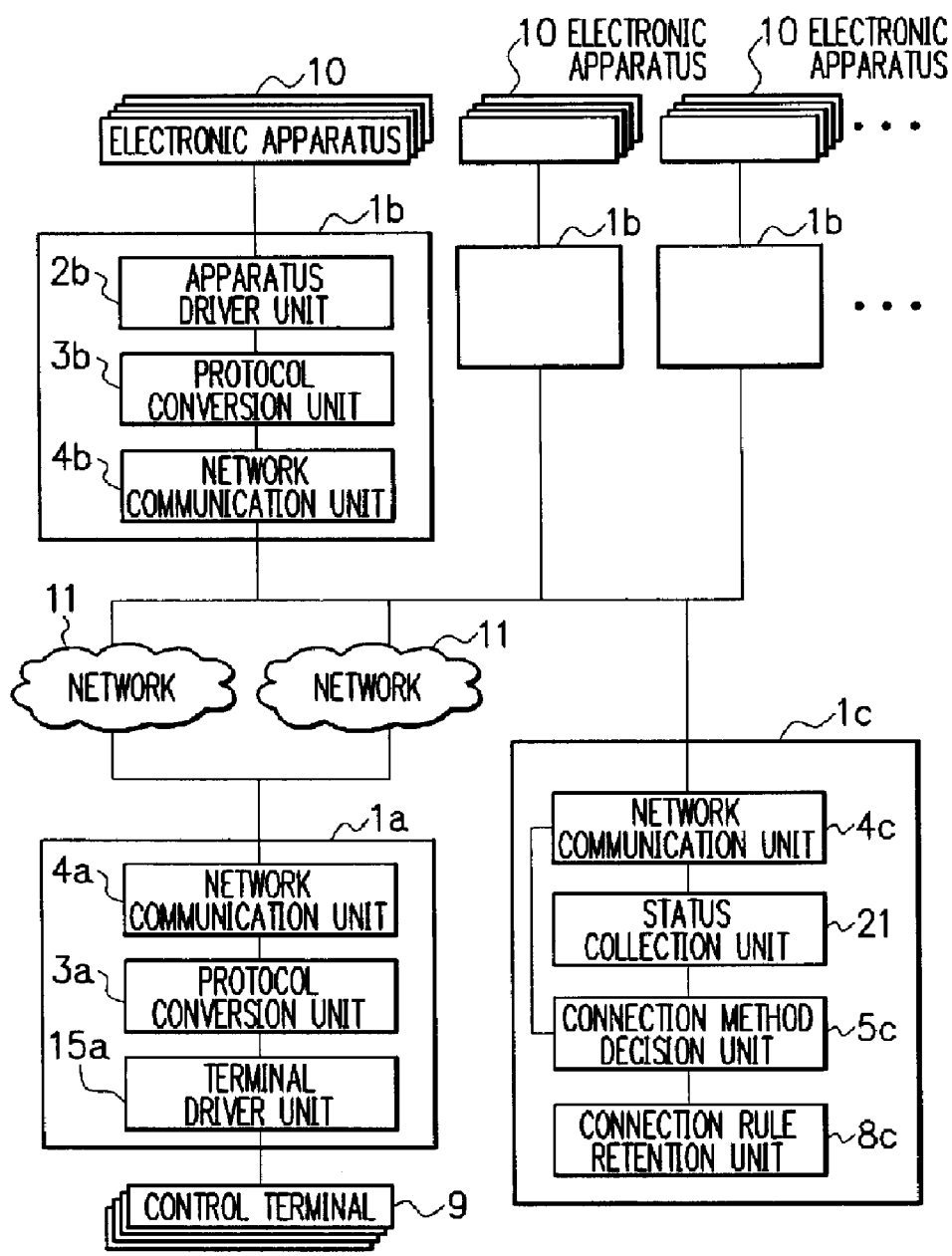
FIG. 18 is a block diagram showing a configuration example of a remote apparatus management system according to a seventh exemplary embodiment.
Figure 19:
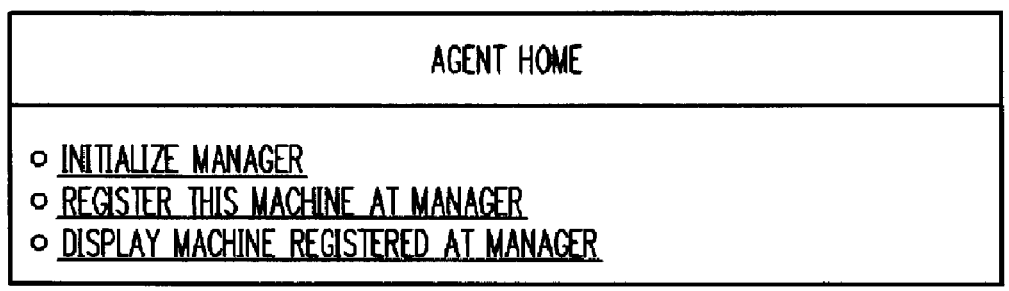
FIG. 19 is an illustration diagram showing a display example of an operational menu screen.

1, 1A, 1a, 1b, 1c: computer (data processing device, processor, central processing unit)
2, 2b: apparatus driver unit
3, 3A, 3a, 3b: protocol conversion unit
4, 4A, 4a, 4b, 4c: network communication unit
5, 5A, 5B, 5c: connection method decision unit
6, 6A, 6B: communication status collection unit
7, 7B: apparatus status collection unit
8, 8A, 8B, 8c: connection rule retention unit
9: control terminal
10: electronic apparatus
11: network
13: connection method UI unit
14: user
15, 15a: terminal driver unit
16, 16B: terminal status collection unit
20: connection management module
21: status collection unit

The invention claimed is:
1. A remote apparatus management system comprising:
a communication adapter of an electronic apparatus; and a communication adapter of a control terminal, wherein the communication adapter of the electronic apparatus includes:

an electronic apparatus control unit that controls the electronic apparatus;

a communication unit of an apparatus side that performs network communication;

a protocol conversion unit of the apparatus side that performs protocol conversion between control data transmitted/received by the electronic apparatus and the network communication;

a terminal status collecting unit that collects terminal status information indicating terminal status including a type, a load or a position of the control terminal;

an apparatus status collecting unit that collects apparatus status condition information indicating apparatus status including a type, a load or a position of the electronic apparatus;

a communication status collecting unit that collects network communication status condition information indicating network communication status including a type, a path or a load of the communication;

a connection rule retention unit that retains a connection rule indicating a communication connection method matching the apparatus status, the terminal status and the network communication status; and a connection method setting unit that extracts an appropriate connection method by comparing the apparatus status, the terminal status and the network communication status with the connection rule, and sets a control scheme, a terminal interface scheme, a network communication scheme and a protocol conversion scheme for the electronic apparatus, and the communication adapter of the control terminal includes:

an interface unit that provides an interface with the control terminal;

a communication unit of a control side that performs the network communication; and a protocol conversion unit of the control side that performs protocol conversion between an input/output interface of the control terminal and the network communication.

2. The remote apparatus management system according to claim 1, including:

a rule display unit that displays a connection rule indicating a communication connection method matching the apparatus status, the terminal status and the communication status; and a rule edit unit that edits the connection rule according to user manipulation.

3. The remote apparatus management system according to claim 1, including:

a candidate display unit that displays candidate connection methods specified by comparing the collected terminal status, apparatus status or communication status with the connection rule indicating a communication connection method matching the apparatus status, the terminal status or the communication status; and a connection method selection unit that selects a connection method from the candidates displayed by the candidate display unit according to user manipulation.

4. The remote apparatus management system according to claim 1, including:

a data saving unit that saves data inputted from the electronic apparatus; and an operation control unit that operates the electronic apparatus and the control terminal asynchronously using the data saved by the data saving unit in response to a control request by the control terminal.

5. The remote apparatus management system according to claim 1, including:

an input data saving unit that saves input data from the control terminal; and an operation control unit that allows the electronic apparatus and the control terminal to operate asynchronously using the data saved by the input data saving unit in response to an input request by the electronic apparatus.

6. The remote apparatus management system according to claim 1 including:

a data saving unit that saves data inputted from the electronic apparatus; and a data retransmission unit that retransmits communication data using the saved data being saved by the data saving unit if the communication data is missed in communication from the electronic apparatus to the control terminal.

7. The remote apparatus management system according to claim 1, including:

an input data saving unit that saves input data from the control terminal; and a data retransmission unit that retransmits communication data using the saved data being saved by the input data saving unit if the communication data is missed in communication from the control terminal to the electronic apparatus.

8. A remote apparatus management system comprising:

a communication adapter of an electronic apparatus; and a communication adapter of a control terminal, wherein the communication adapter of the electronic apparatus includes:

an electronic apparatus control unit that controls the electronic apparatus;

a communication unit of an apparatus side that performs network communication; and a protocol conversion unit of the apparatus side that performs protocol conversion between control data transmitted/received by the electronic apparatus and the network communication, and the communication adapter of the control terminal includes:

an interface unit that provides an interface with the control terminal;

a communication unit of a control side that performs the network communication;

a protocol conversion unit of the control side that performs protocol conversion between an input/output interface of the control terminal and the network communication;

a terminal status collecting unit that collects terminal status information indicating terminal status including a type, a load or a position of the control terminal;

an apparatus status collecting unit that collects apparatus status condition information indicating apparatus status including a type, a load or a position of the electronic apparatus;

a communication status collecting unit that collects network communication status condition information indicating network communication status including a type, a path or a load of the communication;

a connection rule retention unit that retains a connection rule indicating a communication connection method matching the apparatus status, the terminal status and the network communication status; and a connection method setting unit that extracts an appropriate connection method by comparing the apparatus status, the terminal status and the network communication status with the connection rule, and sets a control scheme, a terminal interface scheme, a network communication scheme and a protocol conversion scheme for the electronic apparatus.

9. The remote apparatus management system according to claim 8, including:
a rule display unit that displays a connection rule indicating a communication connection method matching the apparatus status, the terminal status and the communication status; and
a rule edit unit that edits the connection rule according to user manipulation.

10. The remote apparatus management system according to claim 8, including:
a candidate display unit that displays candidate connection methods specified by comparing the collected terminal status, apparatus status or communication status with the connection rule indicating a communication connection method matching the apparatus status, the terminal status or the communication status; and
a connection method selection unit that selects a connection method from the candidates displayed by the candidate display unit according to user manipulation.

11. The remote apparatus management system according to claim 8, including:
a data saving unit that saves data inputted from the electronic apparatus; and
an operation control unit that operates the electronic apparatus and the control terminal asynchronously using the data saved by the data saving unit in response to a control request by the control terminal.

12. The remote apparatus management system according to claim 8, including:
an input data saving unit that saves input data from the control terminal; and
an operation control unit that allows the electronic apparatus and the control terminal to operate asynchronously using the data saved by the input data saving unit in response to an input request by the electronic apparatus.

13. The remote apparatus management system according to claim 8 including:
a data saving unit that saves data inputted from the electronic apparatus; and
a data retransmission unit that retransmits communication data using the saved data being saved by the data saving unit if the communication data is missed in communication from the electronic apparatus to the control terminal.

14. The remote apparatus management system according to claim 8, including:
an input data saving unit that saves input data from the control terminal; and
a data retransmission unit that retransmits communication data using the saved data being saved by the input data saving unit if the communication data is missed in communication from the control terminal to the electronic apparatus.

15. A remote apparatus management system comprising:
a communication adapter of an electronic apparatus; and
a communication adapter of a control terminal,
wherein the communication adapter of the electronic apparatus includes:
a electronic apparatus control unit that controls the electronic apparatus;
a communication unit of an apparatus side that performs network communication; and
a protocol conversion unit of the apparatus side that performs protocol conversion between control data transmitted/received by the electronic apparatus and the network communication, and
the communication adapter of the control terminal includes:
an interface unit that provides an interface with the control terminal;
a communication unit of a control side that performs the network communication; and
a protocol conversion unit of the control side that performs protocol conversion between an input/output interface of the control terminal and the network communication,
and the system further comprising a program module for control via the network,
the program module includes:
a terminal status collecting unit that collects terminal status information indicating terminal status including a type, a load or a position of the control terminal via the network;
an apparatus status collecting unit that collects apparatus status condition information indicating apparatus status including a type, a load or a position of the electronic apparatus via the network;
a communication status collecting unit that collects network communication status condition information indicating network communication status including a type, a path or a load of the communication;
a connection rule retention unit that retains a connection rule indicating a communication connection method matching the apparatus status, the terminal status and the network communication status; and
a connection method setting unit that extracts an appropriate connection method by comparing the apparatus status, the terminal status and the network communication status with the connection rule, and sets a control scheme, a terminal interface scheme, a network communication scheme and a protocol conversion scheme for the electronic apparatus via the network.

16. The remote apparatus management system according to claim 15, including:
a rule display unit that displays a connection rule indicating a communication connection method matching the apparatus status, the terminal status and the communication status; and
a rule edit unit that edits the connection rule according to user manipulation.

17. The remote apparatus management system according to claim 15, including:
a candidate display unit that displays candidate connection methods specified by comparing the collected terminal status, apparatus status or communication status with the connection rule indicating a communication connection method matching the apparatus status, the terminal status or the communication status; and
a connection method selection unit that selects a connection method from the candidates displayed by the candidate display unit according to user manipulation.

18. The remote apparatus management system according to claim 15, including:
a data saving unit that saves data inputted from the electronic apparatus; and
an operation control unit that operates the electronic apparatus and the control terminal asynchronously using the data saved by the data saving unit in response to a control request by the control terminal.

19. The remote apparatus management system according to claim 15, including:
- an input data saving unit that saves input data from the control terminal; and
- an operation control unit that allows the electronic apparatus and the control terminal to operate asynchronously using the data saved by the input data saving unit in response to an input request by the electronic apparatus.

20. The remote apparatus management system according to claim 15 including:
- a data saving unit that saves data inputted from the electronic apparatus; and
- a data retransmission unit that retransmits communication data using the saved data being saved by the data saving unit if the communication data is missed in communication from the electronic apparatus to the control terminal.

21. The remote apparatus management system according to claim 15, including:
- an input data saving unit that saves input data from the control terminal; and
- a data retransmission unit that retransmits communication data using the saved data being saved by the input data saving unit if the communication data is missed in communication from the control terminal to the electronic apparatus.

22. A remote apparatus management method comprising:
- an electronic apparatus control step, by a communication adapter of an electronic apparatus, of controlling the electronic apparatus;
- a communication step of an apparatus side, by the communication adapter of the electronic apparatus, of performing network communication;
- a protocol conversion step of the apparatus side, by the communication adapter of the electronic apparatus, of performing protocol conversion between control data transmitted/received by the electronic apparatus and the network communication;
- a terminal status collecting step, by the communication adapter of the electronic apparatus, of collecting terminal status information indicating terminal status including a type, a load or a position of the control terminal;
- an apparatus status collecting step, by the communication adapter of the electronic apparatus, of collecting apparatus status condition information indicating apparatus status including a type, a load or a position of the electronic apparatus;
- a communication status collecting step, by the communication adapter of the electronic apparatus, of collecting network communication status condition information indicating network communication status including a type, a path or a load of the communication;
- a connection rule retention step, by the communication adapter of the electronic apparatus, of retaining a connection rule indicating a communication connection method matching the apparatus status, the terminal status and the network communication status;
- a connection method setting step, by the communication adapter of the electronic apparatus, of extracting an appropriate connection method by comparing the apparatus status, the terminal status and the network communication status with the connection rule, and setting a control scheme, a terminal interface scheme, a network communication scheme and a protocol conversion scheme for the electronic apparatus;
- an interface step, by a communication adapter of the control terminal, of providing an interface with the control terminal;
- a communication step of a control side, by the communication adapter of the control terminal, of performing the network communication; and
- a protocol conversion step of the control side, by the communication adapter of the control terminal, of performing protocol conversion between an input/output interface of the control terminal and the network communication.

23. The remote apparatus management method according to claim 22, including:
- a rule display step of displaying a connection rule indicating a communication connection method matching the apparatus status, the terminal status and the communication status; and
- a rule edit step of editing the connection rule according to user manipulation.

24. The remote apparatus management method according to claim 22, including:
- a candidate display step of displaying candidate connection methods specified by comparing the collected terminal status, apparatus status or communication status with the connection rule indicating a communication connection method matching the apparatus status, the terminal status or the communication status; and
- a connection method selection step of selecting a connection method from the displayed candidates according to user manipulation.

25. The remote apparatus management method according to claim 22, including:
- a data saving step of saving data inputted from the electronic apparatus; and
- an operation control step of operating the electronic apparatus and the control terminal asynchronously using the saved data in response to a control request by the control terminal.

26. The remote apparatus management method according to claim 22, including:
- an input data saving step of saving input data from the control terminal; and
- an operation control step of allowing the electronic apparatus and the control terminal to operate asynchronously using the saved data in response to an input request by the electronic apparatus.

27. The remote apparatus management method according to claim 22, including:
- a data saving step of saving data inputted from the electronic apparatus; and
- a data retransmission step of retransmitting communication data using the saved data being saved if the communication data is missed in communication from the electronic apparatus to the control terminal.

28. The remote apparatus management method according to claim 22, including:
- an input data saving step of saving input data from the control terminal; and
- a data retransmission step of retransmitting communication data using the saved data being saved if the communication data is missed in communication from the control terminal to the electronic apparatus.

29. A remote apparatus management method comprising:
- an electronic apparatus control step, by a communication adapter of an electronic apparatus, of controlling the electronic apparatus;

a communication step of an apparatus side, by the communication adapter of the electronic apparatus, of performing network communication;

a protocol conversion step of the apparatus side, by the communication adapter of the electronic apparatus, of performing protocol conversion between control data transmitted/received by the electronic apparatus and the network communication, and an interface step, by the communication adapter of the control terminal, of providing an interface with the control terminal;

a communication step of a control side, by the communication adapter of the control terminal, of performing the network communication;

a protocol conversion step of the control side, by the communication adapter of the control terminal, of performing protocol conversion between an input/output interface of the control terminal and the network communication;

a terminal status collecting step, by the communication adapter of the control terminal, of collecting terminal status information indicating terminal status including a type, a load or a position of the control terminal;

an apparatus status collecting step, by the communication adapter of the control terminal, of collecting apparatus status condition information indicating apparatus status including a type, a load or a position of the electronic apparatus;

a communication status collecting step, by the communication adapter of the control terminal, of collecting network communication status condition information indicating network communication status including a type, a path or a load of the communication;

a connection rule retention step, by the communication adapter of the control terminal, of retaining a connection rule indicating a communication connection method matching the apparatus status, the terminal status and the network communication status; and a connection method setting step, by the communication adapter of the control terminal, of extracting an appropriate connection method by comparing the apparatus status, the terminal status and the network communication status with the connection rule, and setting a control scheme, a terminal interface scheme, a network communication scheme and a protocol conversion scheme for the electronic apparatus.

30. The remote apparatus management method according to claim 29, including:
a rule display step of displaying a connection rule indicating a communication connection method matching the apparatus status, the terminal status and the communication status; and
a rule edit step of editing the connection rule according to user manipulation.

31. The remote apparatus management method according to claim 29, including:
a candidate display step of displaying candidate connection methods specified by comparing the collected terminal status, apparatus status or communication status with the connection rule indicating a communication connection method matching the apparatus status, the terminal status or the communication status; and
a connection method selection step of selecting a connection method from the displayed candidates according to user manipulation.

32. The remote apparatus management method according to claim 29, including:

a data saving step of saving data inputted from the electronic apparatus; and
an operation control step of operating the electronic apparatus and the control terminal asynchronously using the saved data in response to a control request by the control terminal.

33. The remote apparatus management method according to claim 29, including:
an input data saving step of saving input data from the control terminal; and
an operation control step of allowing the electronic apparatus and the control terminal to operate asynchronously using the saved data in response to an input request by the electronic apparatus.

34. The remote apparatus management method according to claim 29, including:
a data saving step of saving data inputted from the electronic apparatus; and
a data retransmission step of retransmitting communication data using the saved data being saved if the communication data is missed in communication from the electronic apparatus to the control terminal.

35. The remote apparatus management method according to claim 29, including:
an input data saving step of saving input data from the control terminal; and
a data retransmission step of retransmitting communication data using the saved data being saved if the communication data is missed in communication from the control terminal to the electronic apparatus.

36. A remote apparatus management method comprising:
an electronic apparatus control step, by a communication adapter of an electronic apparatus, of controlling the electronic apparatus;

a communication step of an apparatus side, by the communication adapter of the electronic apparatus, of performing network communication;

a protocol conversion step of the apparatus side, by the communication adapter of the electronic apparatus, of performing protocol conversion between control data transmitted/received by the electronic apparatus and the network communication, and an interface step, by a communication adapter of the control terminal, of providing an interface with the control terminal;

a communication step of a control side, by the communication adapter of the control terminal, of performing the network communication;

a protocol conversion step of the control side, by the communication adapter of the control terminal, of performing protocol conversion between an input/output interface of the control terminal and the network communication;

a terminal status collecting step, by a program module for control via the network, of collecting terminal status information indicating terminal status including a type, a load or a position of the control terminal via the network;

an apparatus status collecting step, by the program module, of collecting apparatus status condition information indicating apparatus status including a type, a load or a position of the electronic apparatus via the network;

a communication status collecting step, by the program module, of collecting network communication status condition information indicating network communication status including a type, a path or a load of the communication;

a connection rule retention step, by the program module, of retaining a connection rule indicating a communication connection method matching the apparatus status, the terminal status and the network communication status; and a connection method setting step, by the program module, of extracting an appropriate connection method by comparing the apparatus status, the terminal status and the network communication status with the connection rule, and setting a control scheme, a terminal interface scheme, a network communication scheme and a protocol conversion scheme for the electronic apparatus via the network.

37. The remote apparatus management method according to claim 36, including:
   a rule display step of displaying a connection rule indicating a communication connection method matching the apparatus status, the terminal status and the communication status; and
   a rule edit step of editing the connection rule according to user manipulation.

38. The remote apparatus management method according to claim 36, including:
   a candidate display step of displaying candidate connection methods specified by comparing the collected terminal status, apparatus status or communication status with the connection rule indicating a communication connection method matching the apparatus status, the terminal status or the communication status; and
   a connection method selection step of selecting a connection method from the displayed candidates according to user manipulation.

39. The remote apparatus management method according to claim 36, including:
   a data saving step of saving data inputted from the electronic apparatus; and
   an operation control step of operating the electronic apparatus and the control terminal asynchronously using the saved data in response to a control request by the control terminal.

40. The remote apparatus management method according to claim 36, including:
   an input data saving step of saving input data from the control terminal; and
   an operation control step of allowing the electronic apparatus and the control terminal to operate asynchronously using the saved data in response to an input request by the electronic apparatus.

41. The remote apparatus management method according to claim 36, including:
   a data saving step of saving data inputted from the electronic apparatus; and
   a data retransmission step of retransmitting communication data using the saved data being saved if the communication data is missed in communication from the electronic apparatus to the control terminal.

42. The remote apparatus management method according to claim 36, including:
   an input data saving step of saving input data from the control terminal; and
   a data retransmission step of retransmitting communication data using the saved data being saved if the communication data is missed in communication from the control terminal to the electronic apparatus.

43. A remote apparatus management system comprising:
   a communication adapter of an electronic apparatus; and
   a communication adapter of a control terminal,
   wherein the communication adapter of the electronic apparatus includes:
   electronic apparatus control means for controlling the electronic apparatus;
   communication means of an apparatus side for performing network communication;
   protocol conversion means of the apparatus side for performing protocol conversion between control data transmitted/received by the electronic apparatus and the network communication;
   terminal status collecting means for collecting terminal status information indicating terminal status including a type, a load or a position of the control terminal;
   apparatus status collecting means for collecting apparatus status condition information indicating apparatus status including a type, a load or a position of the electronic apparatus;
   communication status collecting means for collecting network communication status condition information indicating network communication status including a type, a path or a load of the communication;
   connection rule retention means for retaining a connection rule indicating a communication connection method matching the apparatus status, the terminal status and the network communication status; and
   connection method setting means for extracting an appropriate connection method by comparing the apparatus status, the terminal status and the network communication status with the connection rule, and setting a control scheme, a terminal interface scheme, a network communication scheme and a protocol conversion scheme for the electronic apparatus, and
   the communication adapter of the control terminal includes:
   interface means for providing an interface with the control terminal;
   communication means of a control side for performing the network communication; and
   protocol conversion means of the control side for performing protocol conversion between an input/output interface of the control terminal and the network communication.

44. A remote apparatus management system comprising:
   a communication adapter of an electronic apparatus; and
   a communication adapter of a control terminal,
   wherein the communication adapter of the electronic apparatus includes:
   electronic apparatus control means for controlling the electronic apparatus;
   communication means of an apparatus side, for performing network communication; and
   protocol conversion means of the apparatus side, for performing protocol conversion between control data transmitted/received by the electronic apparatus and the network communication, and
   the communication adapter of the control terminal includes:
   interface means for providing an interface with the control terminal;
   communication means of a control side, for performing the network communication;
   protocol conversion means of the control side, for performing protocol conversion between an input/output interface of the control terminal and the network communication;

terminal status collecting means for collecting terminal status information indicating terminal status including a type, a load or a position of the control terminal;

apparatus status collecting means for collecting apparatus status condition information indicating apparatus status including a type, a load or a position of the electronic apparatus;

communication status collecting means for collecting network communication status condition information indicating network communication status including a type, a path or a load of the communication;

connection rule retention means for retaining a connection rule indicating a communication connection method matching the apparatus status, the terminal status and the network communication status; and connection method setting means for extracting an appropriate connection method by comparing the apparatus status, the terminal status and the network communication status with the connection rule, and setting a control scheme, a terminal interface scheme, a network communication scheme and a protocol conversion scheme for the electronic apparatus.

45. A remote apparatus management system comprising:

a communication adapter of an electronic apparatus; and a communication adapter of a control terminal, wherein the communication adapter of the electronic apparatus includes:

electronic apparatus control means for controlling the electronic apparatus;

communication means of an apparatus side, for performing network communication; and protocol conversion means of the apparatus side, for performing protocol conversion between control data transmitted/received by the electronic apparatus and the network communication, and the communication adapter of the control terminal includes:

interface means for providing an interface with the control terminal;

communication means of a control side, for performing the network communication; and protocol conversion means of the control side, for performing protocol conversion between an input/output interface of the control terminal and the network communication, and the system further comprising a program module for control via the network, the program module includes:

terminal status collecting means for collecting terminal status information indicating terminal status including a type, a load or a position of the control terminal via the network;

apparatus status collecting means for collecting apparatus status condition information indicating apparatus status including a type, a load or a position of the electronic apparatus via the network;

communication status collecting means for collecting network communication status condition information indicating network communication status including a type, a path or a load of the communication;

connection rule retention means for retaining a connection rule indicating a communication connection method matching the apparatus status, the terminal status and the network communication status; and connection method setting means for extracting an appropriate connection method by comparing the apparatus status, the terminal status and the network communication status with the connection rule, and setting a control scheme, a terminal interface scheme, a network communication scheme and a protocol conversion scheme for the electronic apparatus via the network.

* * * * *